US008754354B2

(12) United States Patent
Ohno et al.

(10) Patent No.: US 8,754,354 B2
(45) Date of Patent: *Jun. 17, 2014

(54) LIGHT-EMITTING DEVICE INCLUDING A MEMORY THYRISTOR ARRAY, PRINT HEAD AND IMAGE FORMING APPARATUS INCLUDING THE SAME

(71) Applicants: Seiji Ohno, Tokyo (JP); Takashi Fujimoto, Kanagawa (JP)

(72) Inventors: Seiji Ohno, Tokyo (JP); Takashi Fujimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/779,908

(22) Filed: Feb. 28, 2013

(65) Prior Publication Data

US 2013/0169997 A1 Jul. 4, 2013

Related U.S. Application Data

(62) Division of application No. 12/824,278, filed on Jun. 28, 2010, now Pat. No. 8,450,671.

(30) Foreign Application Priority Data

Jul. 22, 2009 (JP) ................................ 2009-171643
Mar. 29, 2010 (JP) ................................ 2010-074458

(51) Int. Cl.
*G01J 1/32* (2006.01)

(52) U.S. Cl.
USPC ...................................... 250/205; 250/214 R

(58) Field of Classification Search
USPC ........... 250/205, 214 R, 208.1, 239; 315/320; 347/224, 237; 327/514, 515; 362/276, 362/294–296
See application file for complete search history.

(56) References Cited

U.S. PATENT DOCUMENTS

| | | | | |
|---|---|---|---|---|
| 5,307,089 | A | 4/1994 | Takasu et al. | |
| 5,600,363 | A * | 2/1997 | Anzaki et al. | 347/237 |
| 8,305,415 | B2 * | 11/2012 | Ohno | 347/237 |
| 2005/0224810 | A1 | 10/2005 | Ohno | |
| 2005/0230704 | A1 | 10/2005 | Ohno | |

FOREIGN PATENT DOCUMENTS

| | | |
|---|---|---|
| JP | 2001-219596 | 8/2001 |
| JP | 2002-111063 | 4/2002 |
| JP | 2002-134788 | 5/2002 |
| JP | 2002-137445 | 5/2002 |
| JP | 2004-181741 | 7/2004 |
| JP | 2005-026617 | 1/2005 |

(Continued)

*Primary Examiner* — Que T Le
(74) *Attorney, Agent, or Firm* — Fildes & Outland, P.C.

(57) ABSTRACT

A light-emitting device includes: an array of light-emitting elements connected to a light-up signal line to supply a current for lighting up; an array of memory elements provided so as to correspond to the respective light-emitting elements, connected through respective resistances to a memory signal line to supply a signal to designate a light-emitting element to be lighted up, and memorizing by getting turned on that a corresponding light-emitting element is to be lighted up; and an array of switch elements provided so as to correspond to the respective memory elements, electrically connected to the respective memory elements, connected to a transfer signal line to supply signals to set so as to allow a sequential shift of an ON state from one side end to the other end side, and causing the respective memory elements to be likely to be set in an ON state by getting turned on.

14 Claims, 26 Drawing Sheets

(56) References Cited

FOREIGN PATENT DOCUMENTS

| | | |
|---|---|---|
| JP | 2007-160930 | 6/2007 |
| JP | 2009-101712 | 5/2009 |
| TW | 200605347 | 2/2006 |

* cited by examiner

C1(C)

LIGHT-EMITTING DEVICE INCLUDING A MEMORY THYRISTOR ARRAY, PRINT HEAD AND IMAGE FORMING APPARATUS INCLUDING THE SAME

CROSS REFERENCE TO RELATED APPLICATIONS

This application is a division of U.S. application Ser. No. 12/824,278 filed Jun. 28, 2010, which is based on and claims priority under 35 USC §119 from Japanese Patent Application No. 2010-74458 filed Mar. 29, 2010, and Japanese Patent Application No. 2009-171643 filed Jul. 22, 2009.

BACKGROUND

1. Technical Field

The present invention relates to a light-emitting device, a print head and an image forming apparatus.

2. Related Art

In an electrophotographic image forming apparatus such as a printer, a copy machine or a facsimile machine, an image is formed on a recording sheet as follows. Firstly, an electrostatic latent image is formed on a uniformly charged photoconductor by causing an optical recording unit to emit light so as to transfer image information onto the photoconductor. Then, the electrostatic latent image is made visible by being developed with toner. Lastly, the toner image is transferred on and fixed to the recording sheet. In addition to an optical-scanning recording unit that performs exposure by laser scanning in the first scanning direction using a laser beam, a recording device using the following LED print head (LPH) has been employed as such an optical recording unit in recent years in response to demand for downsizing the apparatus. This LPH includes a large number of light-emitting diodes (LEDs), serving as light-emitting elements, arrayed in the first scanning direction.

SUMMARY

According to an aspect of the present invention, there is provided a light-emitting device including: a light-emitting element array formed of plural light-emitting elements that are arrayed in line and that are connected to a light-up signal line to supply a current for lighting up; a memory element array formed of plural memory elements that are provided so as to correspond to the respective light-emitting elements forming the light-emitting element array, that are connected through respective resistances to a memory signal line to supply a signal to designate a light-emitting element to be caused to light up, that each have an ON state and an OFF state, and that each memorize by changing into the ON state that a corresponding one of the light-emitting elements is to be caused to light up; and a switch element array formed of plural switch elements that are provided so as to correspond to the respective memory elements forming the memory element array, that are electrically connected to the respective memory elements, that each have an ON state and an OFF state, that are connected to a transfer signal line to supply signals to set so as to allow a sequential shift of the ON state from one end side to the other end side, and that cause the respective memory elements to be likely to be set in the ON state by changing into the ON state as compared with a case of being in the OFF state.

BRIEF DESCRIPTION OF THE DRAWINGS

An Exemplary embodiment of the present invention will be described in detail based on the following figures, wherein.

DETAILED DESCRIPTION

Hereinafter, a description will be given of an exemplary embodiment of the present invention in detail with reference to the accompanying drawings.

First Exemplary Embodiment

Figure 1:
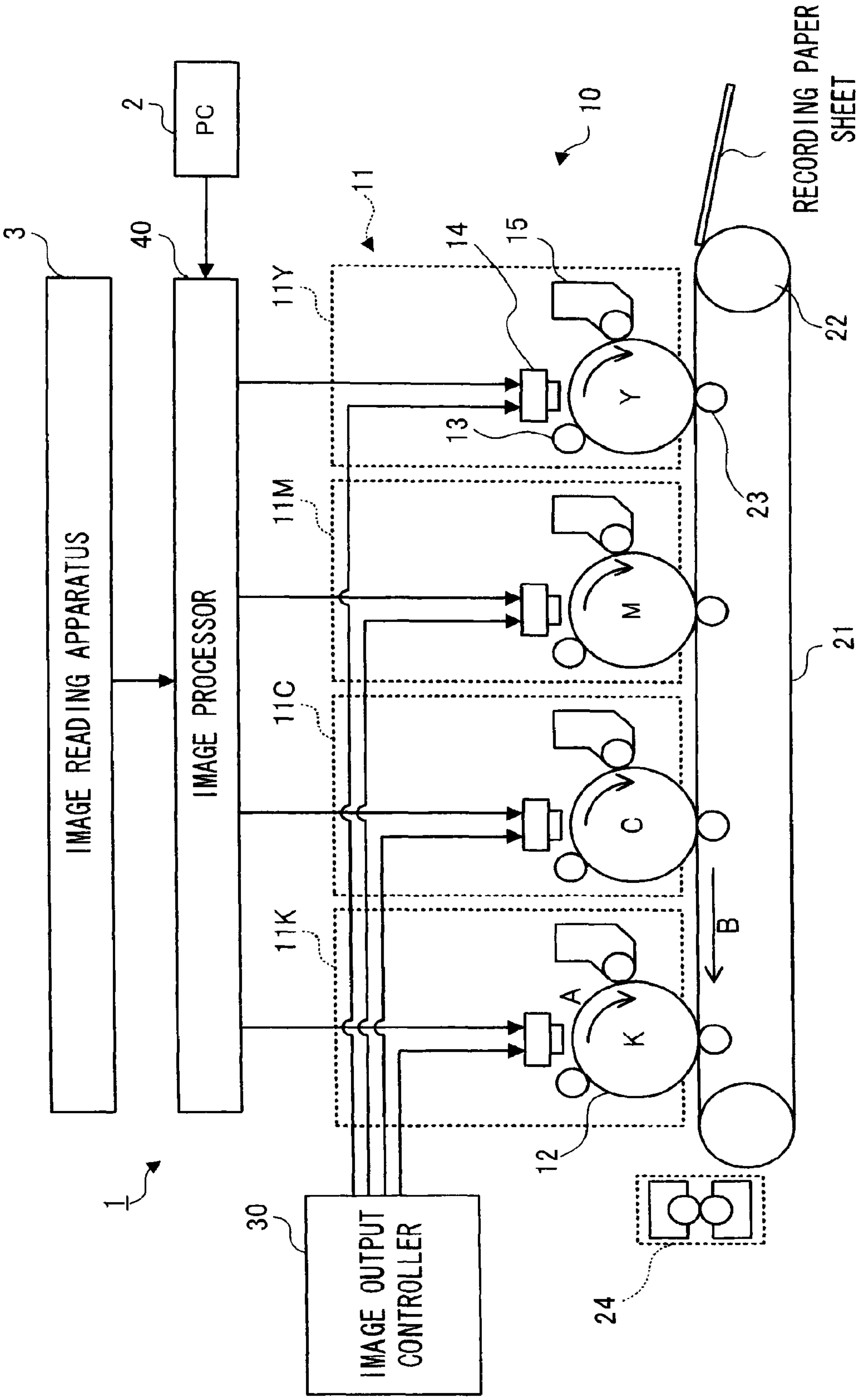
FIG. 1 is a diagram showing an example of an overall configuration of an image forming apparatus to which the first exemplary embodiment is applied.

FIG. 1 is a diagram showing an example of an overall configuration of an image forming apparatus 1 to which the first exemplary embodiment is applied. The image forming apparatus 1 shown in FIG. 1 is what is generally termed as a tandem image forming apparatus. The image forming apparatus 1 includes an image forming process unit 10, an image output controller 30 and an image processor 40. The image forming process unit 10 forms an image in accordance with different color image data. The image output controller 30 controls the image forming process unit 10. The image processor 40, which is connected to devices such as a personal computer (PC) 2 and an image reading apparatus 3, performs predefined image processing on image data received from the above devices.

The image forming process unit 10 includes image forming units 11 formed of plural engines arranged in parallel at intervals set in advance. The image forming units 11 are formed of four image forming units 11Y, 11M, 11C and 11K. Each of the image forming units 11Y, 11M, 11C and 11K includes a photoconductive drum 12, a charging device 13, a print head 14 and a developing device 15. On the photoconductive drum 12, which is an example of an image carrier, an electrostatic latent image is formed, and the photoconductive drum 12 retains a toner image. The charging device 13, as an example of a charging unit, charges the surface of the photoconductive drum 12 at a predetermined potential. The print head 14 exposes the photoconductive drum 12 charged by the charging device 13. The developing device 15, as an example of a developing unit, develops an electrostatic latent image formed by the print head 14. Here, the image forming units 11Y, 11M, 11C and 11K have approximately the same configuration excluding colors of toner put in the developing devices 15. The image forming units 11Y, 11M, 11C and 11K form yellow (Y), magenta (M), cyan (C) and black (K) toner images, respectively.

In addition, the image forming process unit 10 further includes a sheet transport belt 21, a drive roll 22, transfer rolls 23 and a fixing device 24. The sheet transport belt 21 transports a recording sheet as a transferred body so that different color toner images respectively formed on the photoconductive drums 12 of the image forming units 11Y, 11M, 11C and 11K are transferred on the recording sheet by multilayer transfer. The drive roll 22 is a roll that drives the sheet transport belt 21. Each transfer roll 23, as an example of a transfer unit, transfers a toner image formed on the corresponding photoconductive drum 12 onto the recording sheet. The fixing device 24 fixes the toner images on the recording sheet.

In this image forming apparatus 1, the image forming process unit 10 performs an image forming operation on the basis of various kinds of control signals supplied from the image output controller 30. Under the control by the image output controller 30, the image data received from the personal computer (PC) 2 or the image reading apparatus 3 is subjected to image processing by the image processor 40, and then the resultant data is supplied to the corresponding image forming unit 11. Then, for example in the black (K) color image forming unit 11K, the photoconductive drum 12 is charged at a predetermined potential by the charging device 13 while rotating in an arrow A direction, and then is exposed by the print head 14 lighting up (emitting light) on the basis of the image data supplied from the image processor 40. By this operation, the electrostatic latent image for the black (K) color image is formed on the photoconductive drum 12. Thereafter, the electrostatic latent image formed on the photoconductive drum 12 is developed by the developing device 15, and accordingly the black (K) color toner image is formed on the photoconductive drum 12. Similarly, yellow (Y), magenta (M) and cyan (C) color toner images are formed in the image forming units 11Y, 11M and 11C, respectively.

The respective color toner images on the photoconductive drums 12, which are formed in the respective image forming units 11, are electrostatically transferred to the recording sheet supplied with the movement of the sheet transport belt 21 by a transfer electric field applied to the transfer rolls 23, in sequence. Here, the sheet transport belt 21 moves in an arrow B direction. By this operation, a synthetic toner image, which is superimposed color-toner images, is formed on the recording sheet.

Thereafter, the recording sheet on which the synthetic toner image is electrostatically transferred is transported to the fixing device 24. The synthetic toner image on the recording sheet transported to the fixing device 24 is fixed on the recording sheet through fixing processing using heat and pressure by the fixing device 24, and then is outputted from the image forming apparatus 1.

Figure 2:
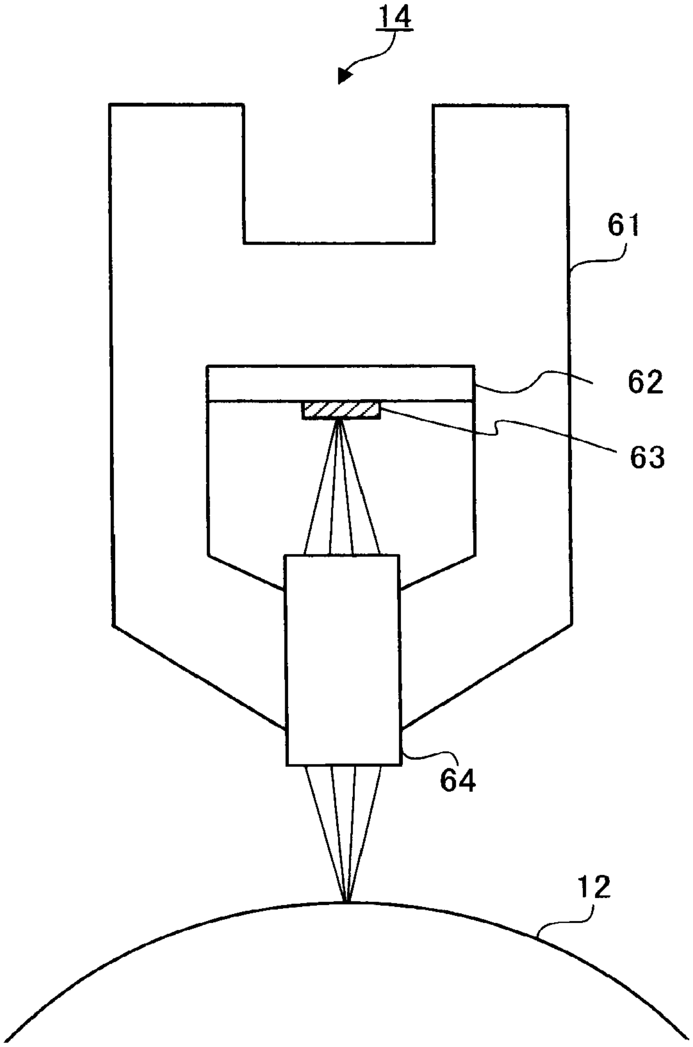
FIG. 2 is a view showing a structure of the print head to which the first exemplary embodiment is applied.

FIG. 2 is a view showing a structure of the print head 14 to which the first exemplary embodiment is applied. The print head 14 includes a housing 61, a light-emitting portion 63, a circuit board 62 and a rod lens array 64. The light-emitting portion 63, as an example of an exposure unit, has plural light-emitting elements (light-emitting thyristors in the first exemplary embodiment). On the circuit board 62, the light-emitting portion 63, a signal generating circuit 100 (see FIG. 3 to be described later) and the like are mounted. The signal generating circuit 100, as an example of a signal generating unit, generates signals (driving signals) to drive the light-emitting portion 63. The rod lens array 64, as an example of an optical unit, focuses light emitted by the light-emitting portion 63 onto the surface of the photoconductive drum 12.

The housing 61 is made of metal, for example, and supports the circuit board 62 and the rod lens array 64. The housing 61 is set so that the light-emitting points of the light-emitting portions 63 are located on the focal plane of the rod lens array 64. In addition, the rod lens array 64 is arranged along an axial direction of the photoconductive drum 12 (the first scanning direction).

Figure 3:
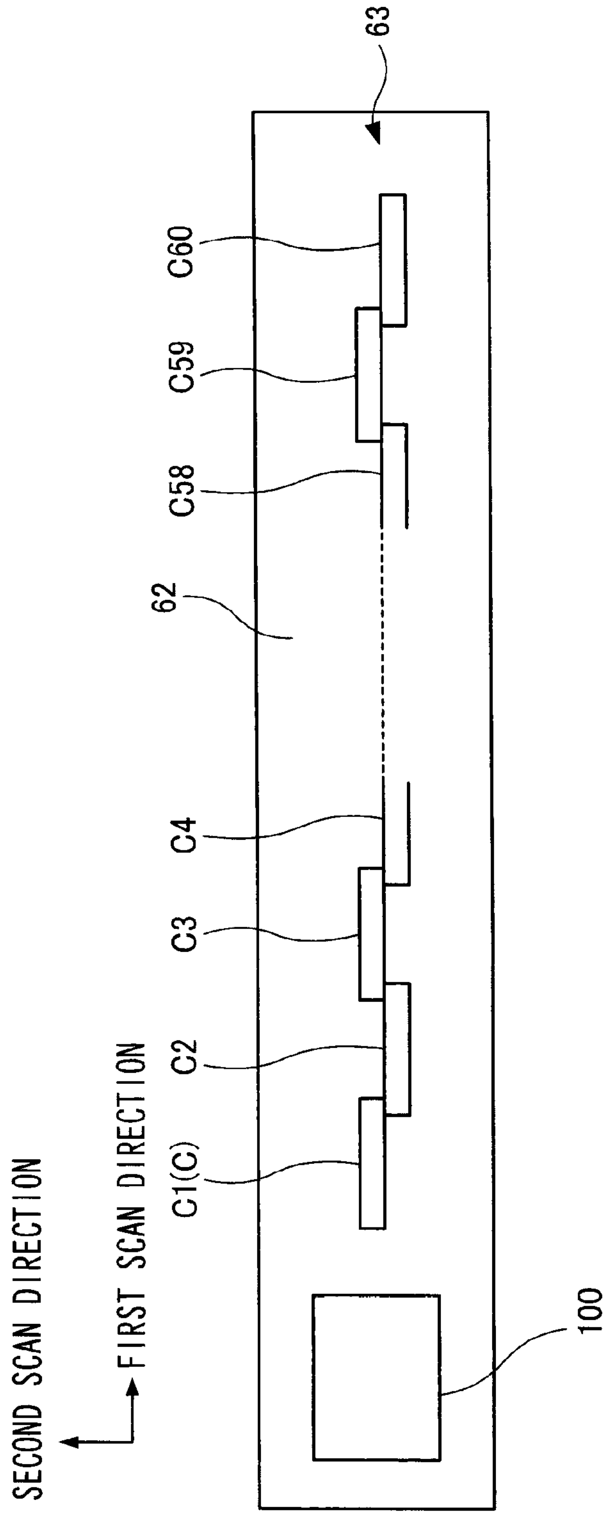
FIG. 3 is a top view of the circuit board and the light-emitting portion in the print head.

FIG. 3 is a top view of the circuit board 62 and the light-emitting portion 63 in the print head 14.

As shown in FIG. 3, the light-emitting portion 63 is formed of sixty light-emitting chips C (C1 to C60), each of which is an example of a light-emitting device, arranged in two lines in the first scanning direction on the circuit board 62. Here, the sixty light-emitting chips C (C1 to C60) are arrayed in a zigzag pattern in which each adjacent two of the light-emitting chips C1 to C60 face each other. Further, on the circuit board 62, the signal generating circuit 100 that drives the light-emitting portion 63 is mounted, as described above.

Figure 4:
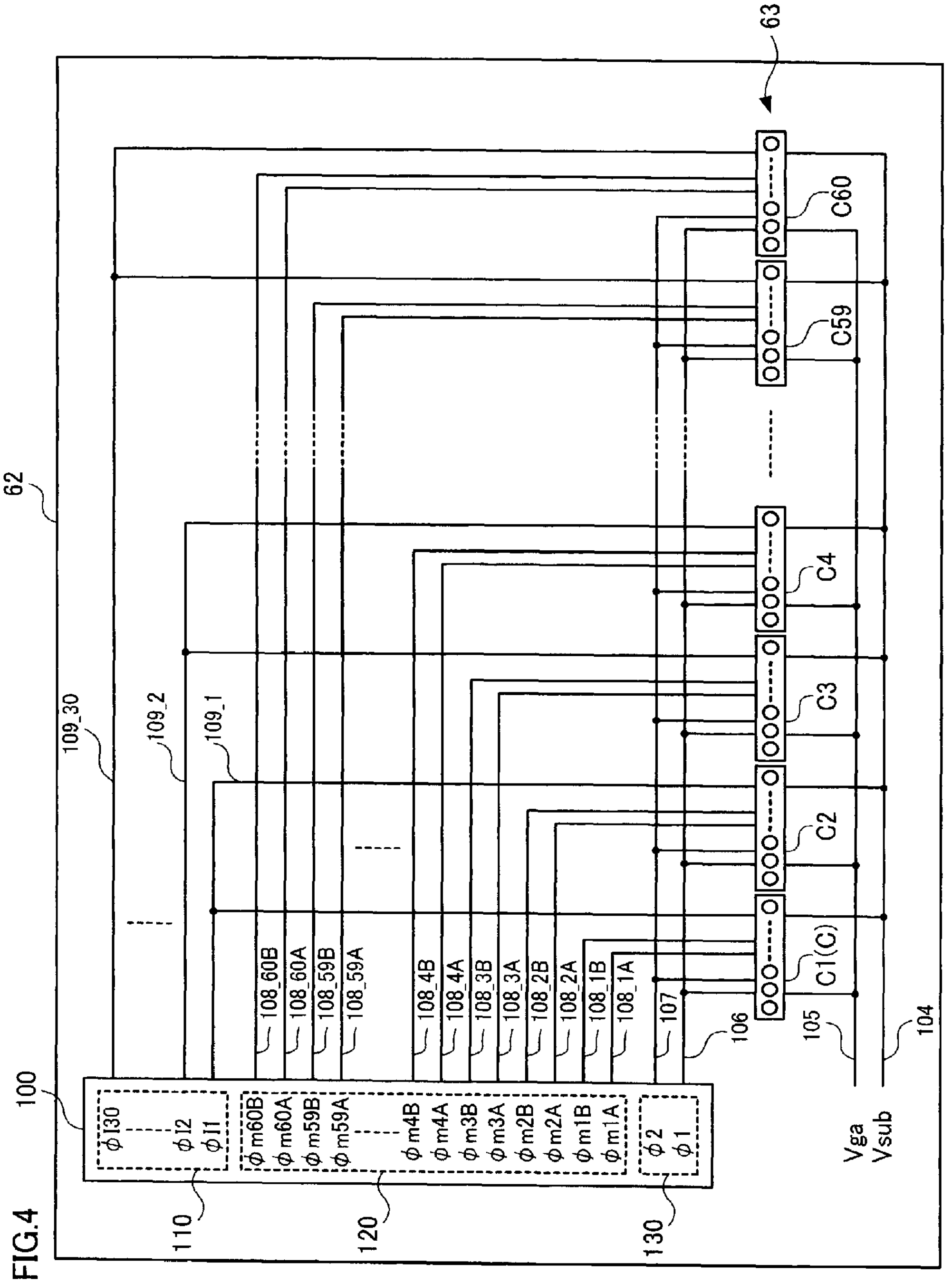
FIG. 4 is a diagram showing a configuration of the signal generating circuit mounted on the circuit board and a wiring configuration of the circuit board in the first exemplary embodiment.

FIG. 4 is a diagram showing a configuration of the signal generating circuit 100 mounted on the circuit board 62 (see FIGS. 2 and 3) and a wiring configuration of the circuit board 62 in the first exemplary embodiment.

To the signal generating circuit 100, image data subjected to the image processing and various kinds of control signals are inputted from the image output controller 30 and the image processor 40 (see FIG. 1), although the illustration thereof is omitted. Then, the signal generating circuit 100 performs rearrangement of the image data, correction of intensity of the light emission and the like on the basis of the image data and the various kinds of control signals. The signal generating circuit 100 includes a light-up signal generating unit 110 that outputs light-up signals ϕI (ϕI1 to ϕI30) to the respective light-emitting chips C (C1 to C60).

The signal generating circuit 100 includes a memory signal generating unit 120 that outputs memory signals ϕm (ϕm1A to ϕm60A and ϕm1B to ϕm60B) for designating and memorizing the light-emitting elements to be caused to light up in the respective light-emitting chips C (C1 to C60), on the basis of the image data.

Additionally, the signal generating circuit 100 includes a transfer signal generating unit 130 that transmits, to the light-emitting chips C (C1 to C60), a first transfer signal ϕ1 and a second transfer signal ϕ2 on the basis of the various kinds of control signals.

Specifically, the signal generating circuit 100 generates the light-up signals ϕI (ϕI1 to ϕI30), the memory signals ϕm (ϕm1A to ϕm60A and ϕm1B to ϕm60B), the first transfer signal ϕ1 and the second transfer signal ϕ2, as an example of the driving signals.

A power supply line 104 is provided to the circuit board 62. The power supply line 104 is connected to Vsub terminals (see FIG. 6 to be described later) of the light-emitting chips C (C1 to C60), and supplies a reference potential Vsub (for example, 0 V). In addition, another power supply line 105 is provided to the circuit board 62. The power supply line 105 is connected to Vga terminals (see FIG. 6 to be described later) of the light-emitting chips C (C1 to C60), and supplies a power supply potential Vga for electric power supply (for example, −3.3 V).

Moreover, a first transfer signal line 106 and a second transfer signal line 107 are also provided to the circuit board 62. The first transfer signal line 106 and the second transfer signal line 107 respectively transmit the first transfer signal ϕ1 and the second transfer signal ϕ2 from the transfer signal generating unit 130 of the signal generating circuit 100 to the light-emitting portion 63. The first transfer signal line 106 and the second transfer signal line 107 are connected in parallel to ϕ1 terminals and ϕ2 terminals (see FIGS. 5A to 6 to be described later) of the light-emitting chips C (C1 to C60), respectively.

Further, thirty light-up signal lines 109 (109_1 to 109_30) are also provided to the circuit board 62. The light-up signal lines 109 transmit the respective light-up signals ϕI (ϕI1 to ϕI30) from the light-up signal generating unit 110 of the signal generating circuit 100 to the corresponding light-emitting chips C (C1 to C60). Each of the light-up signal lines 109 (109_1 to 109_30) is provided for a corresponding pair, which is formed of two light-emitting chips C. Specifically, the light-up signal ϕI1 is transmitted in common to the light-emitting chips C1 and C2. The light-up signal ϕI2 is transmitted in common to the light-emitting chips C3 and C4. The light-up signal ϕI30 is transmitted in common to the light-emitting chips C59 and C60. The others have the similar configuration.

Note that, although one light-up signal ϕI is transmitted to two light-emitting chips C herein, the configuration is not limited to this. One light-up signal ϕI may be transmitted to one light-emitting chip C, or to three or more light-emitting chips C.

Moreover, hundred-twenty memory signal lines 108 (108_1A to 108_60A and 108_1B to 108_60B) are also provided to the circuit board 62. The memory signal lines 108 transmit the respective memory signals ϕm (ϕm1A to ϕm60A and ϕm1B to ϕm60B) from the memory signal generating unit 120 of the signal generating circuit 100 to the corresponding light-emitting chips C (C1 to C60). In the first exemplary embodiment, each of the light-emitting chips C is provided with two of the memory signal lines 108 (108_1A to 108_60A and 108_1B to 108_60B). Specifically, the memory signals ϕm1A and ϕm1B are transmitted to the light-emitting chip C1. The memory signals ϕm2A and ϕm2B are transmitted to the light-emitting chip C2. The memory signals ϕm60A and ϕm60B are transmitted to the light-emitting chip C60. A reason why two memory signals ϕm are transmitted to each of the light-emitting chips C will be described later.

As described above, the reference potential Vsub and the power supply potential Vga are supplied in common to each of the light-emitting chips C (C1 to C60) on the circuit board 62, and the first transfer signal ϕ1 and the second transfer signal ϕ2 are transmitted in common thereto. Meanwhile, each of the light-up signals ϕI is transmitted in common to the light-emitting chips C included in the corresponding pair. Furthermore, the memory signals ϕm are individually transmitted to the respective light-emitting chips C.

Figure 5A:
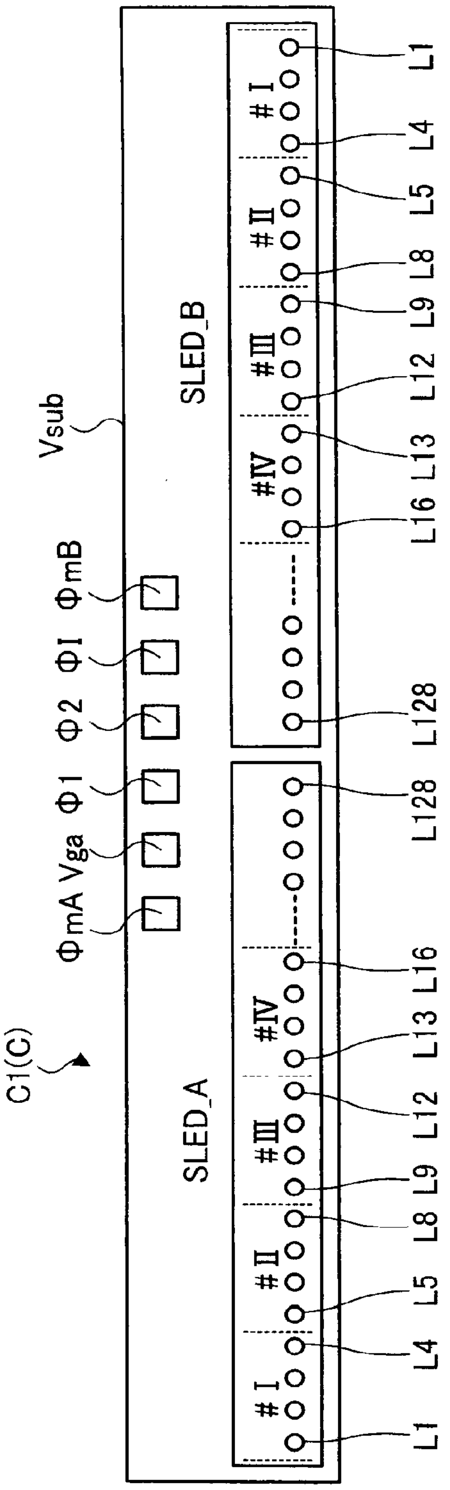
FIGS. 5A and 5B are diagrams for explaining an outline of the light-emitting chip in the first exemplary embodiment.
Figure 5B:
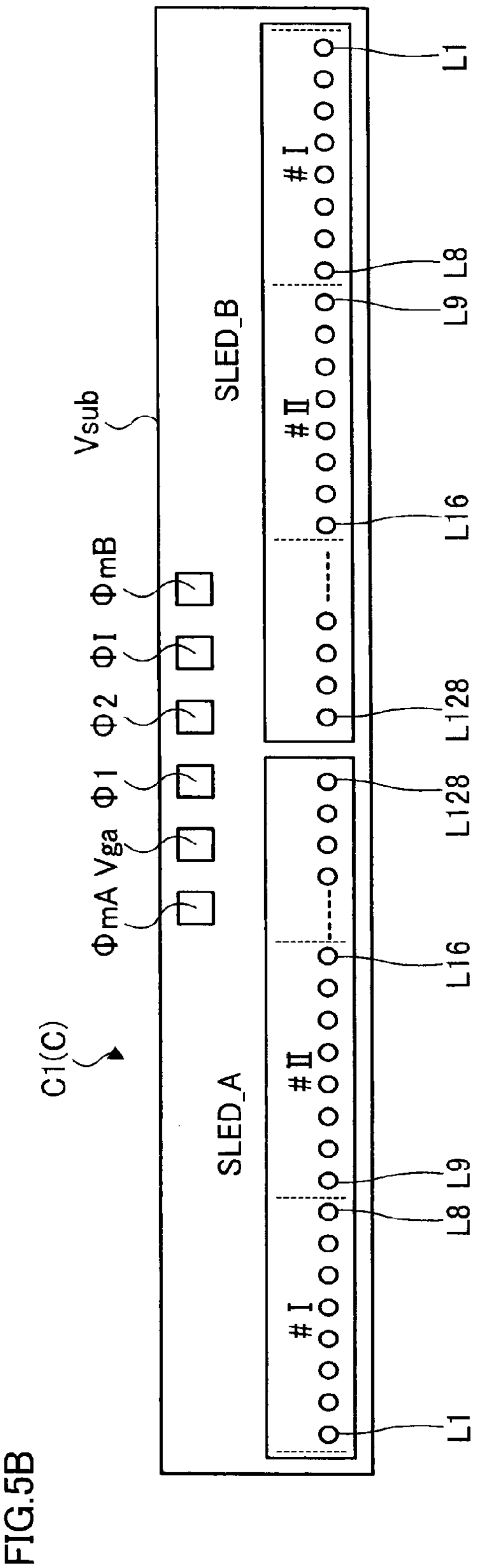

FIGS. 5A and 5B are diagrams for explaining an outline of the light-emitting chip in the first exemplary embodiment. The light-emitting chip C1 is described as an example, and thus the light-emitting chips C are denoted by the light-emitting chip C1 (C). The same is true for the other light-emitting chips C2 to C60. Although the light-emitting chip C1 is described as an example in this way, the light-emitting chip C1 is denoted by the light-emitting chip C1 (C) if the light-emitting chips C (C1 to C60) have the similar configuration. The same is true for the other terms.

In the light-emitting chip C1 (C), the plural light-emitting elements (specifically, light-emitting thyristors) are divided into groups that each include a predetermined number of light-emitting elements, and lighting up and putting out are controlled (light-up control is performed) for each of the groups. FIG. 5A shows a combination of the light-emitting elements in a case where every four light-emitting elements in the light-emitting chip C1 (C) forms a group to operate, while FIG. 5B shows that in a case where every eight light-emitting elements in the light-emitting chip C1 (C) forms a group to operate.

In both of FIGS. 5A and 5B, the light-emitting chip C1 (C) includes two self-scanning light-emitting element array (SLED) denoted by SLED_A and SLED_B. The SLED_A and the SLED_B each include light-emitting thyristors L1 to L128, which are an example of 128 light-emitting elements, along an edge of the light-emitting chip C1 (C). When the SLED_A and the SLED_B are not distinguished, they are denoted by SLED.

The light-emitting chip C1 (C) includes a ϕ1 terminal, a ϕ2 terminal, a ϕmA terminal, a ϕmB terminal and a ϕI terminal. Additionally, the light-emitting chip C1 (C) includes a Vga terminal on the front surface thereof and a Vsub terminal on the back surface thereof. When the ϕmA terminal and the ϕmB terminal are not distinguished, they are denoted by a ϕm terminal.

From these terminals, the reference potential Vsub, the power supply potential Vga, the first transfer signal ϕ1, the second transfer signal ϕ2 and the light-up signal ϕI1 (ϕI) are transmitted in common to the SLED_A and the SLED_B. Meanwhile, the memory signal ϕm1A (ϕmA) is transmitted to the SLED_A, and the memory signal ϕm1B (ϕmB) is transmitted to the SLED_B. That is, the memory signals ϕm are individually transmitted to the respective SLEDs.

In FIG. 5A, numbers are set to the light-emitting thyristors L1 to L128 of the SLED_A in order from left of the drawing. The light-emitting elements (light-emitting thyristors) are divided into groups each formed of four thyristors, like four of a group #I (light-emitting thyristors L1 to L4), four of a group #II (light-emitting thyristors L5 to L8) . . . in order from left of the drawing. On the other hand, numbers are set to the light-emitting thyristors L1 to L128 of the SLED_B in order from right of the drawing. The light-emitting elements (light-emitting thyristors) are divided into groups each formed of four thyristors, like four of a group #I (light-emitting thyristors L1 to L4), four of a group #II (light-emitting thyristors L5 to L8) . . . in order from right of the drawing. When the light-emitting thyristors L1, L2, L3 . . . are not distinguished, they are called light-emitting thyristors L.

By taking each of the groups #I, #II . . . of the SLED_A and the SLED_B as a unit, lighting up and putting out of the light-emitting thyristors L belonging to each group are controlled (light-up control is performed) in order of the groups #I, #II . . . in chronological order. Note that, for the group #I for example, the light-emitting thyristors L1 to L4 in the group #I are not lighted up or put out simultaneously, but lighting up and putting out of each of the light-emitting thyristors L1 to L4 are individually controlled. The light-up control is performed in parallel on the SLED_A and the SLED_B, and thus the light-up control is sequentially performed from the leftmost group #I in the SLED_A and the rightmost group #I in the SLED_B. A detailed description of the light-up control will be given later.

In FIG. 5B also, numbers are set to the light-emitting thyristors L1 to L128 of the SLED_A in order from left of the drawing. The light-emitting elements (light-emitting thyristors) are divided into groups each formed of eight thyristors, like eight of a group #I (light-emitting thyristors L1 to L8), eight of a group #II (light-emitting thyristors L9 to L16) . . . in order from left of the drawing. Similarly to the case shown in FIG. 5A, by taking each of the groups #I, #II . . . as a unit, lighting up and putting out of eight light-emitting elements (light-emitting thyristors) belonging to each group are controlled (light-up control is performed).

Note that the configuration of the light-emitting chip C1 (C) is the same between FIGS. 5A and 5B, and that the configuration of the groups #I, #II . . . (the number of the light-emitting thyristors L) is different between FIGS. 5A and 5B.

Figure 6:
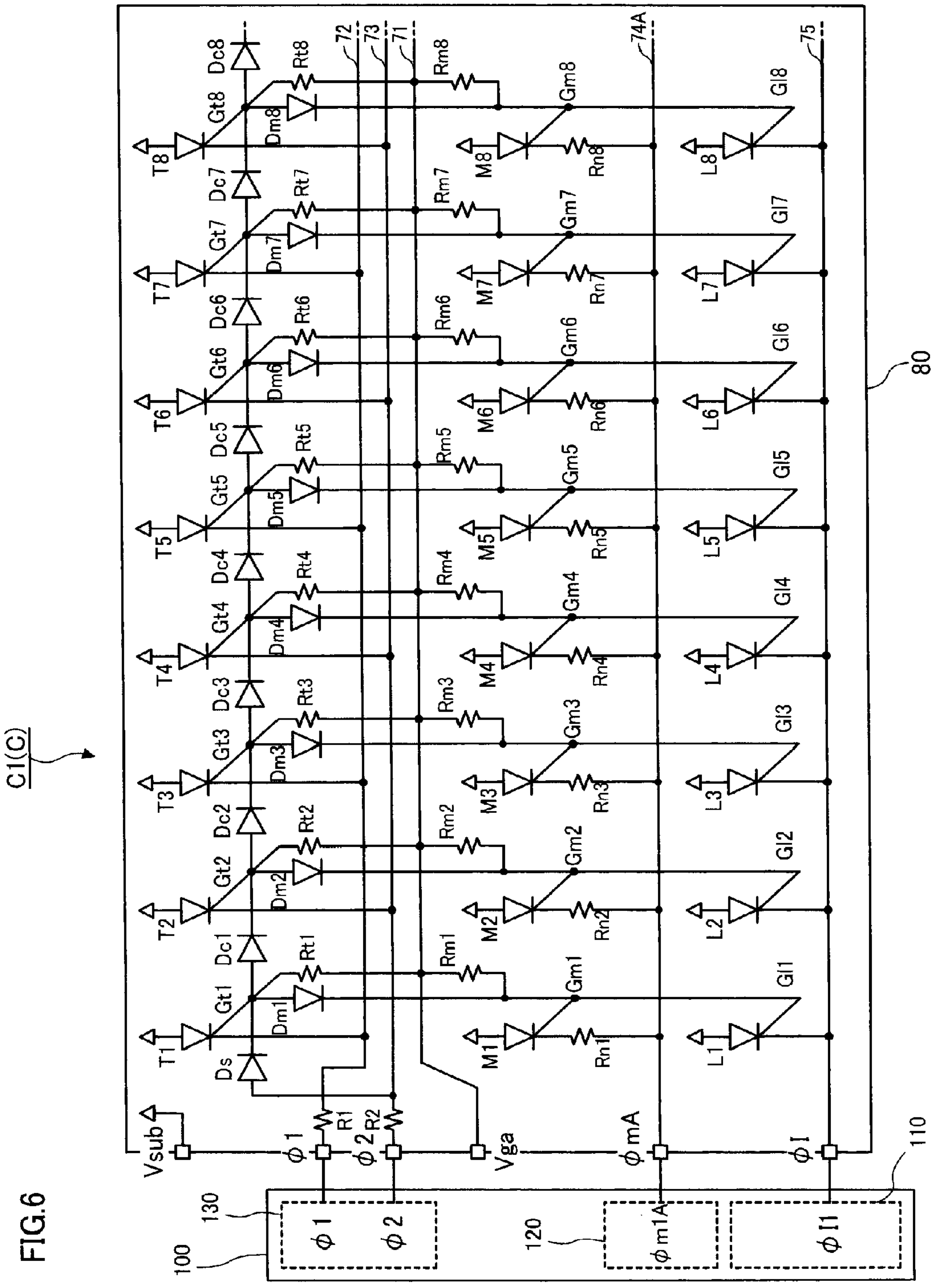
FIG. 6 is a diagram for explaining a circuit configuration of the light-emitting chip in the first exemplary embodiment.

FIG. 6 is a diagram for explaining a circuit configuration of the light-emitting chip C in the first exemplary embodiment. Here, the part of the SLED_A of the light-emitting chip C1 is described as an example, and thus the light-emitting chips C are denoted by the light-emitting chip C1 (C). Note that a part related to the light-emitting thyristors L1 to L8 is shown in FIG. 6. The Vga terminal, the ϕ1 terminal, the ϕ2 terminal, the ϕmA terminal and the ϕI terminal are shown on the left edge of the drawing for ease of description. Although not shown, the SLED_B has the same configuration except for being inverted in the lateral direction of the drawing. Note that the Vga terminal, the ϕ1 terminal, the ϕ2 terminal and the ϕI terminal are common although the ϕmA terminal is replaced with the ϕmB terminal. The other light-emitting chips C2 to C60 have the same configuration as that of the light-emitting chip C1.

Figure 7B:
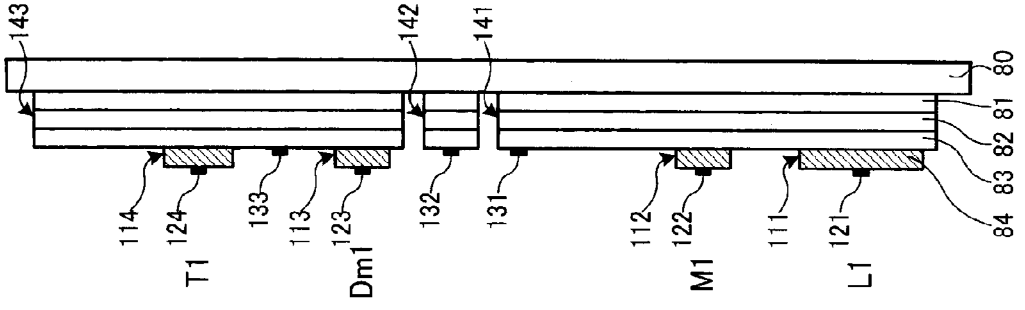
FIGS. 7A and 7B are a planar layout and a cross-sectional view of the light-emitting chip in the first exemplary embodiment.
Figure 7A:
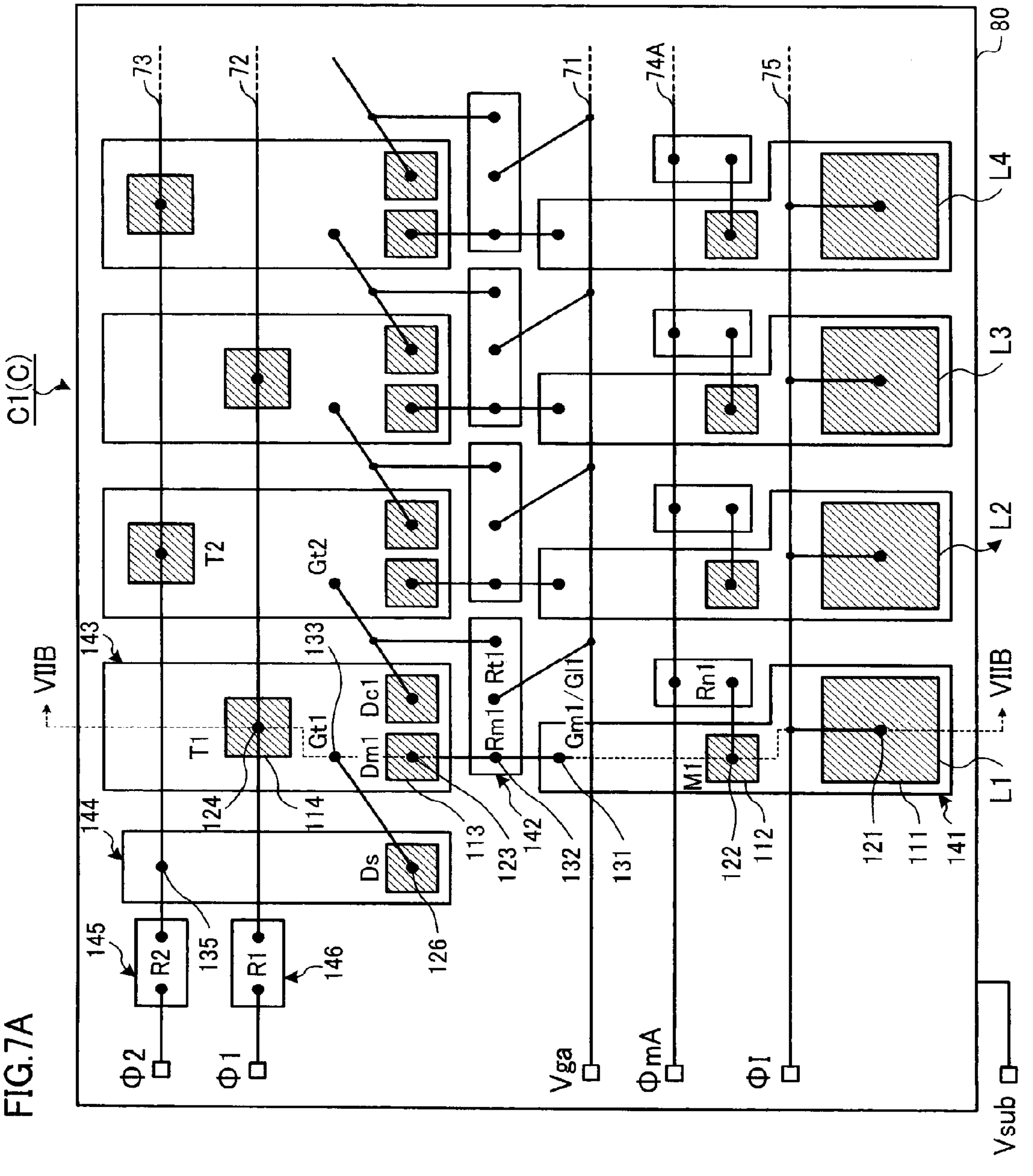

The part of the SLED_A of the light-emitting chip C1 (C) includes a transfer thyristor array (a switch element array) formed of transfer thyristors T1, T2, T3 . . . as an example of switch elements arrayed in line, a memory thyristor array (a memory element array) formed of memory thyristors M1, M2, M3 . . . as an example of memory elements similarly arrayed in line, and a light-emitting thyristor array (a light-emitting element array) formed of the light-emitting thyristors L1, L2, L3 . . . similarly arrayed in line, which are placed on a substrate 80 (see FIGS. 7A and 7B to be described later).

Here, when the transfer thyristors T1, T2, T3 . . . are not distinguished, they are called transfer thyristors T. Similarly, when the memory thyristors M1, M2, M3 . . . are not distinguished, they are called memory thyristors M.

Note that the above-mentioned thyristors (the transfer thyristors T, the memory thyristors M and the light-emitting thyristors L) are semiconductor devices each having three terminals that are an anode terminal, a cathode terminal and a gate terminal.

An anode terminal, a cathode terminal and a gate terminal of the light-emitting thyristor L are referred to as first anode, first cathode and first gate, respectively. An anode terminal, a cathode terminal and a gate terminal of the memory thyristor M are referred to as second anode, second cathode and second gate, respectively. An anode terminal, a cathode terminal and a gate terminal of the transfer thyristor T are referred to as third anode, third cathode and third gate, respectively.

The part of the SLED_A of the light-emitting chip C1 (C) includes coupling diodes Dc1, Dc2, Dc3 . . . connecting respective pairs that are each two of the transfer thyristors T1, T2, T3 . . . in numerical order. Moreover, the light-emitting chip C1 (C) includes connecting diodes Dm1, Dm2, Dm3 . . . each of which is an example of a first electrical element.

In addition, the part of the SLED_A of the light-emitting chip C1 (C) includes power supply line resistances Rt1, Rt2, Rt3 . . . , power supply line resistances Rm1, Rm2, Rm3 . . . , and resistances Rn1, Rn2, Rn3 . . . .

Here, similarly to the transfer thyristors T and the like, when the coupling diodes Dc1, Dc2, Dc3 . . . , the connecting diodes Dm1, Dm2, Dm3 . . . , the power supply line resistances Rt1, Rt2, Rt3 . . . , the power supply line resistances Rm1, Rm2, Rm3 . . . , and the resistances Rn1, Rn2, Rn3 are not respectively distinguished, they are called coupling diodes Dc, connecting diodes Dm, power supply line resistances Rt, power supply line resistances Rm and resistances Rn, respectively.

If the number of the transfer thyristors T in the transfer thyristor array is set to be 128, for example, the number of the memory thyristors M and the number of the light-emitting thyristors L are also 128. Similarly, the number of the connecting diodes Dm, the number of each of the power supply line resistances Rt and Rm, the number of the resistances Rn are also 128. Meanwhile, the number of the coupling diodes Dc is 127, which is less by 1 than that of the transfer thyristors T.

Further, the part of the SLED_A of the light-emitting chip C1 (C) includes one start diode Ds. In order to prevent an excessive current from flowing into a first transfer signal line 72 and a second transfer signal line 73, the part of the SLED_A of the light-emitting chip C1 (C) includes current limitation resistances R1 and R2.

Note that, the transfer thyristors T1, T2, T3 . . . are arrayed in numerical order from the left side of FIG. 6. Similarly, the memory thyristors M1, M2, M3 . . . and the light-emitting thyristors L1, L2, L3 . . . are also arrayed in numerical order from the left side of FIG. 6. Further, the coupling diodes Dc1, Dc2, Dc3 . . . , the connecting diodes Dm1, Dm2, Dm3 . . . , the power supply line resistances Rt1, Rt2, Rt3 . . . , the power supply line resistances Rm1, Rm2, Rm3 . . . , and the resistances Rn1, Rn2, Rn3 . . . are also arrayed in numerical order from the left side of FIG. 6.

Next, a description will be given of electric connections between elements in the part of the SLED_A of the light-emitting chip C1 (C).

Anode terminals of the transfer thyristors T1, T2, T3 . . . , anode terminals of the memory thyristors M1, M2, M3 . . . , and anode terminals of the light-emitting thyristors L1, L2, L3 . . . are connected to the substrate 80 of the light-emitting chip C1 (C) (anode common). These anode terminals are connected to the power supply line 104 (see FIG. 4) through the Vsub terminal provided to the substrate 80. To this power supply line 104, the reference potential Vsub is supplied.

Gate terminals Gt1, Gt2, Gt3 . . . of the transfer thyristors T1, T2, T3 . . . are connected to a power supply line 71 through the respective power supply line resistances Rt1, Rt2, Rt3 . . . provided so as to correspond to the respective transfer thyristors T1, T2, T3 . . . . The power supply line 71 is connected to the Vga terminal. The Vga terminal is connected to the power supply line 105 (see FIG. 4), and the power supply potential Vga is supplied thereto.

Cathode terminals of the odd-numbered transfer thyristors T1, T3, T5 . . . are connected to the first transfer signal line 72 along with the transfer thyristor array from the transfer thyristor T1. The first transfer signal line 72 is connected through the current limitation resistance R1 to the ϕ1 terminal that is an input terminal of the first transfer signal ϕ1. To this ϕ1 terminal, the first transfer signal line 106 (see FIG. 4) is connected, and the first transfer signal ϕ1 is supplied thereto.

Meanwhile, cathode terminals of the even-numbered transfer thyristors T2, T4, T6 . . . are connected to the second transfer signal line 73 along with the transfer thyristor array. The second transfer signal line 73 is connected through the current limitation resistance R2 to the ϕ2 terminal that is an input terminal of the second transfer signal ϕ2. To this ϕ2 terminal, the second transfer signal line 107 (see FIG. 4) is connected, and the second transfer signal ϕ2 is supplied thereto.

Cathode terminals of the memory thyristors M1, M2, M3 . . . are connected to a memory signal line 74A through the respective resistances Rn1, Rn2, Rn3 . . . provided so as to correspond thereto. The memory signal line 74A is connected to the ϕmA terminal that is an input terminal of the memory signal ϕm. To the ϕmA terminal, the memory signal line 108_1A (see FIG. 4) is connected, and the memory signal ϕm1A is supplied thereto. Although not shown, in the SLED_B, cathode terminals of the memory thyristors M1, M2, M3 . . . are connected to a memory signal line 74B (not shown), which is similar to the memory signal line 74A, through the respective resistances Rn1, Rn2, Rn3 . . . provided so as to correspond thereto. The memory signal line 74B is connected to the ϕmB terminal (see FIGS. 5A and 5B) that is an input terminal of the memory signal ϕm. To the ϕmB terminal, the memory signal line 108_1B (see FIG. 4) is connected, and the memory signal ϕm1B is supplied thereto.

In FIG. 6, each of the gate terminals Gt1, Gt2, Gt3 . . . of the transfer thyristors T1, T2, T3 . . . is connected to one of gate terminals Gm1, Gm2, Gm3 of the memory thyristors M1, M2, M3 . . . , which has the same number as the gate terminal Gt to be connected thereto, through each of the connecting diodes Dm1, Dm2, Dm3 . . . , with a one-to-one relationship. Specifically, anode terminals of the connecting diodes Dm1, Dm2, Dm3 . . . are respectively connected to the gate terminals Gt1, Gt2, Gt3 . . . of the transfer thyristors T1, T2, T3 . . . , and cathode terminals of the connecting diodes Dm1, Dm2, Dm3 . . . are respectively connected to the gate terminals Gm1, Gm2, Gm3 . . . of the memory thyristors M1, M2, M3 . . . .

Here, when the gate terminals Gt1, Gt2, Gt3 . . . and the gate terminals Gm1, Gm2, Gm3 . . . are not distinguished, they are called gate terminals Gt and gate terminals Gm, respectively.

The connecting diodes Dm are connected so that a current flows in a direction from the respective gate terminals Gt of the transfer thyristors T to the respective gate terminals Gm of the memory thyristors M.

Each of the gate terminals Gm1, Gm2, Gm3 . . . of the memory thyristors M1, M2, M3 . . . is connected to the power supply line 71 through each of the power supply line resistances Rm1, Rm2, Rm3 . . . provided so as to correspond to each of the memory thyristors M1, M2, M3 . . . .

Each of the coupling diodes Dc1, Dc2, Dc3 . . . is connected between each pair of the gate terminals Gt, which is two gate terminals Gt in numerical order among the gate terminals Gt1, Gt2, Gt3 . . . of the transfer thyristors T1, T2, T3 . . . . Specifically, the coupling diodes Dc1, Dc2, Dc3 . . . are serially connected so as to sandwich each of the gate terminals Gt1, Gt2, Gt3 . . . therebetween. The coupling diode Dc1 is connected so that the direction thereof is the same as that of the current flowing from the gate terminal Gt1 to the gate terminal Gt2. The same configuration is applied to the other coupling diodes Dc2, Dc3, Dc4 . . . .

Gate terminals Gl1, Gl2, Gl3 . . . of the light-emitting thyristors L1, L2, L3 . . . are connected to the respective gate terminals Gm1, Gm2, Gm3 . . . of the memory thyristors M1, M2, M3 . . . .

Cathode terminals of the light-emitting thyristors L1, L2, L3 . . . are connected to a light-up signal line 75, which is connected to the ϕI terminal. To the ϕI terminal, the light-up signal line 109 (see FIG. 4: the light-up signal line 109_1 for the light-emitting chip C1) is connected, and the light-up signal ϕI (see FIG. 4: the light-up signal ϕI1 for the light-emitting chip C1) is supplied. Note that to the ϕI terminals of the other light-emitting chips C2 to C60, the light-up signals ϕI1 to ϕI30 are supplied in common for the respective pairs each formed of two of the light-emitting chips C.

The gate terminal Gt1 of the transfer thyristor T1, which is positioned on one end side of the transfer thyristor array, is connected to a cathode terminal of the start diode Ds. Meanwhile, an anode terminal of the start diode Ds is connected to the second transfer signal line 73.

FIGS. 7A and 7B are a planar layout and a cross-sectional view of the light-emitting chip C in the first exemplary embodiment. The part of the SLED_A of the light-emitting chip C1 is described as an example, and thus the light-emitting chips C are denoted by the light-emitting chip C1 (C). FIG. 7A is a planar layout of a part related to the light-emitting thyristors L1 to L4 in the part of the SLED_A of the light-emitting chip C1 (C). FIG. 7B is a cross-sectional view of FIG. 7A, taken along a line VIIB-VIIB. Specifically, FIG. 7B shows cross sections of the transfer thyristor T1, the connecting diode Dm1, the memory thyristor M1 and the light-emitting thyristor L1. Note that, in FIGS. 7A and 7B, elements and terminals are shown by using the above-mentioned names.

As shown in FIG. 7B, the light-emitting chip C1 (C) is configured by stacking a p-type first semiconductor layer 81, an n-type second semiconductor layer 82, a p-type third semiconductor layer 83 and an n-type fourth semiconductor layer 84 in sequence on the substrate 80 as a p-type semiconductor.

Further, plural islands (a first island 141 to a sixth island 146) are formed by sequentially etching the first semiconductor layer 81, the second semiconductor layer 82, the third semiconductor layer 83 and the fourth semiconductor layer 84.

As shown in FIG. 7A, the light-emitting thyristor L1 and the memory thyristor M1 are formed in the first island 141, the power supply line resistances Rm1 and Rt1 are formed in a second island 142, and the coupling diode Dc1, the connecting diode Dm1 and the transfer thyristor T1 are formed in a third island 143. Furthermore, islands similar to the first island 141 to the third island 143 are formed in parallel on the substrate 80. In these islands, the light-emitting thyristors L2, L3, L4 . . . , the transfer thyristors T2, T3, T4 . . . and the like are formed similarly to the first island 141 to the third island 143. A description thereof is omitted.

Meanwhile, the start diode Ds is formed in a fourth island 144, the current limitation resistance R2 is formed in a fifth island 145, and the current limitation resistance R1 is formed in the sixth island 146.

On the back surface of the substrate 80, back-side common electrodes as the Vsub terminals are formed.

The light-emitting thyristor L1 formed in the first island 141 includes the substrate 80 set as the anode terminal, an n-type ohmic electrode 121 set as the cathode terminal, and a p-type ohmic electrode 131 set as the gate terminal Gl1. Here, the n-type ohmic electrode 121 is formed in a region 111 of the n-type fourth semiconductor layer 84, while the p-type ohmic electrode 131 is formed on the p-type third semiconductor layer 83 exposed by removing the n-type fourth semiconductor layer 84 by etching. The surface of the n-type fourth semiconductor layer 84 except a portion on which the n-type ohmic electrode 121 is formed emits light, when the light-emitting thyristor L1 is in an ON state.

Furthermore, the memory thyristor M1 formed in the first island 141 includes the substrate 80 set as the anode terminal, an n-type ohmic electrode 122 set as the cathode terminal, and the p-type ohmic electrode 131 set as the gate terminal Gm1. Here, the n-type ohmic electrode 122 is formed in a region 112 of the n-type fourth semiconductor layer 84. Note that, the p-type ohmic electrode 131 is common to the gate terminal Gl1 of the light-emitting thyristor L1.

The power supply line resistances Rm1 and Rt1 formed in the second island 142 are formed between p-type ohmic electrodes (a p-type ohmic electrode 132 and the like) formed on the p-type third semiconductor layer 83. That is, the power supply line resistances Rm1 and Rt1 include the p-type third semiconductor layer 83 as a resistive layer.

The transfer thyristor T1 formed in the third island 143 includes the substrate 80 set as the anode terminal, an n-type ohmic electrode 124 set as the cathode terminal, and a p-type ohmic electrode 133 set as the gate terminal Gt1. Here, the n-type ohmic electrode 124 is formed in a region 114 of the n-type fourth semiconductor layer 84, while the p-type ohmic electrode 133 is formed on the p-type third semiconductor layer 83 exposed by removing the n-type fourth semiconductor layer 84 by etching. Similarly, the connecting diode Dm1 formed in the third island 143 includes an n-type ohmic electrode 123, which is set as the cathode terminal, in a region 113 of the n-type fourth semiconductor layer 84, and the p-type ohmic electrode 133, which is set as the anode terminal, on the p-type third semiconductor layer 83 exposed by removing the n-type fourth semiconductor layer 84.

Although not shown in FIG. 7B, the coupling diode Dc1 is also formed similarly to the connecting diode Dm1.

The start diode Ds formed in the fourth island 144 includes an n-type ohmic electrode 126, which is set as the cathode terminal, provided on the n-type fourth semiconductor layer 84, and a p-type ohmic electrode 135, which is set as the anode terminal, on the p-type third semiconductor layer 83 exposed by removing the n-type fourth semiconductor layer 84.

The current limitation resistances R2 and R1 respectively formed in the fifth island 145 and the sixth island 146 include the p-type third semiconductor layer 83 set as a resistive layer, similarly to the power supply line resistances Rt1 and Rm1.

A description will be given of connecting relationships in FIG. 7A.

Both the gate terminal Gl1 of the light-emitting thyristor L1 and the gate terminal Gm1 of the memory thyristor M1 in the first island 141 are the p-type ohmic electrode 131, which is connected to the p-type ohmic electrode 132 of the power supply line resistance Rm1 in the second island 142. Moreover, the p-type ohmic electrode 132 is connected to the n-type ohmic electrode 123 that is the cathode terminal of the connecting diode Dm1 in the third island 143. Additionally, the n-type ohmic electrode 122 that is the cathode terminal of the memory thyristor M1 in the first island 141 is connected to one terminal of the resistance Rn1. The other terminal of the resistance Rn1 is connected to the memory signal line 74A. The memory signal line 74A is connected to the ϕmA terminal.

The other terminal of the power supply line resistance Rm1 in the second island 142 is connected to the power supply line 71. The other terminal of the power supply line resistance Rt1 is common to the other terminal of the power supply line resistance Rm1, and is connected to the power supply line 71, which is connected to the Vga terminal.

The p-type ohmic electrode 133 that is the anode terminal of the connecting diode Dm1 in the third island 143 is the gate terminal Gt1 of the transfer thyristor T1, and is connected to the cathode terminal of the start diode Ds in the fourth island 144.

A cathode terminal of the coupling diode Dc1 in the third island 143 is connected to the gate terminal Gt2 of the adjacent transfer thyristor T2. Furthermore, the cathode terminal of the coupling diode Dc1 is connected to the other terminal of the power supply line resistance Rt1.

The n-type ohmic electrode 121 that is the cathode terminal of the light-emitting thyristor L1 in the first island 141 is connected to the ϕI terminal through the light-up signal line 75.

The n-type ohmic electrode 124 that is the cathode terminal of the transfer thyristor T1 in the third island 143 is connected to the first transfer signal line 72, and is connected to the ϕ1 terminal through the current limitation resistance R1 in the sixth island 146. An n-type ohmic electrode that is the cathode terminal of the transfer thyristor T2 is connected to the second transfer signal line 73, and is connected to the ϕ2 terminal through the current limitation resistance R2 in the fifth island 145. Additionally, the p-type ohmic electrode 135 that is the anode terminal of the start diode Ds in the fourth island 144 is also connected to the second transfer signal line 73.

The connection relationships between the other light-emitting thyristors L, transfer thyristors T, memory thyristors M, coupling diodes Dc, connecting diodes Dm, power supply line resistances Rm and Rt, and resistances Rn are the same as the above, although the description thereof is omitted here.

The circuit configuration of the light-emitting chip C shown in FIG. 6 is as described above.

Next, a description will be given of the operation of the light-emitting portion 63. As shown in FIG. 4, the first transfer signal ϕ1 and the second transfer signal ϕ2 are transmitted in common to each of the light-emitting chips C (C1 to C60) forming the light-emitting portion 63. As shown in FIGS. 5A and 5B, each of the light-emitting chips C (C1 to C60) includes the SLED_A and the SLED_B. Additionally, a pair of the first transfer signal ϕ1 and the second transfer signal ϕ2 is also transmitted in common to the SLED_A and the SLED_B. Accordingly, the first transfer signal ϕ1 and the second transfer signal ϕ2 are transmitted in common to all the SLEDs in the light-emitting chips C (C1 to C60), and thereby all the SLEDs are driven in parallel.

Meanwhile, the memory signals ϕm (ϕm1A to ϕm60A and ϕm1B to ϕm60B) that are different for each of the SLEDs are transmitted on the basis of image data. Additionally, regarding every two of the light-emitting chips C (C1 to C60) as a pair, each of the light-up signals ϕI (ϕI1 to ϕI30) are transmitted in common to the corresponding pair of the light-emitting chips C (C1 to C60).

To be short, in the first exemplary embodiment, the first transfer signal ϕ1 and the second transfer signal ϕ2 are transmitted in common to all the SLEDs. On the other hand, the memory signals ϕm are individually transmitted to each of the SLEDs. Each of the light-up signals ϕI is transmitted in common to the SLEDs in the corresponding pair of two of the light-emitting chips C. Since all the SLEDs are similarly operated in parallel, the operation of the light-emitting portion 63 is recognized if that of the part of the SLED_A of the light-emitting chip C1 is described. Hereinafter, the operation of the light-emitting chips C will be described by taking the SLED_A of the light-emitting chip C1 as an example.

Figure 8:
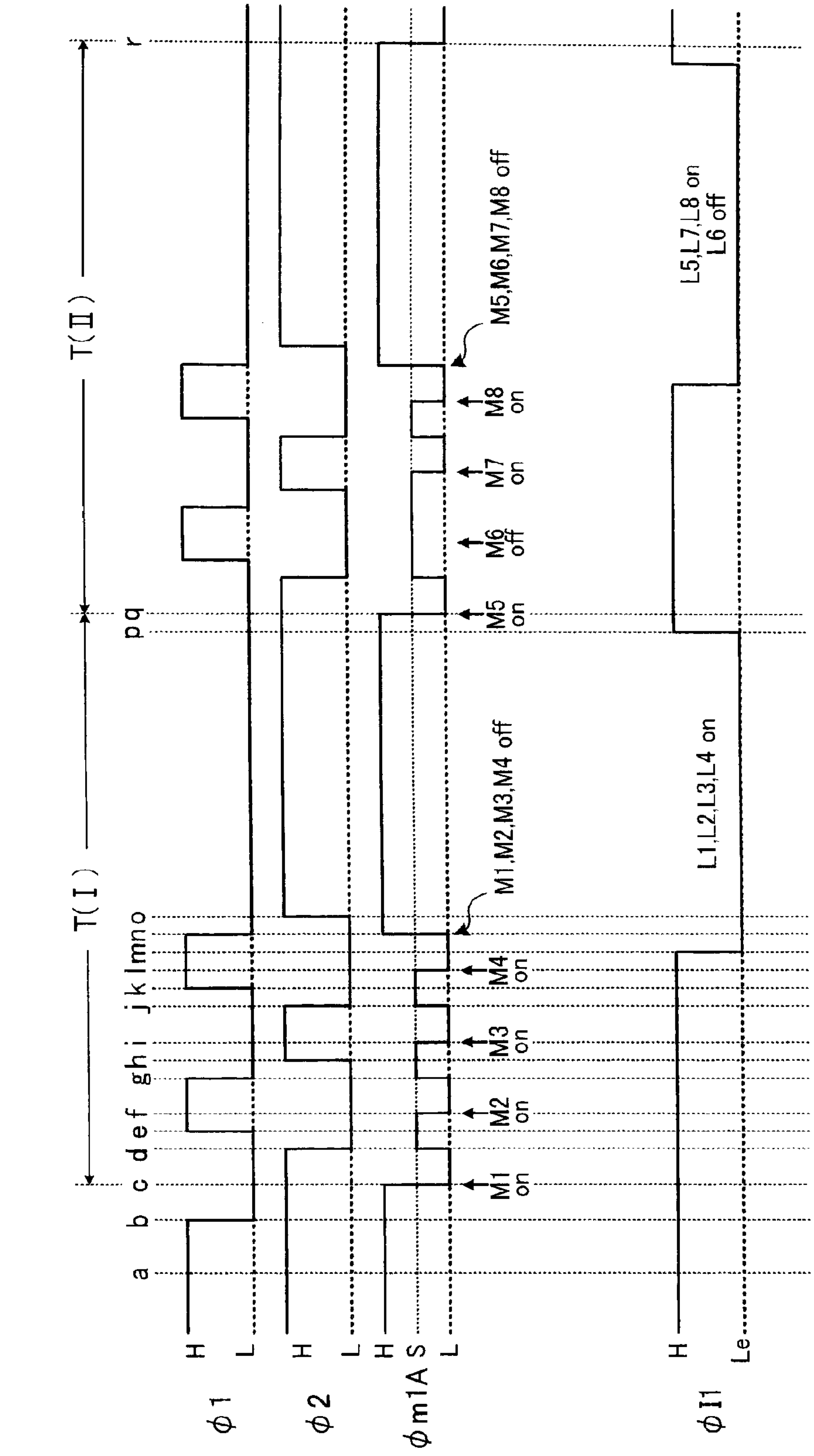
FIG. 8 is a timing chart for explaining the operation of the light-emitting chip in the first exemplary embodiment.

FIG. 8 is a timing chart for explaining the operation of the light-emitting chip C in the first exemplary embodiment. Here, the part of the SLED_A of the light-emitting chip C1 is described as an example. FIG. 8 shows a case where light-up control is performed on the groups each formed of four light-emitting thyristors L shown in FIG. 5A. Note that FIG. 8 illustrates only a part in which the light-up control is performed on the groups #I and #II of the light-emitting thyristors L.

In a period T(I) in FIG. 8, all the four light-emitting thyristors L1 to L4 in the group #I are caused to light up. In a period T(II), the light-emitting thyristors L5, L7 and L8 among the four light-emitting thyristors L5 to L8 in the group #II are caused to light up. When the periods T(I), T(II) . . . are not distinguished, they are called period T.

In FIG. 8, passing of time is illustrated in alphabetical order from a time point a to a time point r. Light-up control is performed on the light-emitting thyristors L1 to L4 shown as the group #I in FIG. 5A, in the period T(I) from a time point c to a time point q. Light-up control is performed on the light-emitting thyristors L5 to L8 shown as the group #II in FIG. 5A, in the period T(II) from the time point q to the time point r. Although not shown in FIG. 8, the period T(III) in which light-up control is performed on the light-emitting thyristors L9 to L12 shown as the group #III in FIG. 5A follows the period T(II). In a case where the SLED_A of the light-emitting chip C1 (C) includes 128 light-emitting thyristors L, light-up control is performed on the groups each including four of the light-emitting thyristors, up to L128.

Signal waveforms in the periods T(I), T(II) . . . are repeated in the same manner except for the memory signal ϕm1A (ϕm) that changes depending on image data. Therefore, only the period T(I) from the time point c to the time point q is described below. Note that in the period from the time point a to the time point c, the light-emitting chip C1 (C) starts to operate. The signals in this period will be described along with the description on operations.

A description will be given of signal waveforms of the first transfer signal ϕ1, the second transfer signal ϕ2, the memory signal ϕm1A (ϕm) and the light-up signal ϕI1 (ϕI) in the period T(I).

The first transfer signal ϕ1 has a low-level potential (hereinafter, referred to as "L") at the time point c, changes from "L" to a high-level potential (hereinafter, referred to as "H") at a time point e, and then changes from "H" to "L" at a time point g. Subsequently, the first transfer signal ϕ1 changes from "L" to "H" at a time point k, and changes from "H" to "L" at a time point n. Thereafter, the first transfer signal ϕ1 remains at "L" until the time point q.

The second transfer signal ϕ2 is "H" at the time point c, changes from "H" to "L" at a time point d, and then changes from "L" to "H" at a time point h. Subsequently, the second transfer signal ϕ2 changes from "H" to "L" at a time point j and changes from "L" to "H" at a time point o. Thereafter, the second transfer signal ϕ2 remains at "H" until the time point q.

Here, in the period between the time points c and q, the first transfer signal ϕ1 and the second transfer signal ϕ2, when compared with each other, repeat "H" and "L" alternately to each other with intervening periods in which both signals are set at "L" (for example, a period between the time points d and e and a period between the time points g and h). The first transfer signal ϕ1 and the second transfer signal ϕ2 do not have a period when the potential thereof are set at "H" simultaneously.

The memory signal ϕm1A (ϕm) changes from "H" to "L" at the time point c and changes from "L" to a potential of a memory level (hereinafter, referred to as "S") at the time point d. Note that, although a detailed description will be given later, the memory level "S" is a level (potential) between "H" and "L," and is a potential level that may maintain an ON state of the memory thyristor M having been turned on.

The memory signal ϕm1A (ϕm) changes from "S" to "L" at a time point f and changes from "L" to "S" at the time point g. Further, the memory signal ϕm1A (ϕm) changes from "S" to "L" at a time point i, changes from "L" to "S" at the time point j, changes from "S" to "L" at a time point l, and then changes from "L" to "H" at the time point n. The memory signal ϕm1A (ϕm) remains at "H" at the time point q.

That is, the memory signal ϕm has three levels that are "L" as an example of a first potential, "S" as an example of a second potential and "H" as an example of a third potential.

Here, a description is given of the relationship between the memory signal ϕm1A (ϕm) and the first transfer signal ϕ1 and second transfer signal ϕ2. In the period when only one of the first transfer signal ϕ1 and the second transfer signal ϕ2 is set at "L," the memory signal ϕm1A (ϕm) is set at "L." For example, the memory signal ϕm1A (ϕm) is set at "L" in the period between the time points c and d when only the first transfer signal ϕ1 is set at "L," and in the period between the time points f and g when only the second transfer signal ϕ2 is set at "L."

Meanwhile, in the first exemplary embodiment, the light-up signal ϕI1 (ϕI) is a signal for supplying a current to the light-emitting thyristors L so that the light-emitting thyristors L emit light (light up), as will be described later.

The light-up signal ϕI1 is set at "H" at the time point c, and changes from "H" to a potential of a light-up level (hereinafter, referred to as "Le") at a time point m. The light-up signal ϕI1 (ϕI) changes from "Le" to "H" at a time point p, and then remains at "H" at the time point q.

The light-up level "Le" is a level (potential) between "H" and "L," and is a potential level that may cause the light-emitting thyristor L being set ready to light up to turn on and thereby to light up (emit light), which will be described later in detail.

Before the operation of the SLED_A of the light-emitting chip C1 (C) is described, the fundamental operation of the thyristor (the transfer thyristor T, the memory thyristor M, and the light-emitting thyristor L) will be described. The thyristor is a semiconductor device including three terminals: an anode terminal, a cathode terminal, and a gate terminal.

In the description below, for example, the reference potential Vsub supplied to the anode terminal (Vsub terminal) of the thyristor set on the substrate 80 as shown in FIG. 6 is set at 0 V ("H"), while the power supply potential Vga supplied to the Vga terminal is set at −3.3 V ("L"). The thyristor is formed of stacked layers of p-type semiconductor layers and n-type semiconductor layers such as GaAs or GaAlAs, as shown in FIGS. 7A and 7B, and a diffusion potential (forward potential) Vd of a pn junction is set at 1.5 V.

The thyristor gets turned on (ON) when a potential lower (greater in a negative sense) than a threshold voltage V is applied to the cathode terminal. When the thyristor gets turned on, the thyristor is set at a state (ON state) in which the current flows through the anode terminal and the cathode terminal. Here, the threshold voltage of the thyristor is obtained by subtracting the diffusion potential Vd from the potential of the gate terminal. Accordingly, if the potential of the gate terminal of the thyristor is −1.5 V, the threshold voltage is −3 V. In other words, the thyristor gets turned on when a voltage lower than −3 V is applied to the cathode terminal.

After the thyristor gets turned on, the gate terminal of the thyristor has a potential almost equal to that of the anode terminal of the thyristor. Since the anode terminal thereof is set at 0 V, the potential of the gate terminal of the thyristor becomes −0.1 V. This value is nearly 0 V, and thus a description is given, assuming that the potential of the gate terminal is 0 V, for ease of description. Further, the cathode terminal of the thyristor has the diffusion potential Vd, which is −1.5 V in this case.

Once the thyristor gets turned on, the thyristor maintains the ON state until the potential of the cathode terminal reaches a potential higher (lower in a negative sense) than the potential (maintaining voltage) necessary for the thyristor to maintain the ON state. Since the potential of the cathode terminal of the thyristor in the ON state is −1.5 V here, the ON state is maintained after a potential that is lower than −1.5 V is applied to the cathode terminal and the current necessary to maintain the ON state is supplied.

Note that when the cathode terminal is set at "H" (0 V) to have the same potential as that of the anode terminal, the thyristor is no longer capable of maintaining the ON state and gets turned off (OFF). When being turned off, the thyristor is set at a state (OFF state) in which the current does not flow through the anode terminal and the cathode terminal. In other words, once the thyristor is set in the ON state, the thyristor maintains a state in which the current flows, and the thyristor may not get turned off depending on the potential of the gate terminal.

Accordingly, the thyristor has a function to maintain (memorize and hold) the ON state. In such a thyristor, the potential (maintaining voltage) for maintaining the ON state may be lower than the potential for turning on the thyristor.

Note that the light-emitting thyristor L lights up (emits light) when getting turned on and is put out (does not emit light) when getting turned off.

With reference to FIG. 6, an operation of the light-emitting portion 63 and the light-emitting chip C1 will be described according to the timing chart shown in FIG. 8.

(Initial State)

At the time point a in the timing chart shown in FIG. 8, the Vsub terminals of the light-emitting chips C (C1 to C60) of the light-emitting portion 63 are set at the reference potential Vsub ("H" (0 V)). On the other hand, the Vga terminals thereof are set at the power supply potential Vga ("L" (−3.3 V)) (see FIG. 4).

The transfer signal generating unit 130 sets both the first transfer signal ϕ1 and the second transfer signal ϕ2 at "H" (0 V). The memory signal generating unit 120 sets the memory signals ϕm (ϕm1A to ϕm60A and ϕm1B to ϕm60B) at "H" (0 V) (see FIG. 4). Similarly, the light-up signal generating unit 110 sets the light-up signals ϕI (ϕI1 to ϕI30) at "H" (0 V) (see FIG. 4). By these settings, the first transfer signal line 106 is set at "H," and the first transfer signal line 72 of each light-emitting chip C is set at "H" through the ϕ1 terminal of each light-emitting chip C of the light-emitting portion 63. Similarly, the second transfer signal line 107 is set at "H," and the second transfer signal line 73 of each light-emitting chip C is set at "H" through the ϕ2 terminal of each light-emitting chip C. Each of the memory signal lines 108 (108_1A to 108_60A and 108_1B to 108_60B) is set at "H," and the memory signal lines 74A and 74B of each light-emitting chip C are set at "H" through the ϕmA terminal and the ϕmB terminal of each light-emitting chip C. Further, each of the light-up signal lines 109 (109_1 to 109_30) is set at "H," and the light-up signal line 75 of each light-emitting chip C is set at "H" through the ϕI terminal of each light-emitting chip C.

Next, taking the part of the SLED_A of the light-emitting chip C1 as an example, the operation of the SLED_A and the SLED_B will be described. The other SLED_As and the SLED_Bs of the light-emitting chips C1 to C60 are operated in parallel with the SLED_A of the light-emitting chip C1.

The anode terminals of the transfer thyristors T1, T2, T3 . . . , the memory thyristors M1, M2, M3 . . . , and the light-emitting thyristors L1, L2, L3 . . . are connected to the Vsub terminal, whereby "H" (0 V) is supplied thereto.

On the other hand, the cathode terminals of the odd-numbered transfer thyristors T1, T3, T5 . . . are connected to the first transfer signal line 72 that is set at "H," while the cathode terminals of the even-numbered transfer thyristors T2, T4, T6 . . . are connected to the second transfer signal line 73 that is set at "H." Since the anode terminal and cathode terminal of each transfer thyristor T are set at "H," each transfer thyristor T is in the OFF state.

Similarly, the cathode terminals of the memory thyristors M1, M2, M3 . . . are connected to the memory signal line 74A that is set at "H." Since the anode terminal and cathode terminal of each memory thyristor M are set at "H," each memory thyristor M is in the OFF state.

Furthermore, the cathode terminals of the light-emitting thyristors L1, L2, L3 . . . are connected to the light-up signal line 75 that is set at "H." Since the anode terminal and the cathode terminal of each light-emitting thyristor L are set at "H," each light-emitting thyristor L is in the OFF state.

The gate terminals Gt of the transfer thyristors T are set through the respective power supply line resistances Rt at the power supply potential Vga ("L" (−3.3 V)) except for the gate terminals Gt1 and Gt2 to be described later.

Similarly, the gate terminals Gm of the memory thyristors M are set through the respective power supply line resistances Rm at the power supply potential Vga ("L" (−3.3 V)) except for the gate terminal Gm1 to be described later. Further, the gate terminals Gl of the light-emitting thyristors L are connected to the respective gate terminals Gm of the memory thyristors M. Accordingly, the potentials of the gate terminals Gl of the light-emitting thyristors L are also set at "L" except for the gate terminal Gl1.

The gate terminal Gt1 on the one end side of the transfer thyristor array in FIG. 6 is connected to the cathode terminal of the start diode Ds, as described above. The anode terminal of the start diode Ds is connected to the second transfer signal line 73 that is set at "H." Since the start diode Ds has the cathode terminal set at "L" (−3.3 V) and the anode terminal set at "H" (0 V), a voltage is applied in a forward-biased direction (forward bias). The gate terminal Gt1, to which the cathode terminal of the start diode Ds is connected, is set at a value of −1.5 V obtained by subtracting the diffusion potential Vd (1.5 V) of the start diode Ds from "H" (0 V) of the anode terminal.

As described above, the threshold voltage of the transfer thyristor T1 is −3 V obtained by subtracting the diffusion potential Vd (1.5 V) from the potential (−1.5 V) of the gate terminal Gt1.

The gate terminal Gt2 of the transfer thyristor T2 located adjacent to the transfer thyristor T1 is connected to the gate terminal Gt1 through the coupling diode Dc1. Thus, the potential of the gate terminal Gt2 of the transfer thyristor T2 is −3 V obtained by subtracting the diffusion potential Vd (1.5 V) of the coupling diode Dc1 from the potential (−1.5 V) of the gate terminal Gt1. Therefore, the threshold voltage of the transfer thyristor T2 is −4.5 V.

Similarly, the gate terminal Gm1 of the memory thyristor M1 (the same applies to the gate terminal Gl1 of the light-emitting thyristor L1) is connected to the gate terminal Gt1 through the connecting diode Dm1. Thus, the potential of the gate terminal Gm1 (gate terminal Gl1) of the memory thyristor M1 is −3 V obtained by subtracting the diffusion potential Vd (1.5 V) of the connecting diode Dm1 from the potential (−1.5 V) of the gate terminal Gt 1. Therefore, the threshold voltage of the memory thyristor M1 (and the light-emitting thyristor L1) is −4.5 V.

Potentials of the gate terminals Gt, Gm and Gl other than the gate terminals Gt1, Gt2, Gm1 and Gl1 are the power supply potential Vga (−3.3 V). Thus, threshold voltages of the transfer thyristors T, memory thyristors M and light-emitting thyristors L other than the transfer thyristors T1 and T2, the memory thyristor M1 and the light-emitting thyristor L1 are −4.8 V.

(Operation Start)

At the time point b, the first transfer signal ϕ1 changes from "H" (0 V) to "L" (−3.3 V). Then, the transfer thyristor T1, whose threshold voltage is −3 V, gets turned on. The odd-numbered transfer thyristors T having numbers 3 or more do not get turned on because the threshold voltages thereof are −4.8 V. Meanwhile, the transfer thyristor T2 does not get turned on, because the first transfer signal ϕ1 is at "H" even though the threshold voltage thereof is −4.5 V.

That is, only the transfer thyristor T1 gets turned on at the time point b.

When the transfer thyristor T1 gets turned on, the potential of the gate terminal Gt1 becomes that of the anode terminal, namely, "H" (0 V), as mentioned above. The potential of the cathode terminal (first transfer signal line 72) becomes −1.5 V obtained by subtracting the diffusion potential Vd (1.5 V) from the potential "H" (0 V) of the anode terminal.

The coupling diode Dc1 is set to be forward-biased because the potential of the gate terminal Gt1 is "H" and the potential of the gate terminal Gt2 is −3 V. Then, the potential of the gate terminal Gt2 becomes −1.5 V obtained by subtracting the diffusion potential Vd (1.5 V) of the coupling diode Dc1 from the potential (0 V) of the gate terminal Gt1. Thus, the threshold voltage of the transfer thyristor T2 is −3 V.

The potential of the gate terminal Gt3, which is connected to the gate terminal Gt2 of the transfer thyristor T2 through the coupling diode Dc2, becomes −3 V. Thus, the threshold voltage of the transfer thyristor T3 is −4.5 V. The potentials of the gate terminals Gt of the transfer thyristors T having numbers 4 or more are −3.3 V of the power supply potential Vga, and the threshold voltages thereof are maintained at −4.8 V.

When the transfer thyristor T1 gets turned on, the potential of the gate terminal Gt1 becomes "H" (0 V). Then, the potential of the gate terminal Gt1 is "H" (0 V) and the potential of the gate terminal Gm1 is −3 V, and thus the connecting diode Dm1 has a forward bias. The potentials of the gate terminal Gm1 and the gate terminal Gl1 become −1.5 V obtained by subtracting the diffusion potential Vd (1.5 V) of the connecting diode Dm1 from the potential "H" (0 V) of the gate terminal Gt1. Therefore, the threshold voltages of the memory thyristor M1 and the light-emitting thyristor L1 are −3 V.

Note that the gate terminal Gm2 of the adjacent memory thyristor M2 (the same applies to the gate terminal Gl2 of the light-emitting thyristor L2) is −3 V because the coupling diode Dc1 and the connecting diode Dm2 are interposed between the gate terminal Gt1 being at "H" (0 V) and the memory thyristor M2. Therefore, the threshold voltage of the memory thyristor M2 (the same applies to the light-emitting thyristor L2) is −4.5 V.

The potential of the gate terminal Gm of the memory thyristor M (the gate terminal Gl of the light-emitting thyristor L) having a number 3 or more is "L" (−3.3 V) of the power supply potential Vga because the potential thereof is not influenced by that of the gate terminal Gt1 being at "H" (0 V). Thus, the threshold voltages of the memory thyristors M (light-emitting thyristors L) having numbers 3 or more are −4.8 V.

Note that because the second transfer signal ϕ2 is "H" at the time point b, the transfer thyristor T2 and the even-numbered transfer thyristors T having numbers 4 or more do not get turned on. Further, because the memory signal ϕm1A (ϕm) is "H" and the light-up signal ϕI1 (ϕI) is also "H," neither the memory thyristors M nor the light-emitting thyristors L get turned on.

Thus, the transfer thyristor T1 is in the ON state right after the time point b (after the state of the thyristor or the like is changed due to the change in the potential of the signal at the time point b).

(Operation State)

At the time point c, the memory signal ϕm1A (ϕm) changes from "H" (0 V) to "L" (−3.3 V). Then, the memory thyristor M1 gets turned on because the threshold voltage thereof is −3 V, as mentioned above. The memory thyristors M having numbers 2 or more do not get turned on because the threshold voltages thereof are lower than "L" (−3.3 V).

That is, only the memory thyristor M1 gets turned on.

When the memory thyristor M1 gets turned on, the potential of the gate terminal Gm1 becomes "H" (0 V), similarly to the transfer thyristor T1. Then, the potential of the gate terminal Gl1 of the light-emitting thyristor L1 connected to the gate terminal Gm1 becomes "H" (0 V), and thus the threshold voltage of the light-emitting thyristor L1 is −1.5 V.

However, because the light-up signal ϕI1 (ϕI) is "H," no light-emitting thyristor L gets turned on.

Thus, the transfer thyristor T1 and the memory thyristor M1 are maintained in the ON state right after the time point c.

At this time, the potential of the cathode terminal of the memory thyristor M1 is −1.5 V obtained by subtracting the diffusion potential Vd (1.5 V) from "H" (0 V). However, the memory thyristor M1 is connected to the memory signal line 74A through the resistance Rn1. Therefore, the potential of the memory signal line 74A is maintained at "L" (−3.3 V). Conversely, the resistances Rn are set at values with which the potential of the memory signal line 74A is maintained at "L."

The operations of the thyristors (the transfer thyristors T, the memory thyristors M, and the light-emitting thyristors L) and the diodes (the coupling diodes Dc and the connecting diodes Dm) have so far been described separately. Instead, the operations of the thyristors and the diodes may be described as follows.

Specifically, when the thyristor gets turned on, the potential of the gate terminal (the gate terminal Gt, the gate terminal Gm and the gate terminal Gl) thereof becomes "H" (0 V). The potential of the gate terminal connected through one step (one piece) of a forward-biased diode to the gate terminal whose potential is "H" (0 V) is −1.5 V obtained by subtracting the diffusion potential Vd (1.5 V) from "H" (0 V). The threshold voltage of the thyristor including this gate terminal is −3 V. Further, the potential of the gate terminal connected through two steps (two pieces serially connected to each other) of forward-biased diodes to the gate terminal whose potential is "H" (0 V) is −3 V obtained by subtracting a double value of the diffusion potentials Vd (1.5 V) therefrom. The threshold voltage of the thyristor including this gate terminal is −4.5 V. Furthermore, the gate terminal connected through three or more steps of the diodes to the gate terminal whose potential is "H" (0 V) is not influenced by the gate terminal being at "H" (0 V), and is maintained at the power supply potential Vga ("L" (−3.3 V)). Therefore, the threshold voltage of the thyristor including the gate terminal that is connected through three or more steps of the diodes is maintained at −4.8 V.

The thyristor including the gate terminal that is connected through one step of the diode to the gate terminal whose potential is "H" (0 V) gets turned on with the potential "L" (−3.3 V). Meanwhile, the thyristor including the gate terminal that is connected through two or more steps of the diodes does not get turned on with the potential "L" (−3.3 V).

That is, the thyristor including the gate terminal that is connected through one step of the diode to the gate terminal whose potential is "H" (0 V) gets turned on, and it is only necessary to focus this thyristor.

Hereinafter, a description will be given of only the thyristor including the gate terminal that is connected through one step of the diode to the gate terminal whose potential is "H" (0 V). A description of change in the potential or the threshold voltage of the gate terminal of the thyristor that does not get turned on will be omitted.

Referring back to FIG. 8, the operation of the light-emitting chip C1 (C) will be further described.

At the time point d, the memory signal ϕm1A (ϕm) changes from "L" to "S," and the second transfer signal ϕ2 changes from "H" to "L."

"S" is a level of a potential with which the memory thyristor M having got turned on may maintain the ON state. "S" is a potential with which the memory thyristor M being in the ON state maintains the ON state but the memory thyristor M being in the OFF state does not get turned on.

As mentioned above, the threshold voltage of the memory thyristor M intended to get turned on is −3 V. The potential of the cathode terminal of the memory thyristor M being in the ON state is −1.5 V obtained by subtracting the diffusion potential Vd. Therefore, "S" is set at a potential that is higher than −3 V of the threshold voltage of the memory thyristor M and lower than the potential (−1.5 V) of the cathode terminal being in the ON state (−3 V<"S"≤−1.5 V). Note that "S" needs to be set at a potential enough to supply a current with which the memory thyristor M being in the ON state maintains the ON state.

As described above, the memory thyristor M1 being in the ON state maintains the ON state even when the memory signal ϕm1A (ϕm) changes from "L" to "S."

On the other hand, when the second transfer signal ϕ2 changes from "H" to "L" at the time point d, the transfer thyristor T2, whose threshold voltage is −3 V, gets turned on.

When the transfer thyristor T2 gets turned on, the potential of the gate terminal Gt2 becomes "H" (0 V). Then, the threshold voltage of the transfer thyristor T3 connected through one step of the forward-biased diode (coupling diode Dc2) to the gate terminal Gt2 is set at −3 V. Similarly, the threshold voltages of each of the memory thyristor M2 and the light-emitting thyristor L2 connected through one step of the diode (connecting diode Dm2) to the gate terminal Gt2 are set at −3 V.

At this time, the transfer thyristor T1 maintains the ON state. Therefore, the potential of the first transfer signal line 72, to which the cathode terminal of the transfer thyristor T3 is connected, is maintained at −1.5 V that is the potential of the cathode terminal of the transfer thyristor T1 being in the ON state. Thus, the transfer thyristor T3 does not get turned on.

In addition, because the memory signal ϕm1A (ϕm) is "S," the memory thyristor M2 does not get turned on. Similarly, because the light-up signal ϕI1 (ϕI) is "H," the light-emitting thyristor L2 does not get turned on.

Note that at the time point d, the memory signal ϕm1A (ϕm) changes from "L" to "S," and simultaneously the second transfer signal ϕ2 changes from "H" to "L."

However, as the second transfer signal ϕ2 changes to "L," the transfer thyristor T2 gets turned on. Then, as described above, the threshold voltage of the memory thyristor M2 is set at −3 V. In order to prevent the memory thyristor M2 from getting turned on due to the memory signal ϕm1A (ϕm) maintained at "H," the memory signal ϕm1A (ϕm) will change from "L" to "S" before the second transfer signal ϕ2 changes from "H" to "L."

Right after the time point d, both the transfer thyristors T1 and T2 are in the ON state, and the memory thyristor M1 is also in the ON state.

At the time point e, the first transfer signal ϕ1 changes from "L" to "H." Then, the transfer thyristor T1 gets turned off because the potentials of the cathode terminal and the anode terminal thereof are both set at "H."

At this time, the gate terminal Gt1 of the transfer thyristor T1 is connected to the power supply line 71 through the power supply line resistance Rt1, and thus is set at "L" (−3.3 V) of the power supply potential Vga. Because the coupling diode Dc1 between the gate terminals Gt1 (−3.3 V) and Gt2 (0 V) has a reverse bias, the gate terminal Gt1 is not influenced by the gate terminal Gt2 being at "H" (0 V).

Similarly, because the memory thyristor M1 is in the ON state, the gate terminal Gm1 is set at "H" (0 V). However, because the connecting diode Dm1 between the gate terminal Gt1 (−3.3 V) and the gate terminal Gm1 (0 V) has a reverse bias, the gate terminal Gt1 is not influenced by the gate terminal Gm1 being at "H" (0 V).

In other words, the potential of the gate terminal connected through the reverse-biased diode to the gate terminal whose potential is at "H" (0 V) is not influenced by the latter gate terminal being at "H" (0 V). Note that the same applies to the other diodes as for the relationship of the potentials between the gate terminals connected through the reverse-biased diode, and therefore a description of the relationship of the other diodes is omitted herein.

Right after the time point e, the memory thyristor M1 and the transfer thyristor T2 maintain the ON state.

Next, at the time point f, the memory signal ϕm1A (ϕm) changes from "S" to "L" (−3.3 V), and then the memory thyristor M2, whose threshold voltage is −3 V, gets turned on.

The potential of the gate terminal Gm2 (Gl2) is "H" (0 V), and the threshold voltage of the light-emitting thyristor L2 is −1.5 V. However, because the light-up signal ϕI1 (0) is "H," the light-emitting thyristor L2 does not get turned on.

Thus, right after the time point f, both the memory thyristors M1 and M2 are in the ON state. The transfer thyristor T2 also maintains the ON state.

At the time point g, the memory signal ϕm1A (ϕm) changes from "L" to "S," and the first transfer signal ϕ1 changes from "H" to "L."

Even when the memory signal ϕm1A (ϕm) changes from "L" to "S," the memory thyristors M1 and M2 in the ON state maintain the ON state.

On the other hand, when the first transfer signal ϕ1 changes from "H" to "L," the transfer thyristor T3, whose threshold voltage is −3 V, gets turned on. The potential of the gate terminal Gt3 is set at "H" (0 V), and the threshold voltage of the transfer thyristor T4 connected through one step of the forward-biased diode (coupling diode Dc3) to the gate terminal Gt3 is set at −3 V. Similarly, the threshold voltage of each of the memory thyristor M3 and the light-emitting thyristor L3 connected through one step of the forward-biased diode (connecting diode Dm3) to the gate terminal Gt3 is set at −3 V.

At this time, the transfer thyristor T2 maintains the ON state. Accordingly, the potential of the second transfer signal line 73, to which the cathode terminal of the transfer thyristor T2 is connected, is maintained at −1.5 V by the transfer thyristor T2 in the ON state. Therefore, the transfer thyristor T4 does not get turned on.

In addition, because the memory signal ϕm1A (ϕm) is "S," the memory thyristor M3 does not get turned on. Similarly, because the light-up signal ϕI1 (0) is "H," the light-emitting thyristor L3 does not get turned on.

At the time point g, the memory signal ϕm1A (ϕm) changes from "L" to "S," and simultaneously the first transfer signal ϕ1 changes from "H" to "L." Similarly to the time point d, the memory signal ϕm1A (ϕm) will change from "L" to "S" before the first transfer signal ϕ1 changes from "H" to "L."

Right after the time point g, the memory thyristors M1 and M2 are maintained in the ON state. Both the transfer thyristors T2 and T3 are in the ON state.

Next, at the time point h, the second transfer signal ϕ2 changes from "L" to "H." Then, similarly to the time point e, the transfer thyristor T2 gets turned off. The gate terminal Gt2 of the transfer thyristor T2 is set at "L" (−3.3 V) of the power supply potential Vga through the power supply line resistance Rt2.

Thus, right after the time point h, the memory thyristors M1 and M2, and the transfer thyristor T3 are maintained in the ON state.

At the time point i, the memory signal ϕm1A (ϕm) changes from "S" to "L" (−3.3 V). Similarly to the time point f, the memory thyristor M3, whose threshold voltage is −3 V, gets turned on. Then, the potential of the gate terminal Gm3 (Gl3) is set at "H" (0 V), and the threshold voltage of the light-emitting thyristor L3 is set at −1.5 V. However, because the light-up signal ϕI1 (ϕI) is "H," the light-emitting thyristor L3 does not get turned on.

Thus, right after the time point i, the memory thyristors M1, M2 and M3 are in the ON state. The transfer thyristor T3 is also maintained in the ON state.

At the time point j, the memory signal ϕm1A (ϕm) changes from "L" to "S," and the second transfer signal ϕ2 changes from "H" to "L."

Similarly to the time point g, even when the memory signal ϕm1A (ϕm) changes from "L" to "S," the memory thyristors M1, M2 and M3 in the ON state maintain the ON state.

On the other hand, when the second transfer signal ϕ2 changes from "H" to "L," the transfer thyristor T4, whose threshold voltage is −3 V, gets turned on. Then, the potential of the gate terminal Gt4 is set at "H" (0 V), and the threshold voltage of the transfer thyristor T5 connected through one step of the forward-biased diode (coupling diode Dc4) to the gate terminal Gt4 is set at −3 V. Similarly, the threshold voltage of each of the memory thyristor M4 and the light-emitting thyristor L4 connected through one step of the forward-biased diode (connecting diode Dm4) to the gate terminal Gt4 is set at −3 V.

At this time, the transfer thyristor T3 maintains the ON state. Because the potential of the first transfer signal line 72, to which the cathode terminal of the transfer thyristor T5 is connected, is maintained at −1.5 V by the transfer thyristor T3 in the ON state, the transfer thyristor T5 does not get turned on.

In addition, because the memory signal ϕm1A (ϕm) is "S," the memory thyristor M4 does not get turned on. Similarly, because the light-up signal ϕI1 is "H," the light-emitting thyristor L4 does not get turned on.

At the time point j, the memory signal ϕm1A (ϕm) changes from "L" to "S," and the second transfer signal ϕ2 changes from "H" to "L" simultaneously. Similarly to the time point d, the memory signal ϕm1A (ϕm) will change from "L" to "S" before the second transfer signal ϕ2 changes from "H" to "L."

Thus, right after the time point j, the memory thyristors M1, M2 and M3 are maintained in the ON state. The transfer thyristors T3 and T4 are in the ON state.

At the time point k, the first transfer signal ϕ1 changes from "L" to "H." Then, similarly to the time point h, the transfer thyristor T3 gets turned off. The gate terminal Gt3 of the transfer thyristor T3 is set at "L" (−3.3 V) of the power supply potential Vga through the power supply line resistance Rt3.

Thus, right after the time point k, the memory thyristors M1, M2 and M3, and the transfer thyristor T4 are maintained in the ON state.

At the time point l, the memory signal ϕm1A (ϕm) changes from "S" to "L." Then, similarly to the time point i, the memory thyristor M4, whose threshold voltage is −3 V, gets turned on. The potential of the gate terminal Gm4 (Gl4) is set at "H" (0 V), and accordingly the threshold voltage of the light-emitting thyristor L4 is set at −1.5 V. However, because the light-up signal ϕI1 is "H," the light-emitting thyristor L4 does not get turned on.

Right after the time point l, the memory thyristors M1, M2, M3 and M4 are in the ON state, and the transfer thyristor T4 is maintained in the ON state.

The memory thyristors M1, M2, M3 and M4 are in the ON state, and the gate terminals Gm1 (Gl1), Gm2 (Gl2), Gm3 (Gl3) and Gm4 (Gl4) thereof are all set at "H" (0 V). Accordingly, the threshold voltage of each of the light-emitting thyristors L1, L2, L3 and L4 is set at −1.5 V. Note that the gate terminal Gl5 of the light-emitting thyristor L5 located adjacent to the light-emitting thyristor L4 is connected through two steps of the forward-biased diodes (coupling diode Dc4 and connecting diode Dm5) to the gate terminal Gt4 being at "H" (0 V), whereby the threshold voltage thereof is −4.5 V. Further, the threshold voltages of the light-emitting thyristor L having numbers 6 or more are set at −4.8 V.

At the time point m, the potential of the light-up signal ϕI1 (ϕI) is set at "Le" (−3 V<"Le"≤−1.5 V) that is lower than the above-mentioned threshold voltage (−1.5 V) of each of the light-emitting thyristors L1, L2, L3 and L4 and higher than the threshold voltage (−3 V) of the light-emitting thyristor L5 at the time point n to be described later.

Since the threshold voltage (−1.5 V) of each of the light-emitting thyristors L1, L2, L3 and L4 is higher than "Le," the light-emitting thyristors L1, L2, L3 and L4 get turned on and light up (emit light).

On the other hand, the light-emitting thyristor L5 and the light-emitting thyristors L having numbers 6 or more do not get turned on because the threshold voltages thereof are lower than "Le."

That is, in the first exemplary embodiment, plural (four in this case) light-emitting thyristors L are caused to light up simultaneously.

Note that, in the first exemplary embodiment, "lighting up simultaneously" refers to a state in which the plural light-emitting thyristors L light up in parallel by change of the light-up signal ϕI1 (ϕI) from "H" to "Le."

Right after the time point m, the light-emitting thyristors L1, L2, L3 and L4, and the memory thyristors M1, M2, M3 and M4, and the transfer thyristors T4 are in the ON state.

At the time point n, the memory signal ϕm1A (ϕm) changes from "L" to "H," and the first transfer signal ϕ1 changes from "H" to "L."

As the memory signal ϕm1A (ϕm) changes from "L" to "H," the potentials of the cathode terminals of the memory thyristors M1, M2, M3 and M4 are set at the same potential as "H" (0 V) of the anode terminals thereof. Thus, the memory thyristors M1, M2, M3 and M4 get turned off.

On the other hand, when the first transfer signal ϕ1 changes from "H" to "L," the transfer thyristor T5, whose threshold voltage is −3 V, gets turned on. The potential of the gate terminal Gt5 is set at "H" (0 V), and the threshold voltage of the transfer thyristor T6, connected through one step of the forward-biased diode (coupling diode Dc5) to the gate terminal Gt5, is set at −3 V. Similarly, the threshold voltage of each of the memory thyristor M5 and the light-emitting thyristor L5, connected through one step of the forward-biased diode (connecting diode Dm5) to the gate terminal Gt5, is set at −3 V.

At this moment, the transfer thyristor T4 maintains its ON state. The potential of the second transfer signal line 73, to which the cathode terminal of the transfer thyristor T6 is connected, is maintained at −1.5 V with the transfer thyristor T4 in the ON state, and therefore the transfer thyristor T6 does not get turned on.

Meanwhile, if the memory signal ϕm1A (ϕm) is "H," the memory thyristor M5 does not get turned on. On the other hand, because the light-up signal ϕI1 is at the light-up level "Le" (−3 V<"Le"≤−1.5 V), the light-emitting thyristor L5 does not get turned on and remains being put out.

At the time point n, the memory signal ϕm1A (ϕm) changes from "L" to "H," and the first transfer signal ϕ1 changes from "H" to "L" simultaneously. However, setting the first transfer signal ϕ1 at "L" causes the transfer thyristor T5 to get turned on, and the memory signal ϕm1A (ϕm) being at "L" causes the memory thyristor M5 having −3 V of the threshold voltage to get turned on. In order to prevent this, the memory signal ϕm1A (ϕm) will change from "L" to "H" before the first transfer signal ϕ1 changes from "H" to "L."

At this time, in order to prevent the light-emitting thyristor L5, whose threshold voltage is −3 V, from lighting up (emitting light), the potential range of the light-up signal ϕI1 (ϕI) is set at "Le" (−3 V<"Le"≤−1.5 V).

Right after the time point n, the light-emitting thyristors L1, L2, L3 and L4 are maintained in the light-up (ON) state. The transfer thyristors T4 and T5 are also in the ON state.

At the time point o, the second transfer signal ϕ2 changes from "L" to "H." Then, the transfer thyristor T4 gets turned off. The gate terminal Gt4 of the transfer thyristor T4 is set at "L" (−3.3 V) of the power supply potential Vga through the power supply line resistance Rt4.

Thus, right after the time point o, the light-emitting thyristors L1, L2, L3 and L4 are maintained in the light-up (ON) state. The transfer thyristor T5 maintains the ON state.

At the time point p, the light-up signal ϕI1 (ϕI) changes from "Le" to "H." Then the potentials of the cathode terminals of the light-emitting thyristors L1, L2, L3 and L4 are set at "H" (0 V) that is the same as those of the anode terminals thereof. Thus, the light-emitting thyristors L1, L2, L3 and L4 do not maintain the light-up (ON) state and are put out (get turned off). A period from the time point m to the time point p is the light-up period of the light-emitting thyristors L1, L2, L3 and L4. The light-up periods of the light-emitting thyristors L1, L2, L3 and L4 are the same.

If the memory signal ϕm1A (ϕm) changes from "H" to "L" to cause the memory thyristor M5 to get turned on in the period between the time points o and p during which the light-up signal ϕI1 (ϕI) is "Le," the gate terminal Gm5 (equivalent to the gate terminal Gl5) is set at "H" (0 V), and the threshold voltage of the light-emitting thyristor L5 becomes −1.5 V. This causes the light-emitting thyristor L5 to get turned on to light up (emit light).

In view of the above, in the first exemplary embodiment, the memory signal ϕm1A (ϕm) does not change to "L" until the time point p when the light-emitting thyristors L1, L2, L3 and L4 are put out elapses.

Thus, right after the time point p, only the transfer thyristor T5 is maintained in the ON state.

At the time point q, the memory signal ϕm1A (ϕm) changes from "H" to "L." Then, similarly to the time point c, the memory thyristor M5, whose threshold voltage is −3 V, gets turned on. The subsequent operations are repeated in the same manner as the operation after the time point c, and the light-up control on the light-emitting thyristors L5 to L8 is performed in the period T(II) in the same manner as the period T(I). A description of the subsequent operations is omitted.

As described above, the SLED_As of the light-emitting chip C2 to C60 and the SLED_Bs of the light-emitting chips C1 to C60 in the light-emitting portion 63 are operated in parallel with the SLED_A of the light-emitting chip C1. Thus, in the SLED_As of the light-emitting chips C2 to C60 and the SLED_Bs of the light-emitting chips C1 to C60 in the light-emitting portion 63, the light-up control is performed in parallel on the respective light-emitting thyristors L1 to L4 in the period T(I) of the light-up control for the light-emitting thyristors L1 to L4 in the SLED_A of the light-emitting chip C1.

Similarly, in the SLED_As of the light-emitting chips C2 to C60 and the SLED_Bs of the light-emitting chips C1 to C60 in the light-emitting portion 63, the light-up control is performed in parallel on the respective light-emitting thyristors L5 to L8 in the period T(II) of the light-up control for the light-emitting thyristors L5 to L8 in the SLED_A of the light-emitting chip C1. The same is true for the other light-emitting thyristors L.

However, the light-up periods of the light-emitting thyristors L (for example, the period from the time point m to the time point p in the period T(I)) depend on the light-up signal ϕI1 (ϕI). Thus, the light-up periods of the light-emitting thyristors L may be set so as to be different for each pair of the light-emitting chips C to which the light-up signal ϕI are transmitted in common. Additionally, the light-up periods of the light-emitting thyristors L may be set so as to be different for each of the periods T(I), T(II) . . . of the light-up control.

For example, variation in light-emitting amounts may be corrected by adjusting the light-up periods of the light-emitting thyristors L.

In the description above, all the light-emitting thyristors L1, L2, L3 and L4 are caused to light up in the period T(I) shown in FIG. 8. However, if some light-emitting thyristors L are not caused to light up according to image data, it is only necessary to maintain the memory signal ϕm1A (ϕm) at "S." Specifically, at a time point (timing) shown as M6 off in the period T(II) in FIG. 8, it is only necessary to maintain the memory signal ϕm1A (ϕm) at "S." Since "S" is a potential such that −3 V<"S"≤−1.5 V, the memory thyristor M6, whose threshold voltage is −3 V, does not get turned on. Thus, the memory thyristor M6 remains in the OFF state, and the threshold voltage thereof is maintained at −4.8 V. When the light-up signal ϕI1 (ϕI) changes to "Le," the light-emitting thyristors L5, L7 and L8, whose the threshold voltages are −1.5 V, get turned on to light up (emit light). However, the light-emitting thyristor L6 maintains the OFF state, and does not light up (emit light).

Alternatively, the description above may be described as follows.

Specifically, in the first exemplary embodiment, in response to the first transfer signal ϕ1 and the second transfer signal ϕ2, the transfer thyristors T change from the OFF state to the ON state or from the ON state to the OFF state in numerical order, and there is a period in which the adjacent two transfer thyristors T are both in the ON state (for example, the period between the time points d and e). That is, the ON state shifts through the transfer thyristors T in numerical order of the transfer thyristor array.

When one of the first transfer signal ϕ1 and the second transfer signal ϕ2 is "L," only a single transfer thyristor T is in the ON state. For example, only the transfer thyristor T1 is in the ON state in the period between the time points c and d.

When the transfer thyristor T is in the ON state, the threshold voltage of the memory thyristor M having the gate terminal Gm connected to the gate terminal Gt of the transfer thyristor T rises. That is, the memory thyristor M is likely to be set in the ON state, when the transfer thyristor T is in the ON state, as compared when the transfer thyristor T is in the OFF state.

Thus, at timing when only a single transfer thyristor T is in the ON state (for example, the time points c, f, i, and l in FIG. 8), the memory thyristor M whose threshold voltage has risen is caused to turn on by changing the memory signal ϕm to "L." That is, the positions (numbers) of the light-emitting thyristors L to be caused to light up are memorized by changing the memory thyristors M having the same (corresponding) numbers to the ON state.

The memory signal ϕm is changed between "S" and "L" without returning to "H." In this way, the memory thyristors M having the same numbers as the light-emitting thyristors L intended to light up are maintained in the ON state, whereas the memory thyristors M having the same numbers as the light-emitting thyristors L not intended to light up are maintained in the OFF state.

Then, the plural light-emitting thyristors L intended to light up are caused to light up simultaneously by changing the light-up signal ϕI from "H" to "Le" (−3 V<"Le"≤−1.5 V).

In other word, the potential of the gate terminal Gm of the memory thyristor M in the ON state becomes "H" (0 V), which causes the threshold voltage of the light-emitting thyristor L having the same number to rise. Thereby, only the light-emitting thyristor L having the same number as the memory thyristor M in the ON state may be caused to light up (emit light) by changing the light-up signal ϕI from "H" to "Le" (−3 V<"Le"≤−1.5 V). That is, the light-emitting thyristor L is likely to be set in the ON state (be capable of lighting up), when the memory thyristor M is in the ON state, as compared when the memory thyristor M is in the OFF state.

The memory thyristors M have a function (latch function) with which the positions (numbers) of the light-emitting thyristors L to be caused to light up are memorized according to image data.

The transfer thyristors T have a shift function thereby to sequentially set the positions of the light-emitting thyristors L to be caused to light up. Meanwhile, the memory signal ϕm is set at "L" or "S" depending on image data, and thereby specifies whether the light-emitting thyristor L having been set is caused to light up or not. The memory thyristors M having the same numbers as the light-emitting thyristors L to be caused to light up simultaneously are maintained in the ON state. Thereby, the memory thyristors M memorize the positions (numbers) of the light-emitting thyristors L to be caused to light up. As described above, the number of the light-emitting thyristors L to be caused to light up is not limited to one. This number may be plural, or 0 if there is no light-emitting thyristors L to be caused to light up.

Note that when the light-emitting thyristors L light up, the memory signal ϕm is changed to "H," all the memory thyristors M are caused to turn off, and the memory of the positions (numbers) of the light-emitting thyristors L intended to light up is deleted.

In other words, "L" of the memory signal ϕm is an instruction for causing the light-emitting thyristor L to light up, "S" of the memory signal ϕm is an instruction for maintaining the ON state of the memory thyristor M and not causing the light-emitting thyristor L to light up, and "H" of the memory signal ϕm is an instruction for clearing (resetting) the memorized instruction.

In the first exemplary embodiment, the cathode terminal of the memory thyristor M is connected through the resistance Rn to the memory signal line 74A or 74B to which the memory signal ϕm is supplied. Accordingly, even when the memory thyristor M is set in the ON state, the memory signal line 74A or 74B is not drawn into the potential (−1.5 V) of the cathode terminal of the memory thyristor M. Thus, even if some memory thyristors M are in the ON state, other memory thyristors M may be caused to turn on when the threshold voltages of the other memory thyristors M become higher than "L."

In this way, the plural memory thyristors M having the same numbers as the plural light-emitting thyristors L intended to light up are set in the ON state, and are maintained in the ON state. Thereby, the light-emitting thyristors L intended to light up are caused to turn on in conjunction with supply of the light-up signal ϕI, and to light up (emit light).

As described above, the memory signals ϕm correspond to image data. For each of the SLEDs driven in parallel, different memory signals ϕm are transmitted. In contrast, the light-up signals ϕI are allowed to be shared with the plural light-emitting chips C, namely, the plural SLEDs, since the light-up signals ϕI supply electric power (currents) to the light-emitting thyristors L corresponding to the memory thyristors M in the ON state. Accordingly, the light-up signals ϕI may be shared with all the light-emitting chips C on the circuit board 62.

The current supplied by the memory signal ϕm only need to be large enough for the memory thyristors M to maintain the ON state, and thus may be lower than the current for the light-emitting thyristors L to light up. Thus, the area occupied by the resistances Rn on the substrate 80 of the light-emitting chips C is allowed to be set small. Additionally, the wiring width of the memory signal lines 108 is allowed to be small, and thus the area occupied by the memory signal lines 108 on the circuit board 62 becomes smaller.

Meanwhile, since the light-up signal ϕI supplies a current to the light-emitting thyristors L for lighting up, the light-up signal lines 109 need to be wirings having small resistance, namely, large wiring width. The area occupied by the light-up signal lines 109 on the circuit board 62 becomes smaller by sharing the light-up signal lines 109.

As described above, in the first exemplary embodiment, the plural light-emitting thyristors L are caused to light up simultaneously at timing when the light-up signal ϕI changes from "H" to "Le" (at timing when the light-up signal ϕI is transmitted) (for example, at the time point l). Therefore, the light-up period in total becomes shorter as compared with a case where the light-up control on the light-emitting thyristors L is performed one by one. In other words, from the aspect of the print head 14, the writing time to the photoconductive drum 12 may be shortened.

Note that, in the circuit in FIG. 6, the light-up signal ϕI may be driven with a current. In addition, in order to suppress the variation of the light emission intensity of the light-emitting points, the value of the current to be supplied may be set in accordance with the number of the light-emitting thyristors L to be caused to light up simultaneously.

In contrast, when the light-up signal ϕI is driven at a predetermined voltage, it is only necessary to provide a resistance such as the resistance Rn between the light-up signal line 75 and each of the cathode terminals of the light-emitting thyristors L. In this case, the current flowing into the light-emitting thyristor L that is lighting up (emitting light) becomes constant. However, electric power consumption due to the newly provided resistances becomes larger, since the current to cause the light-emitting thyristors L to light up (emit light) is larger than the current to maintain the ON state of the memory thyristors M. Additionally, heat generated by the resistances changes the temperature of the light-emitting chips C, which leads to variation of the light emission characteristics. Furthermore, since a large current flows, the area of the newly provided resistances becomes larger, and thereby the area of the light-emitting chips C becomes larger.

In contrast, if the light-up signal ϕI is driven with a current, the resistance need not be provided between the light-up signal line 75 and each of the cathode terminals of the light-emitting thyristors L. In this case, the current I flowing into the light-emitting chip C is represented as $I=(V-Vd)/R$, by using the potential V of the power supply, the diffusion potential Vd and an external resistance R. Accordingly, the current flowing into each of the plural light-emitting thyristors L that are lighting up (emitting light) simultaneously has a value obtained by dividing I by the number of the light-emitting thyristors L that are lighting up (emitting light). That is, the value of the current flowing into each of the light-emitting thyristors L becomes different depending on the number of the light-emitting thyristors L intended to light up (emit light) simultaneously. To avoid this, the current value to be supplied may be set in accordance with the number of the light-emitting thyristors L to be caused to light up.

The number of the light-emitting thyristors L caused to light up at timing when the light-up signal ϕI changes from "H" to "Le" (at timing when the light-up signal ϕI is transmitted) (for example, at the time point l) is found out by using image data given to the light-emitting chip C. Thus, the value of the current may be easily set in accordance with the number of the light-emitting thyristors L to light up.

Figure 9:
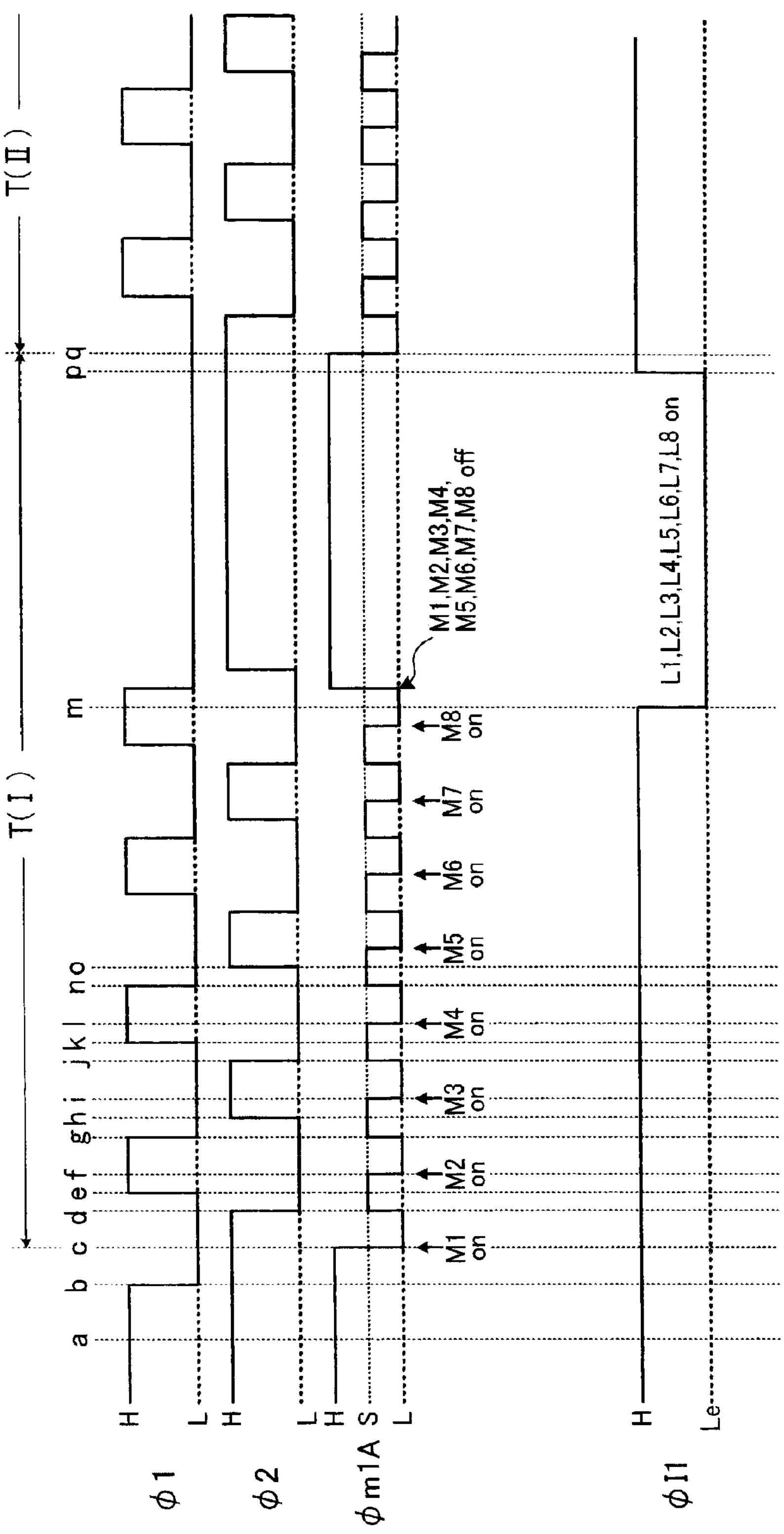
FIG. 9 is another timing chart for explaining the operation of the light-emitting chip in the first exemplary embodiment.

FIG. 9 is another timing chart for explaining the operation of the light-emitting chip C. The part of the SLED_A of the light-emitting chip C1 is described as an example. FIG. 9 shows a case where the light-up control is performed on each group including eight light-emitting thyristors L as shown in FIG. 5B. Note that FIG. 9 shows the part where the light-up control is performed on the group #I of the eight light-emitting thyristors L.

It is supposed that all the eight light-emitting thyristors L1 to L8 of the group #I are caused to light up in the period T(I) in FIG. 9.

In FIG. 9, similarly to FIG. 8, passing of time is illustrated in alphabetical order from the time point a to the time point r except for a part (the time point m) described below, and the same time points as FIG. 8 are used. The light-up control is performed on the light-emitting thyristors L1 to L8 of the group #I in FIG. 5B, in the period T(I) between the time points c and q.

The period T(I) in FIG. 9 repeats twice the period between the time points c and n illustrated in FIG. 8 in which four memory thyristors M are set in the ON state. Accordingly, the time point m when the light-up signal ϕI1 (ϕI) changes from "H" to "Le" is shifted and located between the time points o and p.

The operation of the part of the SLED_A of the light-emitting chip C1 (C) is the same as that in the case of four light-emitting thyristors L described above, and thus the description thereof is omitted.

Note that, as shown in FIGS. 8 and 9, eight light-emitting points (light-emitting thyristors L) may be caused to light up simultaneously only by changing timing of the first transfer signal ϕ1, the second transfer signal ϕ2, the memory signal ϕm1A (ϕm) and the light-up signal ϕI1 (ϕI) without changing the light-emitting chip C1 (C).

Thus, the number of the light-emitting points (light-emitting thyristors L) to be caused to light up simultaneously may be arbitrarily set.

Second Exemplary Embodiment

In the first exemplary embodiment, the plural memory thyristors M corresponding to the plural light-emitting thyristors L intended to light up (emit light) are changed to the ON state, the positions (numbers) of the light-emitting thyristors L to be caused to light up are memorized, and then the light-up signal ϕI is supplied, thereby to cause the light-emitting thyristors L to light up (emit light). For example, as shown in FIG. 8, the four memory thyristors M1 to M4 are changed to the ON state in the period from the time point c to the time point l, and then the light-emitting thyristors L1 to L4 are caused to light up (emit light) in the period from the time point m to the time point p. Thus, in the light-up period from the time point m to the time point p, the memory thyristor M5 and the like are not changed to the ON state in order to cause the light-emitting thyristors L having numbers 5 or more to light up.

In other words, in the first exemplary embodiment, the period (from the time point c to the time point l) in which the memory thyristors M are changed to the ON state and the period (from the time point m to the time point p) during which the light-emitting thyristors L are caused to light up (emit light) are set in chronological order.

In the second exemplary embodiment, in the light-up period during which the light-emitting thyristors L in a group are caused to light up (emit light), the memory thyristors M are caused to memorize the positions (numbers) of the light-emitting thyristors L in the next group to be caused to light up.

Thereby, the light-emitting thyristors L in the group and those in the next group are caused to light up (emit light) in a short time interval.

For this purpose, the second exemplary embodiment has a configuration in which holding thyristors B1, B2, B3 . . . (see FIG. 12) that temporally hold the positions (numbers) of the light-emitting points (the light-emitting thyristors L) to be caused to light up (emit light) are newly added in the light-emitting chips C in the first exemplary embodiment. Note that, in the second exemplary embodiment, the same reference numerals are given to the same components as those in the first exemplary embodiment, and the detailed description thereof is omitted.

Figure 10:
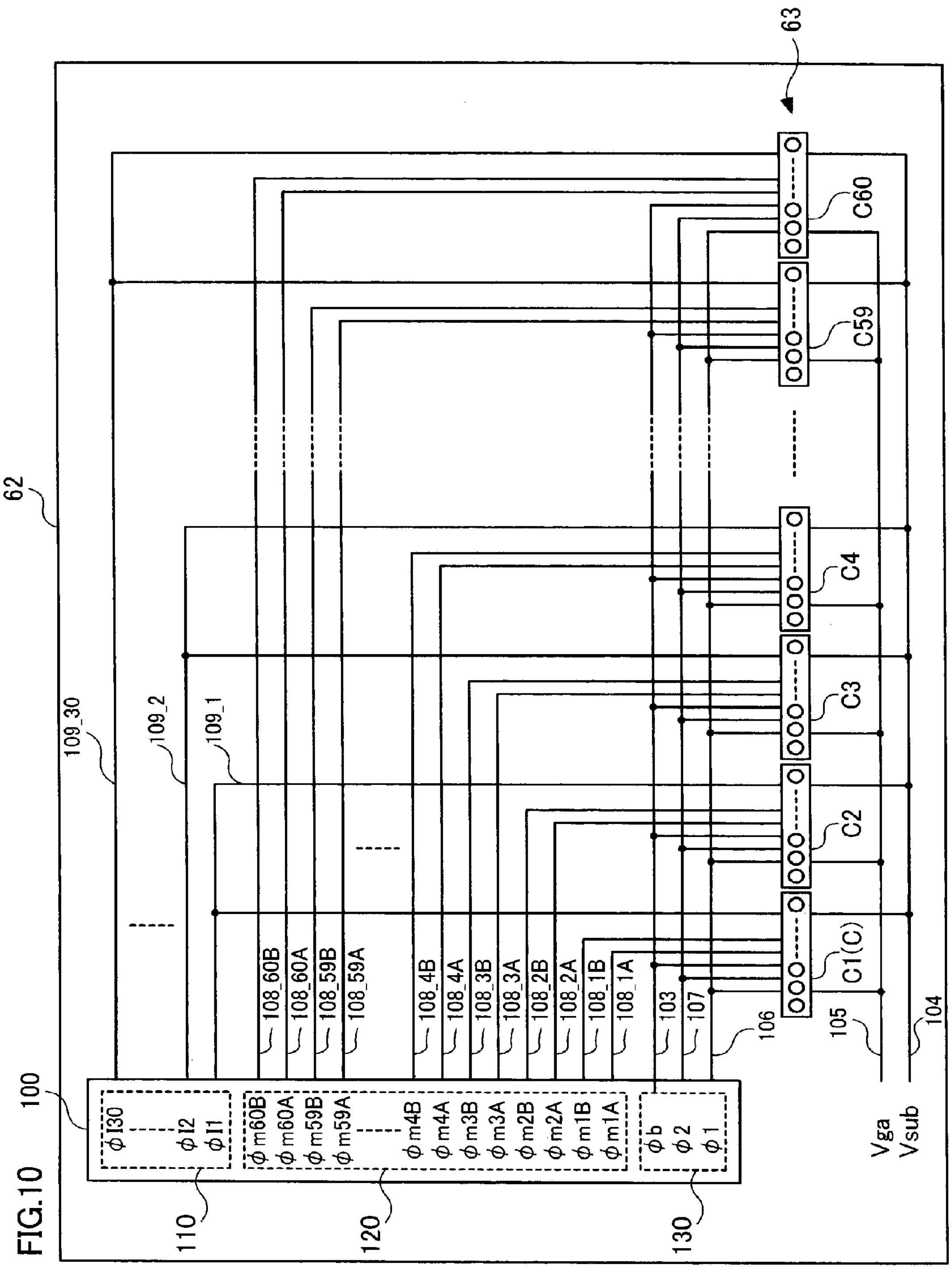
FIG. 10 is a diagram showing a configuration of the signal generating circuit mounted on the circuit board and a wiring configuration of the circuit board in the second exemplary embodiment.

FIG. 10 is a diagram showing a configuration of the signal generating circuit 100 mounted on the circuit board 62 (see FIG. 2) and a wiring configuration of the circuit board 62 in the second exemplary embodiment.

The light-up signal generating unit 110 included in the signal generating circuit 100 outputs each of the light-up signals ϕI (ϕI1 to ϕI30) to the corresponding pair of the light-emitting chips C (C1 to C60), similarly to the first exemplary embodiment. Here, each pair is formed of two of the light-emitting chips C.

The memory signal generating unit 120 included in the signal generating circuit 100 outputs the memory signals ϕm (ϕm1A to ϕm60A and ϕm1B to ϕm60B) for memorizing the positions (numbers) of the light-emitting thyristors L to be caused to light up based on image data, similarly to the first exemplary embodiment.

The transfer signal generating unit 130 included in the signal generating circuit 100 transmits the first transfer signal ϕ1 and the second transfer signal ϕ2 to the light-emitting chips C (C1 to C60), similarly to the first exemplary embodiment, and outputs a holding signal ϕb for performing control to temporarily hold the positions (numbers) of the light-emitting thyristors L to be caused to light up.

Specifically, the signal generating circuit 100, as an example of the signal generating unit, generates the light-up signals ϕI (ϕI1 to ϕI30), the memory signals ϕm (ϕm1A to ϕm60A and ϕm1B to ϕm60B), the first transfer signal ϕ1, the second transfer signal ϕ2 and the holding signal ϕb, as an example of the driving signals.

Thus, in addition to the configuration of the first exemplary embodiment, the circuit board 62 is provided with a holding signal line 103 through which the holding signal ϕb is transmitted. The holding signal line 103 is connected to ϕb terminals (see FIGS. 11A to 12 to be described later) of the light-emitting chips C (C1 to C60) in parallel.

Figure 11A:
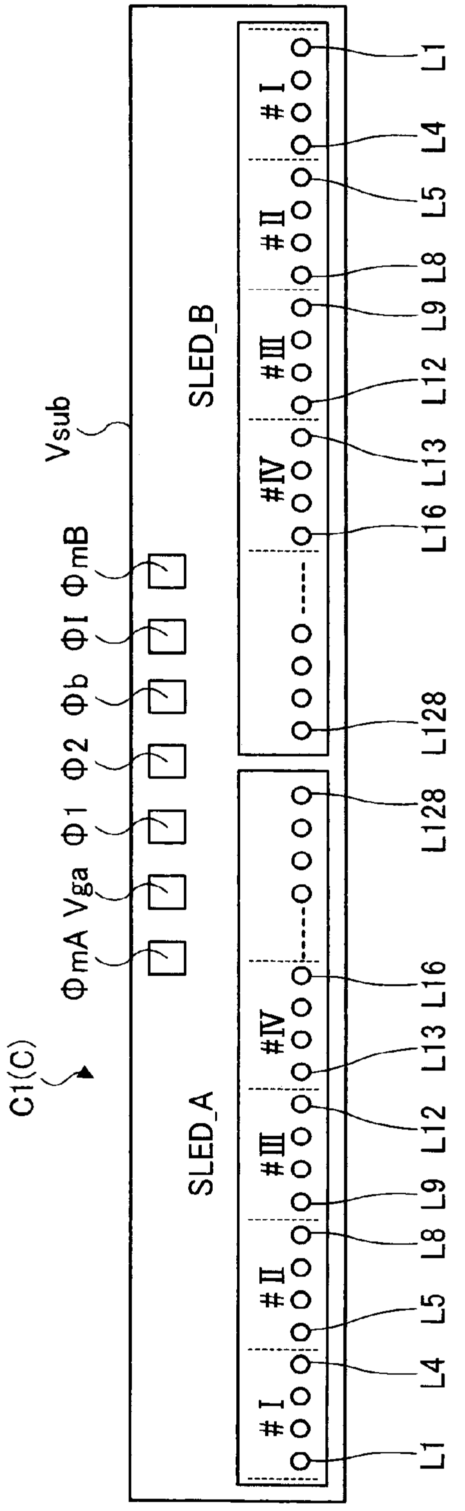
FIGS. 11A and 11B are diagrams for explaining an outline of the light-emitting chip in the second exemplary embodiment.
Figure 11B:
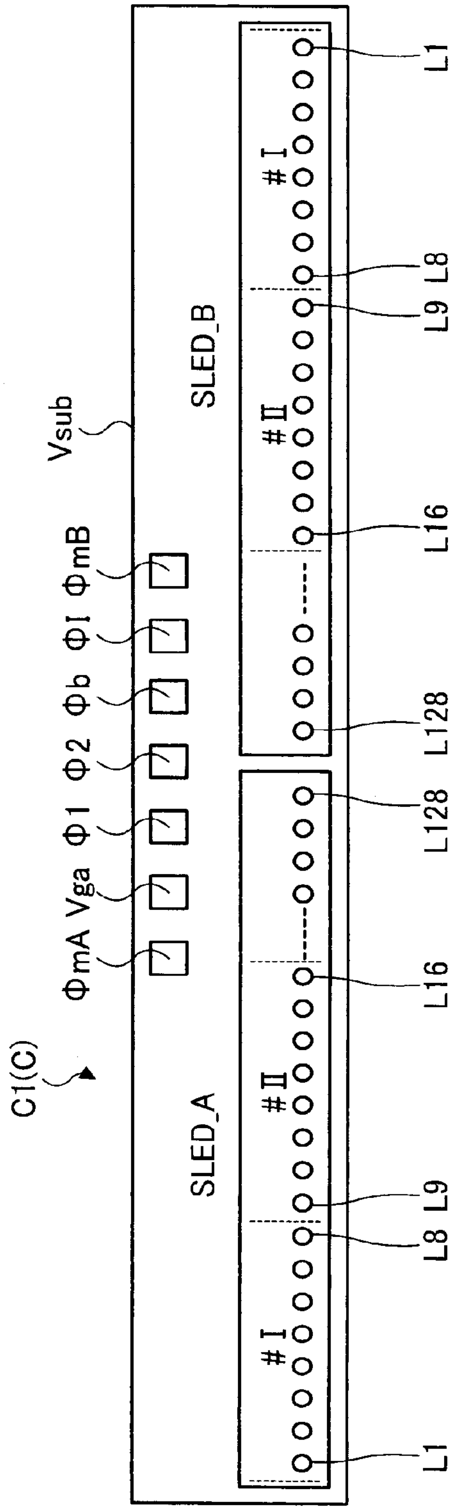

FIGS. 11A and 11B are diagrams for explaining an outline of the light-emitting chip C in the second exemplary embodiment. The light-emitting chip C1 is described as an example, and thus the light-emitting chips C are denoted by the light-emitting chip C1 (C). The same is true for the other light-emitting chips C2 to C60.

In the light-emitting chip C1 (C), the plural light-emitting elements (specifically, light-emitting thyristors) are divided into groups that each include a predetermined number of light-emitting elements, and lighting up and putting out are controlled (light-up control is performed) for each of the groups. FIG. 11A shows a combination of the light-emitting elements in a case where every four light-emitting elements in the light-emitting chip C1 (C) forms a group to operate, while FIG. 11B shows that in a case where every eight light-emitting elements in the light-emitting chip C1 (C) forms a group to operate. The difference from the light-emitting chip C1 (C) shown in FIGS. 5A and 5B is that the light-emitting chip C1 (C) shown in FIGS. 11A and 11B has a ϕb terminal. The holding signal ϕb is supplied in common to the SLED_A and the SLED_B. As to the rest, the light-emitting chip C1 (C) shown in FIGS. 11A and 11B is similar to that shown in FIGS. 5A and 5B, and thus the detailed description thereof is omitted.

Figure 12:
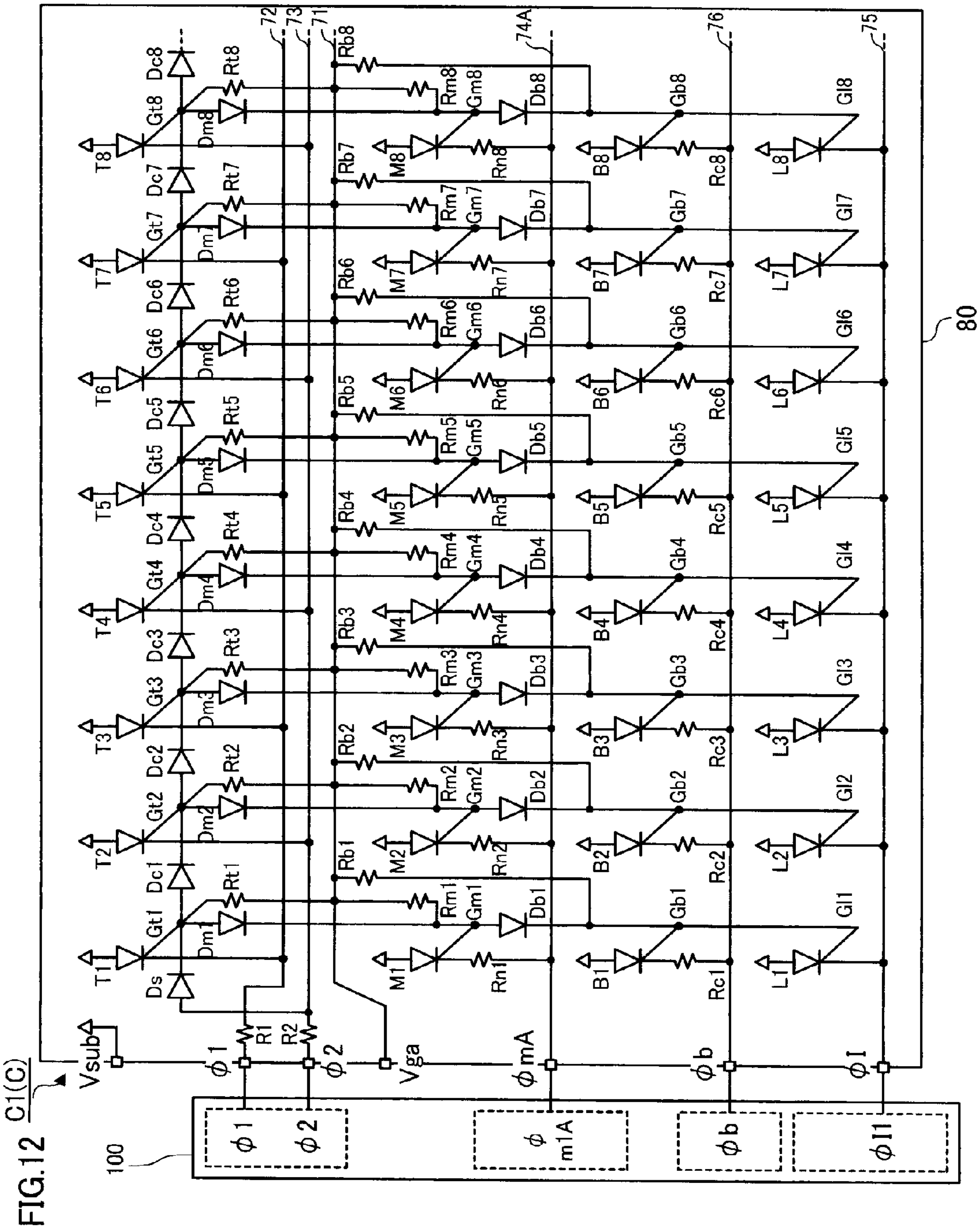
FIG. 12 is a diagram for explaining a circuit configuration of the light-emitting chip in the second exemplary embodiment.

FIG. 12 is a diagram for explaining a circuit configuration of the light-emitting chip C in the second exemplary embodiment. Here, the part of the SLED_A of the light-emitting chip C1 is described as an example, and thus the light-emitting chips C are denoted by the light-emitting chip C1 (C). Note that a part related to the light-emitting thyristors L1 to L8 is shown in FIG. 12. The same reference numerals are given to the same components as those in the first exemplary embodiment shown in FIG. 6, and the detailed description thereof is omitted.

The part of the SLED_A of the light-emitting chip C1 (C) in the second exemplary embodiment includes a holding thyristor array (a holding element array) formed of the holding thyristors B1, B2, B3 . . . , as an example of holding elements arrayed in line, which are placed on the substrate 80 (see FIGS. 13A and 13B to be described later), in addition to the part of the SLED_A of the light-emitting chip C1 (C) in the first exemplary embodiment. Additionally, the part of the SLED_A of the light-emitting chip C1 in the second exemplary embodiment includes connecting diodes Db1, Db2, Db3 . . . , and further, power supply line resistances Rb1, Rb2, Rb3 . . . , and resistances Rc1, Rc2, Rc3 . . . .

Here, when the holding thyristors B1, B2, B3 . . . are not distinguished, they are called holding thyristors B, similarly to the first exemplary embodiment. When the connecting diodes Db1, Db2, Db3 . . . , the power supply line resistances Rb1, Rb2, Rb3 . . . and the resistances Rc1, Rc2, Rc3 . . . are not distinguished, they are called connecting diodes Db, power supply line resistances Rb and resistances Rc, respectively.

Note that the holding thyristors B are also semiconductor devices each having three terminals that are an anode terminal, a cathode terminal and a gate terminal. An anode terminal, a cathode terminal and a gate terminal of the holding thyristor B are referred to as fourth anode, fourth cathode and fourth gate, respectively.

The numbers of the holding thyristors B, the power supply line resistances Rb and the resistances Rc are 128, respectively, similarly to the first exemplary embodiment.

The holding thyristors B1, B2, B3 . . . are arrayed in numerical order from the left side of FIG. 12, similarly to the transfer thyristors T1, T2, T3 . . . and the like in the first exemplary embodiment. Similarly, the connecting diodes Db1, Db2, Db3 . . . , the power supply line resistances Rb1, Rb2, Rb3 . . . and the resistances Rc1, Rc2, Rc3 . . . are also arrayed in numerical order from the left side of FIG. 12.

Next, a description will be given of electric connections between the elements in the part of the SLED_A of the light-emitting chip C1.

As mentioned above, the configuration of the second exemplary embodiment is such that the holding thyristors B, the connecting diodes Db, the power supply line resistances Rb and the resistances Rc are additionally provided to the part of the SLED_A of the light-emitting chip C1 in the first exemplary embodiment. Thus, the electric connections of the newly added elements are mainly described.

Anode terminals of the holding thyristors B1, B2, B3 . . . are connected to the substrate 80, similarly to the anode terminals of the transfer thyristors T1, T2, T3 . . . and the like. These anode terminals are connected to the power supply line 104 (see FIG. 10) through the Vsub terminal provided on the substrate 80. To this power supply line 104, the reference potential Vsub ("H" (0 V)) is supplied.

Gate terminals Gb1, Gb2, Gb3 . . . of the holding thyristors B1, B2, B3 . . . are connected to the power supply line 71 ("L" (−3.3 V)) through the respective power supply line resistances Rb1, Rb2, Rb3 . . . provided so as to correspond to the respective holding thyristors B1, B2, B3 . . . .

Here, when the gate terminals Gb1, Gb2, Gb3 . . . are not distinguished, they are called gate terminals Gb.

Cathode terminals of the holding thyristors B1, B2, B3 . . . are connected to a holding signal line 76 through the resistances Rc1, Rc2, Rc3 . . . provided so as to correspond to the respective holding thyristors B1, B2, B3 . . . . The holding signal line 76 is connected to the ϕb terminal that is an input terminal of the holding signal ϕb. To the ϕb terminal, the holding signal line 103 (see FIG. 10) is connected, and the holding signal ϕb is supplied thereto.

Each of the gate terminals Gb1, Gb2, Gb3 . . . of the holding thyristors B1, B2, B3 . . . is connected to one of the gate terminals Gm1, Gm2, Gm3 . . . of the memory thyristors M1, M2, M3 . . . , which has the same number as the gate terminals Gb connected thereto, through each of the connecting diodes Db1, Db2, Db3 . . . , with a one-to-one relationship. Specifically, cathode terminals of the connecting diodes Db1, Db2, Db3 . . . are connected to the respective gate terminals Gb1, Gb2, Gb3 . . . of the holding thyristors B1, B2, B3 . . . , and anode terminals of the connecting diodes Db1, Db2, Db3 . . . are connected to the respective gate terminals Gm1, Gm2, Gm3 . . . of the memory thyristors M1, M2, M3 . . . .

The connecting diodes Db are connected so that a current flows in a direction from the respective gate terminals Gm of the memory thyristors M to the respective gate terminals Gb of the holding thyristors B.

Figure 13B:
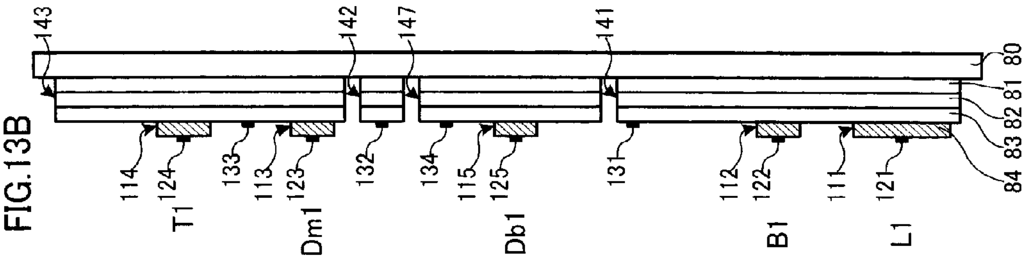
FIGS. 13A and 13B are a planar layout and a cross-sectional view of the light-emitting chip in the second exemplary embodiment.
Figure 13A:
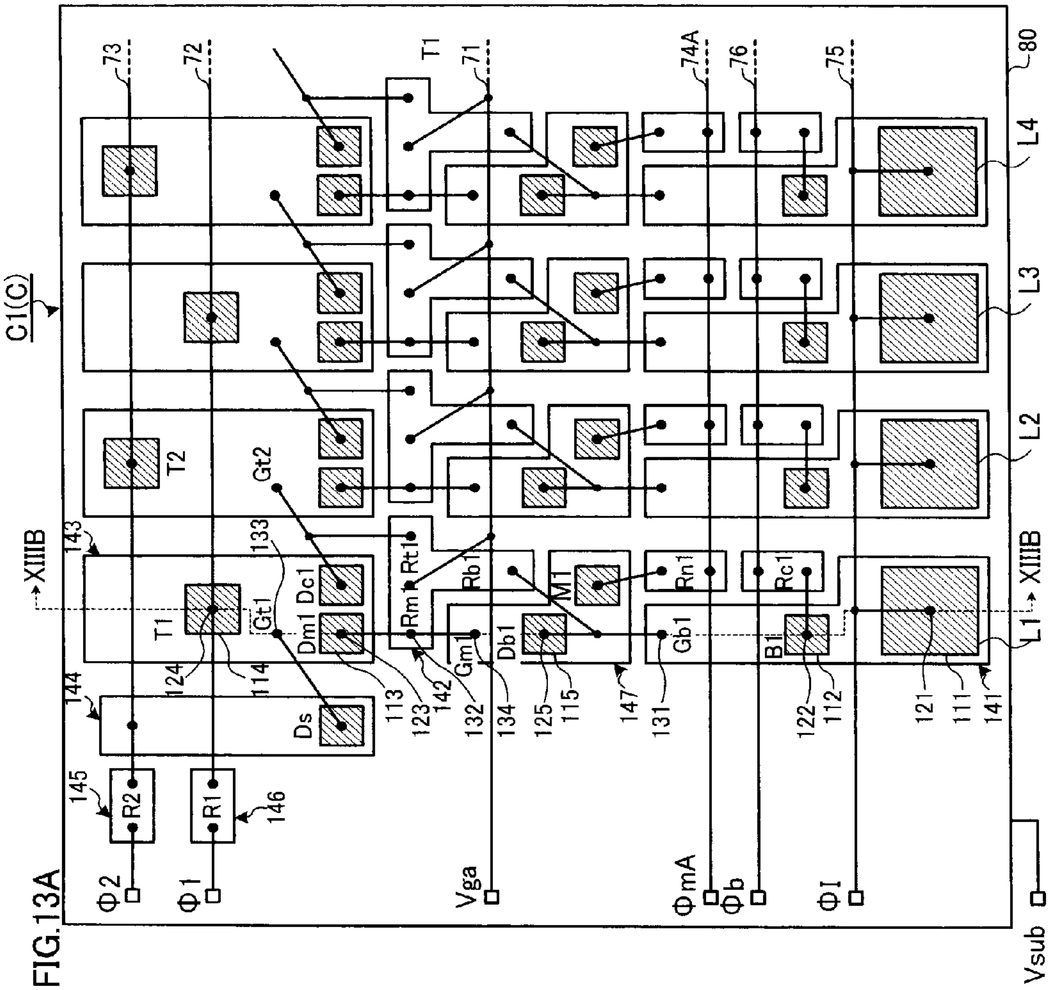

FIGS. 13A and 13B are a planar layout and a cross-sectional view of the light-emitting chip C in the second exemplary embodiment. Here, the part of the SLED_A of the light-emitting chip C1 is described as an example, and thus the light-emitting chips C are denoted by the light-emitting chip C1 (C). FIG. 13A is a planar layout of a part related to the light-emitting thyristors L1 to L4 in the part of the SLED_A of the light-emitting chip C1 (C). FIG. 13B is a cross-sectional view of FIG. 13A, taken along a line XIIIB-XIIIB. Note that, in FIGS. 13A and 13B, elements and terminals are shown by using the above-mentioned names.

In the second exemplary embodiment, a seventh island 147 and the like are newly provided because of provision of the holding thyristors B. The holding thyristor B1 is provided in the first island 141, and the memory thyristor M1 and the connecting diode Db1 are provided in the seventh island 147.

The n-type ohmic electrode 122 that is the cathode terminal of the holding thyristor B1 is connected to the holding signal line 76 through the resistance Rc1. The holding signal line 76 is connected to the ϕb terminal, and is supplied with the holding signal ϕb.

Next, a description will be given of the operation of the light-emitting portion 63. As shown in FIG. 10, the first transfer signal ϕ1, the second transfer signal ϕ2 and the holding signal ϕb are transmitted in common to each of the light-emitting chips C (C1 to C60) forming the light-emitting portion 63. Additionally, as shown in FIGS. 11A and 11B, each of the light-emitting chips C (C1 to C60) includes the SLED_A and the SLED_B. The first transfer signal ϕ1, the second transfer signal ϕ2 and the holding signal ϕb are transmitted in common to the SLED_A and the SLED_B. Accordingly, the first transfer signal ϕ1, the second transfer signal ϕ2 and the holding signal ϕb are transmitted in common to all the SLEDs in the light-emitting chips C (C1 to C60), and thereby all the SLEDs are driven in parallel.

Meanwhile, the memory signals ϕm (ϕm1A to ϕm60A and ϕm1B to ϕm60B) that are different for each of the SLEDs are transmitted on the basis of image data. Additionally, regarding every two of the light-emitting chips C as a pair, each of the light-up signals ϕI (ϕI1 to ϕI30) are transmitted in common to the corresponding pair of the light-emitting chips C (C1 to C60).

To be short, in the second exemplary embodiment, the first transfer signal ϕ1, the second transfer signal ϕ2 and the holding signal ϕb are transmitted in common to all the SLEDs. On the other hand, the memory signals ϕm are individually transmitted to the respective SLEDs. The light-up signals ϕI are transmitted in common to the respective pairs of the light-emitting chips C. Since all the SLEDs are similarly operated, the operation of the light-emitting portion 63 is recognized if that of the part of the SLED_A of the light-emitting chip C1 is described. Hereinafter, the operation of the light-emitting chips C will be described by taking the SLED_A of the light-emitting chip C1 as an example.

Note that the difference from the first exemplary embodiment is that the holding signal ϕb transmitted in common to all the SLEDs is newly added.

Figure 14:
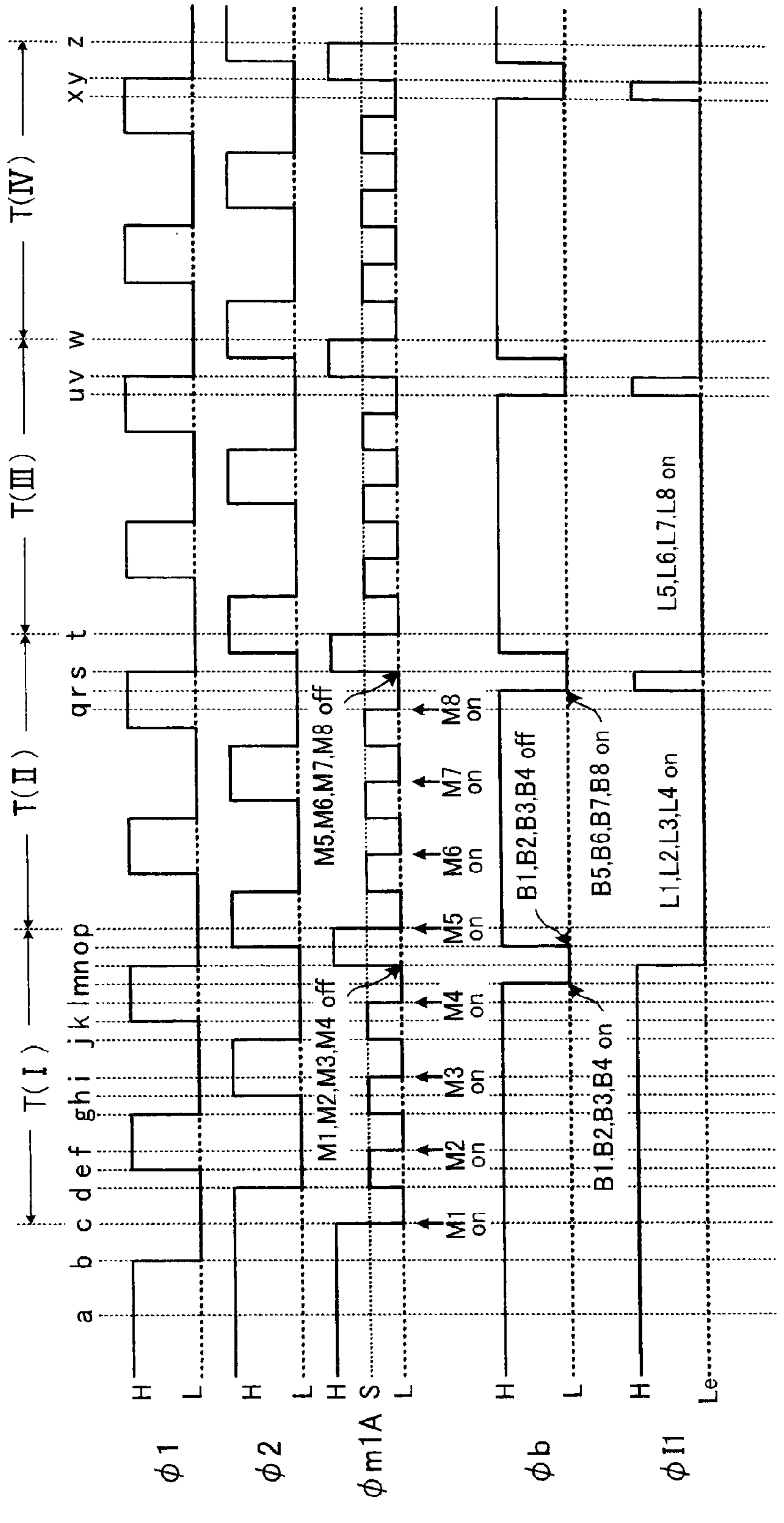
FIG. 14 is a timing chart for explaining the operation of the light-emitting chip in the second exemplary embodiment.

FIG. 14 is a timing chart for explaining the operation of the light-emitting chip C in the second exemplary embodiment. Here, the part of the SLED_A of the light-emitting chip C1 is described as an example.

FIG. 14 shows a case where light-up control is performed on the four light-emitting thyristors L for each group shown in FIG. 11A. The respective four light-emitting thyristors L in the groups #I, #II, #III and #IV are all caused to light up simultaneously.

In FIG. 14, passing of time is illustrated in alphabetical order from a time point a to a time point z. In a period T(I) from a time point c to a time point p, in order to cause the four light-emitting thyristors L1 to L4 in the group #I shown FIG. 11A to light up simultaneously, the memory thyristors M1 to M4 are caused to turn on, thereby to memorize the positions (numbers) of the light-emitting thyristors L1 to L4. Then, in a period from a time point n to a time point r, the light-emitting thyristors L1 to L4 are caused to light up (emit light). Next, in a period T(II) from the time point p to a time point t, in order to cause the four light-emitting thyristors L5 to L8 in the group #II to light up simultaneously, the memory thyristors M5 to M8 are caused to turn on, thereby to memorize the positions (numbers) of the light-emitting thyristors L5 to L8. Then, in a period from a time point s to a time point u, the light-emitting thyristors L5 to L8 are caused to light up (emit light). Similarly, in a period T(III) from the time point t to a time point w, in order to cause the four light-emitting thyristors L9 to L12 in the group #III to light up simultaneously, the memory thyristors M9 to M12 are caused to turn on, thereby to memorize the positions (numbers) of the light-emitting thyristors L9 to L12. Then, in a period from a time point v to a time point x, the light-emitting thyristors L9 to L12 are caused to light up (emit light). Furthermore, in a period T(IV) from the time point w to the time point z, in order to cause the four light-emitting thyristors L13 to L16 in the group #IV to light up simultaneously, the memory thyristors M13 to M16 are caused to turn on, thereby to memorize the positions (numbers) of the light-emitting thyristors L13 to L16. Then, similarly to the above, the light-up control is performed up to the light-emitting thyristor L128 if the number of the light-emitting thyristors L is 128.

The first transfer signal ϕ1, the second transfer signal ϕ2 and the holding signal ϕb respectively have the same waveforms repeated in every period such as the period T(I), the period T(II) . . . . Meanwhile, the memory signal ϕm1A (ϕm) changes on the basis of image data. However, the memory signal ϕm1A (ϕm) has the same waveforms repeated in every period such as the period T(I), the period T(II) . . . , because the four light-emitting thyristors L on which the light-up control is performed simultaneously are all caused to light up in FIG. 14.

The time point c in the period T(I) corresponds to timing when the light-emitting chip C1 (C) goes into an operation state, and thus there is no light-emitting thyristor L that is lighting up (emitting light) at this time. Accordingly, the waveform of the light-up signal ϕI1 (ϕI) is different between in the period T(I) and the period T(II). However, in the period T(II) and the subsequent period, the same waveform is repeated.

Therefore, hereinafter, a description will be given of the waveforms of the signals other than the light-up signal ϕI1 (ϕI), in the period T(I) from the time point c to the time point p. As for the light-up signal ϕI1 (ϕI), a description will be given of the waveform in the period T(II) from the time point p to the time point t. Note that, a period from the time point a to the time point c is a period for starting the operation of the light-emitting chip C1 (C), similarly to the first exemplary embodiment.

A description will be given of the waveforms of the first transfer signal ϕ1, the second transfer signal ϕ2, the memory signal ϕm1A (ϕm) and the holding signal ϕb in the period T(I).

The first transfer signal ϕ1 is "L" at the time point c, changes from "L" to "H" at a time point e, and then changes from "H" to "L" at a time point g. Subsequently, the first transfer signal ϕ1 changes from "L" to "H" at a time point k, and changes from "H" to "L" at the time point n. Thereafter, the first transfer signal ϕ1 remains at "L" until the time point p. This waveform is similar to that of the first transfer signal ϕ1 shown in FIG. 8 in the first exemplary embodiment.

The second transfer signal ϕ2 is "H" at the time point c, changes from "H" to "L" at a time point d, and then changes from "L" to "H" at a time point h. Subsequently, the second transfer signal ϕ2 changes from "H" to "L" at a time point j and changes from "L" to "H" at a time point o. Thereafter, the second transfer signal ϕ2 remains at "H" until the time point p. This waveform is similar to that of the second transfer signal ϕ2 shown in FIG. 8 in the first exemplary embodiment.

Here, in the period between the time points c and o, the first transfer signal ϕ1 and the second transfer signal ϕ2, when compared with each other, repeat "H" and "L" alternately to each other, with intervening periods in which both signals are set at "L" (for example, a period between the time points d and e and a period between the time points g and h). The first transfer signal ϕ1 and the second transfer signal ϕ2 do not have a period when the potential thereof are set at "H" simultaneously.

The memory signal ϕm1A (ϕm) changes from "H" to "L" at the time point c and changes from "L" to "S" at the time point d. The memory signal ϕm1A (ϕm) then changes from "S" to "L" at a time point f and changes from "L" to "S" at the time point g. Further, the memory signal ϕm1A (ϕm) changes from "S" to "L" at a time point i, changes from "L" to "S" at the time point j, changes from "S" to "L" at a time point l, and then changes from "L" to "H" at the time point n. The memory signal ϕm1A (ϕm) remains at "H" at the time point p. This waveform is similar to that of the memory signal ϕm1A (ϕm) shown in FIG. 8 in the first exemplary embodiment.

The relationship between the memory signal ϕm1A (ϕm) and the first transfer signal ϕ1 and second transfer signal ϕ2 is similar to that in the first exemplary embodiment. Specifically, in the period when only one of the first transfer signal ϕ1 and the second transfer signal ϕ2 is set at "L," the memory signal ϕm1A (ϕm) is set at "L." For example, the memory signal ϕm1A (ϕm) is set at "L" in the period between the time points c and d when only the first transfer signal ϕ1 is set at "L," and in the period between the time points f and g when only the second transfer signal ϕ2 is set at "L."

The holding signal ϕb newly provided in the second exemplary embodiment is "H" at the time point c, and changes from "H" to "L" at a time point m. Thereafter, the holding signal ϕb changes from "L" to "H" at the time point o, and remains at "H" at the time point p.

The light-up signal ϕI1 (ϕI) changes from "H" to "Le" at the time point n in the period T(I), and is kept at "Le" at the starting time point p of the period T(II). The light-up signal ϕI1 (ϕI) then changes from "Le" to "H" at the time point r, and changes from "H" to "Le" at the time point s. Thereafter, the light-up signal ϕI1 (ϕI) remains at "Le" at the time point t.

Next, with reference to FIG. 12, an operation of the light-emitting portion 63 and the light-emitting chips C will be described according to the timing chart shown in FIG. 14. The operation of the light-emitting chips C is similar to that of the light-emitting chips C in the first exemplary embodiment except for the portion related to the holding thyristors B newly provided in the second exemplary embodiment. Thus, the description will be mainly given of the operation of the light-emitting chips C related to the newly-provided holding thyristors B, and the description of the operation similar to that in the first exemplary embodiment will be omitted.

(Initial State)

At the time point a in the timing chart shown in FIG. 14, the Vsub terminal, which is provided on each of the light-emitting chips C (C1 to C60) of the light-emitting portion 63, is set at the reference potential Vsub ("H" (0 V)). Meanwhile, each Vga terminal is set at the power supply potential Vga ("L" (−3.3 V)) (see FIG. 10).

Further, the first transfer signal ϕ1, the second transfer signal ϕ2 and the holding signal ϕb are set at "H," and the memory signals ϕm (ϕm1A to ϕm60A and ϕm1B to ϕm60B) and the light-up signals ϕI (ϕI1 to ϕI30) are set at "H." Thereby, the potential of the holding signal line 103 added in the second exemplary embodiment becomes "H," and the potential of the holding signal line 76 of each light-emitting chip C becomes "H" through the ϕb terminal of each light-emitting chip C.

The anode terminals of the holding thyristors B are connected to the Vsub terminal and are supplied with "H" (0 V), similarly to the other thyristors (the transfer thyristors T, the memory thyristors M and the light-emitting thyristors L). Meanwhile, the cathode terminals of the holding thyristors B are connected to the holding signal line 76 having the potential set at "H." Thereby, all of the potentials of the anode terminals and the cathode terminals of the holding thyristors B become "H," and thus the holding thyristors B are in the OFF state.

Since the other thyristors (the transfer thyristors T, the memory thyristors M and the light-emitting thyristors L) are the same as those in the first exemplary embodiment, all of the thyristors (the transfer thyristors T, the memory thyristors M, the holding thyristors B and the light-emitting thyristors L) are in the OFF state.

Since the start diode Ds is the same as that in the first exemplary embodiment, the potential of the gate terminal Gt1 is set at −1.5 V by the start diode Ds. Thus, the threshold voltage of the transfer thyristor T1 is −3 V.

Each of the gate terminals Gb of the holding thyristors B is connected to corresponding one of the gate terminals Gm of the memory thyristors M through corresponding one of the connecting diodes Db. Meanwhile, each of the gate terminals Gb of the holding thyristors B is connected to the power supply line 71 having the power supply potential Vga ("L" (−3.3 V)) through corresponding one of the power supply line resistances Rb. The gate terminal Gb1 is connected to the gate terminal Gt1 having the potential of −1.5 V through two steps of the forward-biased diodes (the connecting diode Dm1 and the connecting diode Db1). Thus, the gate terminal Gb1 is not influenced by the gate terminal Gt1 having the potential of −1.5 V. Accordingly, the potentials of the gate terminal Gb become "L" (−3.3 V), and the threshold voltages of the holding thyristors B and the light-emitting thyristors L become −4.8 V.

(Operation Start)

At a time point b, the first transfer signal ϕ1 changes from "H" (0 V) to "L" (−3.3 V). Then, the transfer thyristor T1 is changed to the ON state, similarly to the first exemplary embodiment.

(Operation State)

The operation of the memory thyristors M in the period from the time point c to the time point l is similar to that in the first exemplary embodiment. Note that the time points c to l in FIG. 14 are the same as those in FIG. 8.

Specifically, the memory thyristors M1, M2, M3 and M4 get turned on at the time points c, f, i and l, respectively.

Right after the time point l, the transfer thyristor T4 is in the ON state as well as these memory thyristors M1, M2, M3 and M4.

When the memory thyristor M1 gets turned on at the time point c, the potential of the gate terminal Gm1 becomes "H" (0 V). The gate terminal Gb1 of the holding thyristor B1 is connected to the gate terminal Gm1 through the forward-biased connecting diode Db1. Thus, the potential of the gate terminal Gb1 of the holding thyristor B1 becomes −1.5 V, and the threshold voltage of the holding thyristor B1 becomes −3 V. In addition, since the gate terminal Gb1 is connected to the gate terminal Gl1 of the light-emitting thyristor L1, the threshold voltage of the light-emitting thyristor L1 also becomes −3 V.

However, since the holding signal ϕb and the light-up signal ϕI1 (ϕI) are both "H" (0 V) at the time point c, the holding thyristor B1 does not get turned on. The light-emitting thyristor L1 does not get turned on, either, and thus does not light up (emit light).

The same operation is repeated at the time points f, i and l. Thus, right after the time point l, the memory thyristors M1, M2, M3 and M4 are in the ON state, and the transfer thyristor T4 also maintains the ON state. Additionally, the threshold voltages of the holding thyristors B1, B2, B3 and B4 and the light-emitting thyristors L1, L2, L3 and L4 are all −3 V.

As described above, at the time point l, the potential of the gate terminal Gt5 of the transfer thyristor T5 becomes −1.5 V. However, the potential of the gate terminal Gb5 of the holding thyristor B5 is maintained at −3.3 V, and thus the threshold voltage of the holding thyristors B5 is −4.8 V. The same is true for the threshold voltages of the holding thyristors B having numbers 6 or more.

Next, at the time point m, the holding signal ϕb is changed from "H" to "L" (−3.3 V). Thereby, the holding thyristors B1, B2, B3 and B4, whose threshold voltages are −3 V, get turned on. On the other hand, the holding thyristors B having numbers 5 or more maintain the OFF state, since the threshold voltages thereof are −4.8 V.

Note that the holding thyristors B are connected to the holding signal line 76 through the respective resistances Rc. Thus, even if one holding thyristor B is changed to the ON state and the potential of the cathode terminal thereof becomes −1.5 V, the potential of the holding signal line 76 is maintained at "L" without being drawn into the potential (−1.5 V) of the cathode terminal thereof. Accordingly, all of the plural holding thyristors B (holding thyristors B1, B2, B3 and B4, here), which have the threshold voltages higher than "L," may get turned on. The resistances Rc are set so that the potential of the holding signal line 76 is not drawn into that of the cathode terminal of the holding thyristor B in the ON state.

When the holding thyristors B1, B2, B3 and B4 get turned on, the potentials of the gate terminals Gb1, Gb2, Gb3 and Gb4 thereof become "H" (0 V). Thus, the potentials of the gate terminals Gl1, Gl2, Gl3 and Gl4 of the light-emitting thyristors L1, L2, L3 and L4, which are respectively connected to the gate terminals Gb1, Gb2, Gb3 and Gb4 of the holding thyristors B1, B2, B3 and B4, also become "H" (0 V). Thereby, the threshold voltages of the light-emitting thyristors L1, L2, L3 and L4 become −1.5 V.

Note that the threshold voltages of the light-emitting thyristors L having numbers 5 or more are maintained at −4.8 V, similarly to those of the holding thyristors B having numbers 5 or more.

At the time point n, the light-up signal ϕI1 (ϕI) changes from "H" to "Le." Then, the light-emitting thyristors L1, L2, L3 and L4 get turned on and light up (emit light).

Note that the light-emitting thyristors L are connected to the light-up signal line 75 without having resistances therebetween. Since the light-up signal ϕI1 is driven with a current, no resistances are needed therebetween.

At the same time point n, the memory signal ϕm1A (ϕm) changes from "L" to "H." Then, the potentials of the cathode terminals and the anode terminals of the memory thyristors M1, M2, M3 and M4 kept in the ON state are set at the same "H," and thereby the memory thyristors M1, M2, M3 and M4 get turned off. Accordingly, information on the positions (numbers) of the light-emitting thyristors L1, L2, L3 and L4 caused to light up is lost from the memory thyristors M1, M2, M3 and M4.

Here, by causing the holding thyristors B to get turned on, the threshold voltages of the light-emitting thyristors L are raised, and by changing the light-up signal ϕI1 (ϕI) from "H" to "Le" (−3 V<"Le"≤−1.5 V), the light-emitting thyristors L are caused to turn on and to light up (emit light). Note that by changing the holding thyristors B to the ON state at the time point m right before the time point n, the information on the positions (numbers) of the light-emitting thyristors L to be caused to light up is transferred (copied) to the holding thyristors B. Therefore, it is acceptable that the information on the positions (numbers) of the light-emitting thyristors L caused to light up is lost from the memory thyristors M, by causing the memory thyristors M to turn off.

Also at the time point n, the first transfer signal ϕ1 changes from "H" to "L." The operation of the transfer thyristors T associated with this change is similar to that of the transfer thyristors T at the time point n in the first exemplary embodiment.

In the second exemplary embodiment, at the time point n, change of the first transfer signal ϕ1 from "H" to "L," change of the memory signal ϕm1A (ϕm) from "L" to "H" and change of the light-up signal ϕI1 (ϕI) from "H" to "Le" are performed simultaneously. However, these changes need not be performed simultaneously. It is only necessary that the change of the memory signal ϕm1A (ϕm) from "L" to "H" is performed after the change of the holding signal ϕb from "H"

to "L" at the time point m. It is only necessary that the change of the light-up signal ϕI1 (ϕI) from "H" to "Le" is performed after the change of the holding signal ϕb from "H" to "L" at the time point m and before the change of the holding signal ϕb from "L" to "H" at the time point o. By this operation, the information on the positions (numbers) of the light-emitting thyristors L to be caused to light up is copied from the memory thyristors M to the holding thyristors B, and then is transmitted to the light-emitting thyristors L without being lost on the way.

On the other hand, the change of the first transfer signal ϕ1 from "H" to "L" may be performed after the change of the memory signal ϕm from "L" to "H." If the first transfer signal ϕ1 changes from "H" to "L" when the memory signal ϕm1A is "L," the threshold voltage of the memory thyristor M5 becomes −3 V due to turning-on of the transfer thyristor T5, and thereby the memory thyristor M5 gets turned on. Then, the holding thyristor B5 has the threshold voltage of −3 V, and gets turned on, which causes the light-emitting thyristor L5 to light up (emit light). Specifically, this results in that the light-emitting thyristors L1, L2, L3, L4 and L5 are in the ON state to light up (emit light) right after the time point n.

Right after the time point n, the light-emitting thyristors L1, L2, L3 and L4 are in the light-up (ON) state, and the holding thyristors B1, B2, B3 and B4 and the transfer thyristors T4 and T5 are in the ON state.

At the time point o, the holding signal ϕb changes from "L" to "H," and the second transfer signal ϕ2 changes from "L" to "H."

When the holding signal ϕb changes from "L" to "H," the potentials of the cathode terminals and the anode terminals of the holding thyristors B become "H," and thus the holding thyristors B1, B2, B3 and B4 in the ON state get turned off. Thereby, the information on the positions (numbers) of the light-emitting thyristors L caused to light up is lost from the holding thyristors B. However, at the time point n right before the time point o, the light-emitting thyristors L have been caused to light up, and thus there is no problem if the information on the positions (numbers) of the light-emitting thyristors L caused to light up is lost from the holding thyristors B.

Additionally, by the change of the second transfer signal ϕ2 from "L" to "H," the transfer thyristor T4 gets turned off.

Therefore, right after the time point o, the light-emitting thyristors L1, L2, L3 and L4 are in the light-up (ON) state, and the transfer thyristor T5 is kept in the ON state.

At the time point p, the memory signal ϕm changes from "H" to "L", and then the memory thyristor M5 gets turned on. Thereby, the potential of the gate terminal Gb5 of the holding thyristor B5 (the same applies to the gate terminal Gl5 of the light-emitting thyristor L5) becomes −1.5 V through the forward-biased connecting diode Db5. Thus, the threshold voltage of the holding thyristor B5 (the same applies to the light-emitting thyristor L5) becomes −3 V.

Note that the potential of the gate terminal Gm6 of the memory thyristor M6 is −3 V. Thus, the potential of the gate terminal Gb6 of the holding thyristor B6 is maintained at the power supply potential Vga (−3.3 V), and the threshold voltage of the holding thyristor B6 is −4.8 V. The threshold voltages of the holding thyristors B having numbers 7 or more are also −4.8 V.

On the other hand, the potential of the gate terminal Gt5 of the transfer thyristor T5 in the ON state is "H" (0 V). However, since the coupling diode Dc4 is reverse-biased, the gate terminal Gt4 of the transfer thyristor T4 is not influenced by the gate terminal Gt5 having the potential of "H" (0 V), and thus the potential of the gate terminal Gt4 is at the power supply potential Vga (−3.3 V). Accordingly, the potential of the gate terminal Gb4 of the holding thyristor B4 is also at the power supply potential Vga (−3.3 V), and the threshold voltage of the holding thyristor B4 becomes −4.8 V. Similarly, the threshold voltages of the holding thyristors B having numbers 3 or less are −4.8 V.

Note that since the holding signal ϕb is "H" at the time point p, the holding thyristor B5 does not get turned on.

Furthermore, since the light-up signal ϕI1 (ϕI) is "Le" (−3 V<"Le"≤−1.5 V) at the time point p, the light-emitting thyristor L5 having the threshold voltage of −3 V does not get turned on, and thus does not light up (emit light).

Accordingly, right after the time point p, the light-emitting thyristors L1, L2, L3 and L4 maintain the light-up (ON) state, and the transfer thyristor T5 and the memory thyristor M5 are in the ON state.

As described above, in the second exemplary embodiment, in the light-up period during which the light-emitting thyristors L in a group are caused to light up (emit light), the memory thyristors M are caused to memorize the positions (numbers) of the light-emitting thyristors L in the next group to be caused to light up. Thereby, the light-emitting thyristors L in the group and those in the next group are caused to light up (emit light) in a short time interval.

Similarly, in the period T(II), the memory thyristors M6, M7 and M8 as well as the memory thyristor M5 get turned on sequentially in a period from the time point p to a time point q. Thereby, the threshold voltages of the holding thyristors B6, B7 and B8 (the same applies to the light-emitting thyristors L6, L7 and L8) become −3 V. Similarly to the above, the light-emitting thyristors L6, L7 and L8 do not get turned on, and keep being put out. On the other hand, the light-emitting thyristors L1, L2, L3 and L4 maintain the light-up (ON) state in the period from the time point p to the time point q.

Specifically, right after the time point q, the light-emitting thyristors L1, L2, L3 and L4 maintain the ON state and light up (emit light), while the transfer thyristor T8 and the memory thyristors M5, M6, M7 and M8 are in the ON state.

Next, at the time point r, the light-up signal ϕI1 (ϕI) changes from "Le" to "H," and the holding signal ϕb changes from "H" to "L."

When the light-up signal ϕI1 (ϕI) changes from "Le" to "H," the potentials of the cathode terminals and the anode terminals of the light-emitting thyristors L1, L2, L3 and L4 having been lighting up (emitting light) are set at the same "H." Thereby, the light-emitting thyristors L1, L2, L3 and L4 get turned off and put out.

Meanwhile, when the holding signal ϕb changes from "H" to "L," the holding thyristors B5, B6, B7 and B8, whose threshold voltages are −3 V, get turned on. Then, similarly to the time point m, the threshold voltages of the light-emitting thyristors L5, L6, L7 and L8 become −1.5 V.

Note that, at the time point r, change of the light-up signal ϕI1 (ϕI) from "Le" to "H" and change of the holding signal ϕb from "H" to "L" are performed simultaneously. Here, the change of the holding signal ϕb from "H" to "L" may be performed after the change of the light-up signal ϕI1 (ϕI) from "Le" to "H." This is because if the holding signal ϕb changes from "H" to "L" when the light-up signal ϕI1 (ϕI) is "Le," the light-emitting thyristors L5, L6, L7 and L8 having the threshold voltages of −1.5 V get turned on and light up (emit light).

Accordingly, right after the time point r, the memory thyristors M5, M6, M7 and M8, the holding thyristors B5, B6, B7 and B8 and the transfer thyristor T8 are in the ON state.

Next, at the time point s, the light-up signal ϕI1 (ϕI) changes from "H" to "Le." Then, similarly to the time point n, the light-emitting thyristors L5, L6, L7 and L8, whose threshold voltages are −1.5 V, get turned on and light up (emit light).

At the same time point s, the first transfer signal ϕ1 changes from "H" to "L," and the memory signal ϕm1A (ϕm) changes from "L" to "H." These changes are similar to those at the time point n, and thus the detailed description thereof is omitted.

As described above, in the second exemplary embodiment, the lighting-up (light emission) of the light-emitting thyristors L and the operation to turn on the memory thyristors M that memorize the positions (numbers) of the light-emitting thyristors L to be caused to light up next are performed in parallel. Thereby, the lighting-up (light emission) of the light-emitting thyristors L is successively performed with a shorter halt period (from the time point r to the time point s in FIG. 14) interposed, as compared with the case in the first exemplary embodiment.

Thus, the writing time to the photoconductive drum 12 by the print head 14 becomes shorter.

This is attributed to the fact that, by providing the holding thyristors B, the information on the positions (numbers) of the light-emitting thyristors L to be caused to light up, which are memorized in the memory thyristors M, is transferred to the holding thyristors B, the information on the positions (numbers) of the light-emitting thyristors L to be caused to light up is deleted (cleared) from the memory thyristors M, and the positions (numbers) of the light-emitting thyristors L to be caused to light up next are memorized in the memory thyristors M.

In other words, this is attributed to the fact that, by interposing the holding thyristors B therebetween, an electric relationship between the memory thyristors M and the light-emitting thyristors L are cut off, and thereby the change of the states of the memory thyristors M is prevented from influencing the light-emitting thyristors L.

The holding thyristors B cause the respective light-emitting thyristors L to be likely to be set in the ON state by changing into the ON state as compared with a case of being in the OFF state, similarly to the memory thyristors M in the first exemplary embodiment.

In FIG. 14, all the light-emitting thyristors L in the groups #I, #II, #III and #IV are caused to light up. However, similarly to the first exemplary embodiment, if some light-emitting thyristors L are not caused to light up, it is only necessary to maintain the memory signal ϕm at "S," thereby to prevent the memory thyristors M from getting turned on (to maintain the OFF state). When the memory thyristors M are in the OFF state, the corresponding holding thyristors B do not get turned on, either, and thus the light-emitting thyristors L do not light up (emit light).

Figure 15:
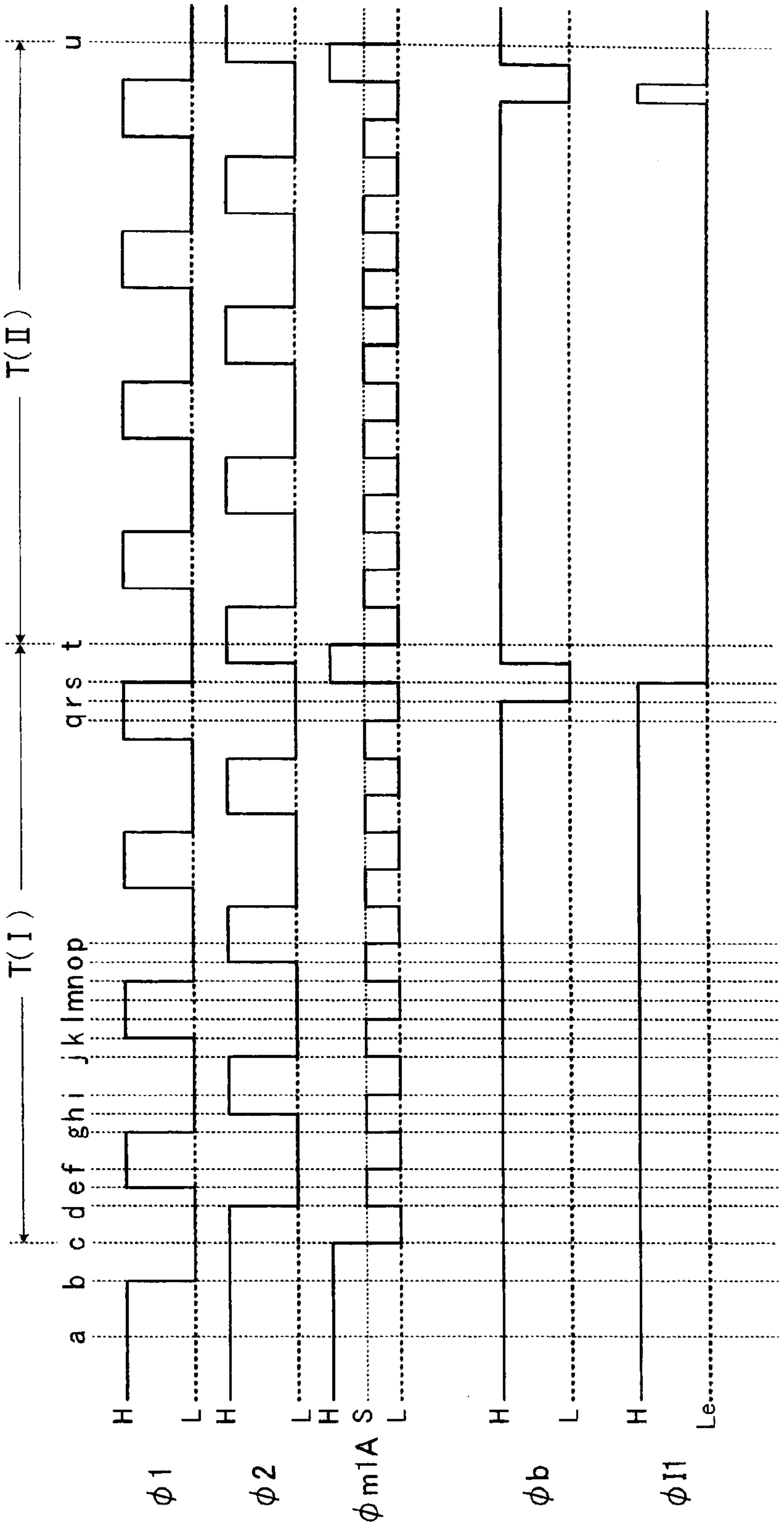
FIG. 15 is another timing chart for explaining the operation of the light-emitting chip in the second exemplary embodiment.

FIG. 15 is another timing chart for explaining the operation of the light-emitting chip C in the second exemplary embodiment. The part of the SLED_A of the light-emitting chip C1 is described as an example. FIG. 15 shows a case where the light-up control is performed on each group including eight light-emitting thyristors L as shown in FIG. 11B. Note that FIG. 15 shows the part where the light-up control is performed on the group #I of the eight light-emitting thyristors L.

It is supposed that all the eight light-emitting thyristors L1 to L8 of the group #I are caused to light up in the period T(I) between the time points c and t in FIG. 15.

In FIG. 15, similarly to FIG. 14, passing of time is illustrated in alphabetical order from the time point a to the time point u. The light-up control is performed on the light-emitting thyristors L1 to L8 of the group #I in FIG. 11B, in the period T(I) between the time points c and t.

The operation performed between the time points c and n to set the four memory thyristors M in FIG. 14 to the ON state is repeated twice in a period between the time points c and q in the period T(I) in FIG. 15. Then, the holding signal ϕb changes from "H" to "L" at the time point r, and the light-up signal ϕI1 (ϕI) changes from "H" to "Le" at the time point s.

The operation of the part of the SLED_A of the light-emitting chip C1 (C) is the same as that in the case of four light-emitting points (light-emitting thyristors L) described above, and thus the description thereof is omitted.

Note that, as shown in FIGS. 14 and 15, eight light-emitting points (light-emitting thyristors L) may be caused to turn on to light up (emit light) simultaneously only by changing the waveforms of the first transfer signal ϕ1, the second transfer signal ϕ2, the memory signal ϕm1A (ϕm), the holding signal ϕb and the light-up signal ϕI1 (ϕI) without changing the light-emitting chip C1 (C).

Thus, the number of the light-emitting points (light-emitting thyristors L) to be caused to light up may be arbitrarily set.

Third Exemplary Embodiment

The configuration of the light-emitting chips C in the third exemplary embodiment is different from that in the second exemplary embodiment.

The light-emitting chips C in the first and second exemplary embodiments are driven with the memory signals ϕm (ϕm1A to ϕm60A and ϕm1B to ϕm60B) having three potential levels (three values). Specifically, "L" (−3.3 V) is an instruction for causing the light-emitting thyristors L to light up, and causes the memory thyristors M to turn on. "H" (0 V) is an instruction for clearing (resetting) memorized designation of the light-emitting thyristors L to be caused to light up, and causes the memory thyristors M in the ON state to turn off. Additionally, the memory level "S" ($-3\text{ V}<\text{"S"}\leq-1.5\text{ V}$) is a potential between "H" and "L," and is a potential that does not cause the memory thyristors M in the OFF state to turn on, but maintains the ON state of the memory thyristors M without getting turned off.

Thus, the light-emitting chips C in the first and second exemplary embodiments are driven by a power source that outputs a potential having three values.

The light-emitting chips C in the third exemplary embodiment are driven with the memory signals ϕm (ϕm1A to ϕm60A and ϕm1B to ϕm60B) having two potential levels (two values). Accordingly, the light-emitting chips C in the third exemplary embodiment may be driven by a power source that outputs a potential having two values, and thus are driven more easily.

The configuration of the signal generating circuit 100 mounted on the circuit board 62 (see FIG. 2) and the wiring configuration of the circuit board 62 in the third exemplary embodiment are the same as those in the second exemplary embodiment shown in FIG. 10. Thus, the description of the configuration of the signal generating circuit 100 mounted on the circuit board 62 and the wiring configuration of the circuit board 62 will be omitted.

Furthermore, an outline of the light-emitting chip C is also the same as that in the second exemplary embodiment shown in FIGS. 11A and 11B. Thus, the description of the outline of the light-emitting chip C will be omitted.

Figure 16:
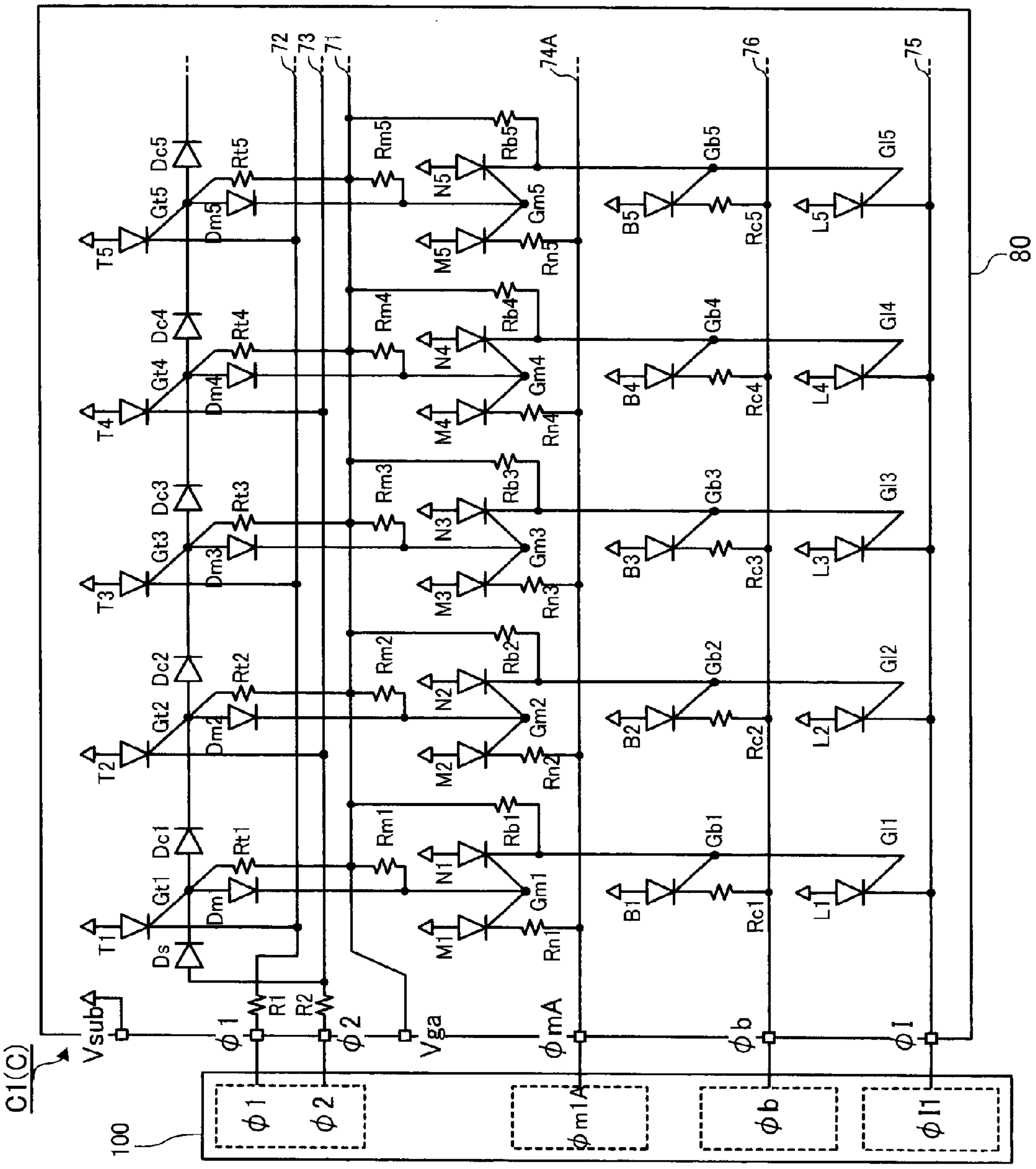
FIG. 16 is a diagram for explaining a circuit configuration of the light-emitting chip in the third exemplary embodiment.

FIG. 16 is a diagram for explaining a circuit configuration of the light-emitting chip C in the third exemplary embodiment. Here, the part of the SLED_A of the light-emitting chip C1 is described as an example, and thus the light-emitting chips C are denoted by the light-emitting chip C1 (C). A part related to the light-emitting thyristors L1 to L5 is shown in FIG. 16. The same reference numerals are given to the same components as those in the second exemplary embodiment shown in FIG. 12, and the detailed description thereof is omitted.

The part of the SLED_A of the light-emitting chip C1 (C) in the third exemplary embodiment includes a storing thyristor array (a storing element array) formed of storing thyristors N1, N2, N3 . . . , as an example of storing elements arrayed in line, which are placed on the substrate 80 (see FIGS. 17A and 17B to be described later) and which store (memorize) information that the respective memory thyristors M have got turned on, instead of the connecting diodes Db1, Db2, Db3 . . . in the part of the SLED_A of the light-emitting chip C1 (C) in the second exemplary embodiment (see FIG. 12).

Here, when the storing thyristors N1, N2, N3 . . . are not distinguished, they are called storing thyristors N.

Note that the storing thyristors N are semiconductor devices each having three terminals that are an anode terminal, a cathode terminal and a gate terminal. An anode terminal, a cathode terminal and a gate terminal of the storing thyristor N are referred to as fifth anode, fifth cathode and fifth gate, respectively.

The number of the storing thyristors N is 128, similarly to the first exemplary embodiment.

The storing thyristors N1, N2, N3 . . . are arrayed in numerical order from the left side of FIG. 16, similarly to the transfer thyristors T1, T2, T3 . . . and the like in the second exemplary embodiment.

The other components are the same as those in the second exemplary embodiment shown in FIG. 12. Thus, the same reference numerals are given to the same components as those in the second exemplary embodiment, and the detailed description thereof is omitted.

Next, a description will be given of electric connections between the elements in the part of the SLED_A of the light-emitting chip C1 (C). Here, the electric connections are described mainly of the storing thyristors N provided instead of the connecting diodes Db in the second exemplary embodiment shown in FIG. 12.

Anode terminals of the storing thyristors N1, N2, N3 . . . are connected to the substrate 80, similarly to the anode terminals of the transfer thyristors T1, T2, T3 . . . and the like. These anode terminals are connected to the power supply line 104 (see FIG. 10) through the Vsub terminal provided on the substrate 80. To this power supply line 104, the reference potential Vsub is supplied.

Gate terminals of the storing thyristors N1, N2, N3 . . . are connected to the gate terminals Gm1, Gm2, Gm3 . . . of the memory thyristors M1, M2, M3 . . . , respectively.

Additionally, cathode terminals of the storing thyristors N are respectively connected to the gate terminals Gb of the holding thyristors B and the gate terminals Gl of the light-emitting thyristors L.

Figures 17A, 17B:
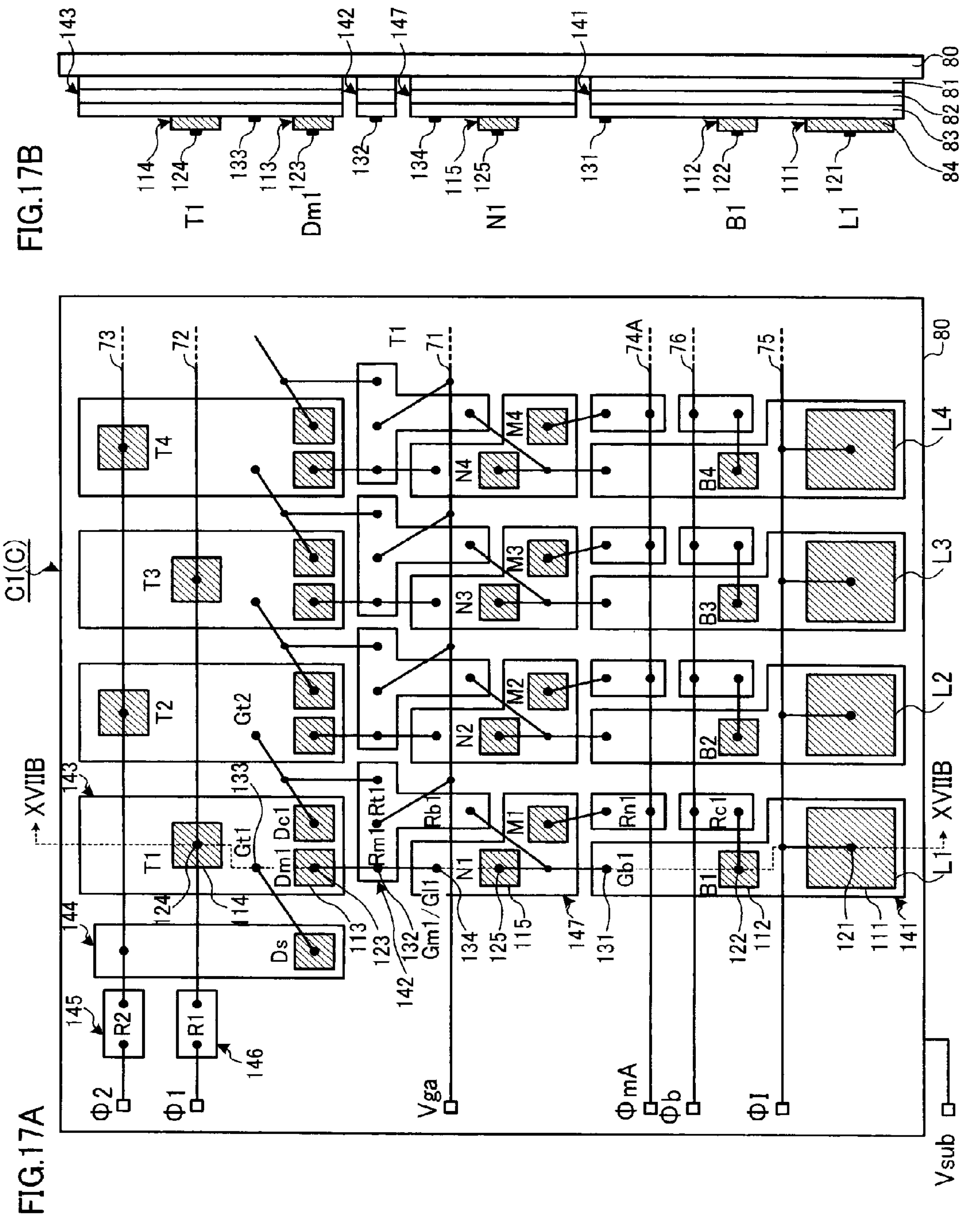
FIGS. 17A and 17B are a planar layout and a cross-sectional view of the light-emitting chip in the third exemplary embodiment.

FIGS. 17A and 17B are a planar layout and a cross-sectional view of the light-emitting chip C in the third exemplary embodiment. Here, the part of the SLED_A of the light-emitting chip C1 is described as an example, and thus the light-emitting chips C are denoted by the light-emitting chip C1 (C). FIG. 17A is a planar layout of a part related to the light-emitting thyristors L1 to L4 in the part of the SLED_A of the light-emitting chip C1 (C). FIG. 17B is a cross-sectional view of FIG. 17A, taken along a line XVIIB-XVIIB. Note that, in FIGS. 17A and 17B, elements and terminals are shown by using the above-mentioned names.

In the third exemplary embodiment, the storing thyristor N1 is provided instead of the connecting diode Db1 in the seventh island 147 in the planar layout of the second exemplary embodiment shown in FIGS. 13A and 13B.

The storing thyristor N1 has the substrate 80 set as the anode terminal, an n-type ohmic electrode 125 set as the cathode terminal, and a p-type ohmic electrode 134 set as the gate terminal Gm1 that is common to the memory thyristor M1. Here, the n-type ohmic electrode 125 is formed in a region 115 of the n-type fourth semiconductor layer 84, while the p-type ohmic electrode 134 is formed on the p-type third semiconductor layer 83 exposed by removing the n-type fourth semiconductor layer 84 by etching.

The n-type ohmic electrode 125 that is the cathode terminal of the storing thyristor N1 is connected to the gate terminal Gb1 (this also functions as the gate terminal Gl1 of the light-emitting thyristor L1) of the holding thyristor B1.

Next, a description will be given of the operation of the light-emitting portion 63. As shown in FIG. 10, the first transfer signal ϕ1, the second transfer signal ϕ2 and the holding signal ϕb are transmitted in common to each of the light-emitting chips C (C1 to C60) forming the light-emitting portion 63. Additionally, as shown in FIGS. 11A and 11B, each of the light-emitting chips C (C1 to C60) includes the SLED_A and the SLED_B. The first transfer signal ϕ1, the second transfer signal ϕ2 and the holding signal ϕb are transmitted in common to the SLED_A and the SLED_B. Accordingly, the first transfer signal ϕ1, the second transfer signal ϕ2 and the holding signal ϕb are transmitted in common to all the SLEDs in the light-emitting chips C (C1 to C60), and thereby all the SLEDs are driven in parallel.

Meanwhile, the memory signals ϕm (ϕm1A to ϕm60A and ϕm1B to ϕm60B) that are different for each of the SLEDs are transmitted on the basis of image data. Additionally, regarding every two of the light-emitting chips C as a pair, each of the light-up signals ϕI (ϕI1 to ϕI30) are transmitted in common to the corresponding pair of the light-emitting chips C (C1 to C60).

To be short, in the third exemplary embodiment, the first transfer signal ϕ1, the second transfer signal ϕ2 and the holding signal ϕb are transmitted in common to all the SLEDs. On the other hand, the memory signals ϕm are individually transmitted to the respective SLEDs. The light-up signals ϕI are transmitted in common to the respective pairs of the light-emitting chips C. Since all the SLEDs are similarly operated, the operation of the light-emitting portion 63 is recognized if that of the part of the SLED_A of the light-emitting chip C1 is described. Hereinafter, the operation of the light-emitting chips C will be described by taking the SLED_A of the light-emitting chip C1 as an example.

Figure 18:
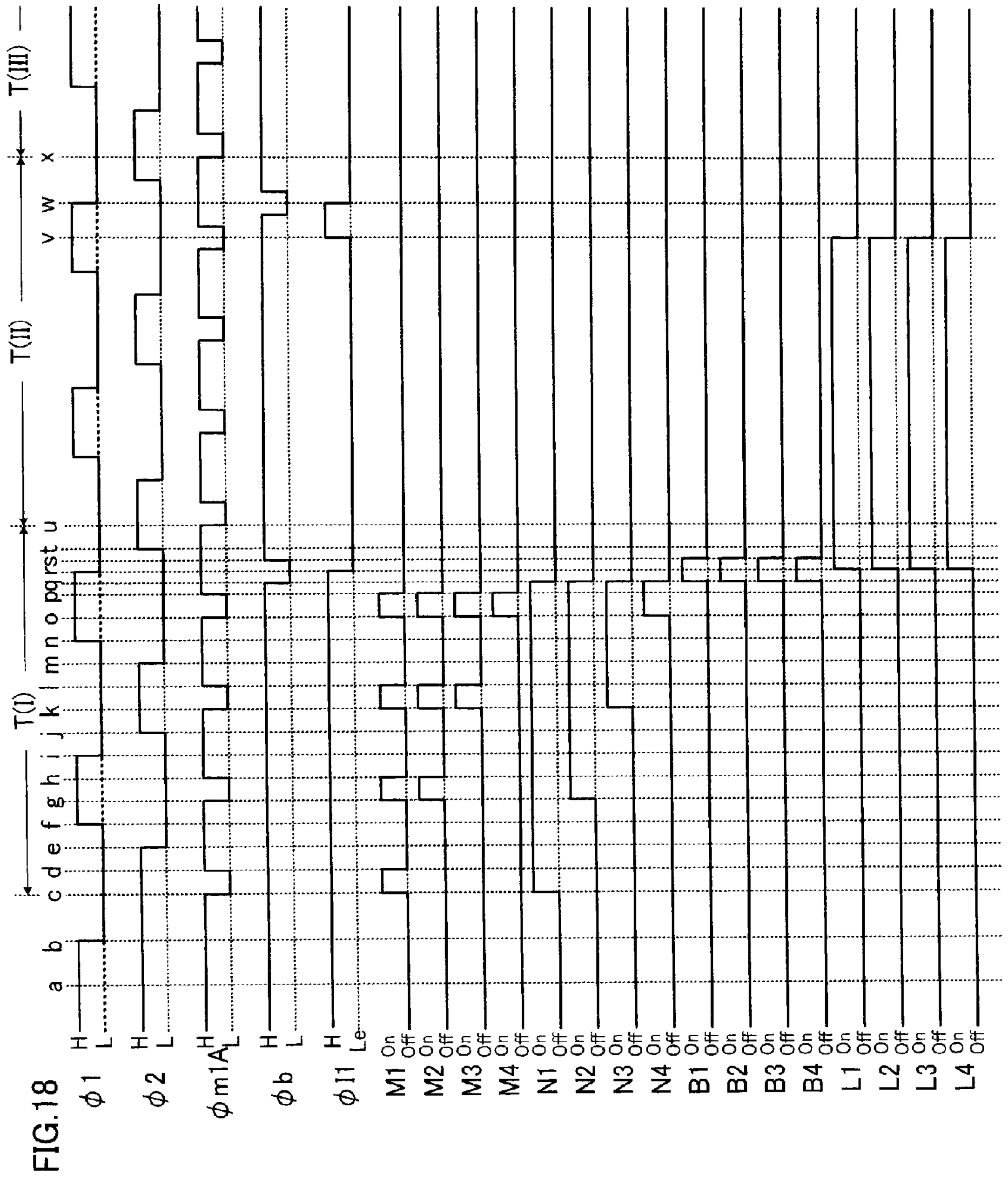
FIG. 18 is another timing chart for explaining the operation of the light-emitting chip in the third exemplary embodiment.

FIG. 18 is a timing chart for explaining the operation of the light-emitting chip C in the third exemplary embodiment. The part of the SLED_A of the light-emitting chip C1 is described as an example.

FIG. 18 shows a case where light-up control is performed on the four light-emitting thyristors L for each group shown in FIG. 11A. Here, the respective four light-emitting thyristors L in the groups #I and #II are all caused to light up simultaneously.

In FIG. 18, passing of time is illustrated in alphabetical order from a time point a to a time point x. In a period T(I) from a time point c to a time point u, in order to cause the four light-emitting thyristors L1 to L4 in the group #I shown in FIG. 11A to light up simultaneously, the memory thyristors M1, M2, M3 and M4 are sequentially caused to turn on. Along with turning-on of the memory thyristors M1, M2, M3 and M4, the storing thyristors N1, N2, N3 and N4 are sequentially caused to turn on, thereby to memorize the positions (numbers) of the light-emitting thyristors L1, L2, L3 and L4 to be caused to be light up. Then, in a light-up period from a time point r to a time point v, the light-emitting thyristors L1 to L4 are caused to light up (emit light).

Next, in a period T(II) from the time point u to the time point x, although not shown in FIG. 18, in order to cause the four light-emitting thyristors L5 to L8 in the group #II shown in FIG. 11A to light up simultaneously, the memory thyristors M5, M6, M7 and M8 are sequentially caused to turn on. Along with turning-on of the memory thyristors M5, M6, M7 and M8, the storing thyristors N5, N6, N7 and N8 are caused to turn on, thereby to memorize the positions (numbers) of the light-emitting thyristors L5, L6, L7 and L8 to be caused to be light up. Then, in the subsequent period from a time point w, the light-emitting thyristors L5, L6, L7 and L8 are caused to light up (emit light).

Then, similarly to the above, the light-up control is performed up to the light-emitting thyristor L128 if the number of the light-emitting thyristors L is 128.

In the third exemplary embodiment, the operations of the memory thyristors M, the storing thyristors N, the holding thyristors B and the light-emitting thyristors L are associated with each other. Thus, the way to illustrate in the timing chart of the third exemplary embodiment shown in FIG. 18 is different from that of the second exemplary embodiment shown in FIG. 14. Specifically, in FIG. 18, the ON state (On) and the OFF state (Off) of the memory thyristors M1 to M4, the storing thyristors N1 to N4, the holding thyristors B1 to B4 and the light-emitting thyristors L1 to L4 are shown as well as the waveforms of the first transfer signal ϕ1, the second transfer signal ϕ2, the memory signal ϕm1A, the holding signal ϕb and the light-up signal ϕI1.

The first transfer signal ϕ1, the second transfer signal ϕ2 and the holding signal ϕb respectively have the same signal waveforms repeated in every period such as the period T(I), the period T(II) . . . . Meanwhile, the memory signal ϕm1A (ϕm) changes on the basis of image data. However, the memory signal ϕm1A (ϕm) has the same waveforms in every period such as the period T(I), the period T(II) . . . , because the four light-emitting thyristors L on which the light-up control is performed simultaneously in the periods T(I) and T(II) are all caused to light up in FIG. 18.

The starting time point c of the period T(I) corresponds to timing when the light-emitting chip C1 (C) goes into an operation state, and thus there is no light-emitting thyristor L that is lighting up (emitting light) at this time. Accordingly, the waveform of the light-up signal ϕI1 (ϕI) is different between in the period T(I) and the period T(II). However, in the period T(II) and the subsequent period, the same waveform is repeated.

Therefore, hereinafter, a description will be given of the waveforms of the signals other than the light-up signal ϕI1 (ϕI), in the period T(I) (from the time point c to the time point u). As for the light-up signal ϕI1 (ϕI), a description will be given of the waveform in the period T(II) (from the time point u to the time point w).

A period from the time point a to the time point c is a period for starting the operation of the light-emitting chip C1 (C), similarly to the second exemplary embodiment.

A description will be given of the waveforms of the first transfer signal ϕ1, the second transfer signal ϕ2, the memory signal ϕm1A (ϕm) and the holding signal ϕb in the period T(I).

The first transfer signal ϕ1 is "L" at the starting time point c of the period T(I), changes from "L" to "H" at a time point f, and then changes from "H" to "L" at a time point i. Subsequently, the first transfer signal ϕ1 changes from "L" to "H" at a time point n, and changes from "H" to "L" at the time point r. Thereafter, the first transfer signal ϕ1 remains at "L" until the finishing time point u of the period T(I).

The second transfer signal ϕ2 is "H" at the starting time point c of the period T(I), changes from "H" to "L" at a time point e, and then changes from "L" to "H" at a time point j. Subsequently, the second transfer signal ϕ2 changes from "H" to "L" at a time point m and changes from "L" to "H" at a time point t. Thereafter, the second transfer signal ϕ2 remains at "H" until the finishing time point u of the period T(I).

Here, in the period between the time points c and u, the first transfer signal ϕ1 and the second transfer signal ϕ2, when compared with each other, repeat "H" and "L" alternately to each other, with intervening periods in which both signals are set at "L" (for example, a period between the time points e and f and a period between the time points i and j). The first transfer signal ϕ1 and the second transfer signal ϕ2 do not have a period when the potential thereof are set at "H" simultaneously.

The memory signal ϕm1A (ϕm) changes from "H" to "L" at the starting time point c of the period T(I), and changes from "L" to "H" at a time point d. The memory signal ϕm1A (ϕm) then changes from "H" to "L" at a time point g and changes from "L" to "H" at a time point h. Further, the memory signal ϕm1A (ϕm) changes from "H" to "L" at a time point k, changes from "L" to "H" at a time point l, changes from "H" to "L" at a time point o, and then changes from "L" to "H" at a time point p. The memory signal ϕm1A (ϕm) remains at "H" until the finishing time point u of the period T(I).

Specifically, in the third exemplary embodiment, the memory signal ϕm1A (ϕm) is different from that in the first and second exemplary embodiments in having no periods in which the memory signal ϕm1A (ϕm) is "S."

The relationship between the memory signal ϕm1A (ϕm) and the first transfer signal ϕ1 and second transfer signal ϕ2 is now described. In the period when only one of the first transfer signal ϕ1 and the second transfer signal ϕ2 is set at "L," the memory signal ϕm1A (ϕm) is set at "L." For example, the memory signal ϕm1A (ϕm) is set at "L" in the period between the time points c and d in a period from a time point b to the time point e, when only the first transfer signal ϕ1 is set at "L," and in the period between the time points g and h in a period from the time point f to the time point i, when only the second transfer signal ϕ2 is set at "L."

On the other hand, the holding signal ϕb is "H" at the starting time point c of the period T(I), and changes from "H" to "L" at a time point q. Thereafter, the holding signal ϕb changes from "L" to "H" at a time point s, and remains at "H" until the finishing time point p of the period T(I).

The light-up signal ϕI1 (ϕI) changes from "H" to "Le" ($-3\text{ V}<\text{"Le"}\leq-1.5\text{ V}$) at the time point r in the period T(I), and changes from "Le" to "H" at the time point v in the period T(II). The light-up signal ϕI1 (ϕI) then changes from "H" to "Le" again at the time point w. Thereafter, the light-up signal ϕI1 (ϕI) remains at "Le" at the finishing time point x of the period T(II). The light-emitting thyristors L1, L2, L3 and L4 are caused to light up (emit light) in the period of "Le" from the time point r to the time point v. Then, the light-emitting thyristors L5 to L8 are caused to light up in the period of "Le" starting from the time point w, although not shown in FIG. 18.

The relationship between the holding signal ϕb and the light-up signal ϕI1 (ϕI) is as follows. In a period when the holding signal ϕb is "L" (for example, a period from the time point q to the time point s), the light-up signal ϕI1 (ϕI) changes from "H" to "Le."

Next, with reference to FIG. 16, an operation of the light-emitting portion 63 and the part of the SLED_A of the light-emitting chip C1 (C) will be described according to the timing chart shown in FIG. 18. The operation of the SLED_A of the light-emitting chip C1 (C) is similar to that of the SLED_A of the light-emitting chip C1 (C) in the second exemplary embodiment. Thus, in the description of the operation of the SLED_A of the light-emitting chip C1 (C) in the third exemplary embodiment, the description of the operation similar to that in the first and second exemplary embodiments will be omitted.

(Initial State)

At the time point a in the timing chart shown in FIG. 18, the Vsub terminal, which is provided on each of the light-emitting chips C (C1 to C60) of the light-emitting portion 63, is set at the reference potential Vsub (“H” (0 V)). Each Vga terminal of the light-emitting chips C (C1 to C60) of the light-emitting portion 63 is set at the power supply potential Vga (see FIG. 10). However, the power supply potential Vga is not a potential of “L” (−3.3 V) in the second exemplary embodiment, but a potential satisfying −3 V<Vga≤−1.5 V, as will be described later. Hereinafter, the power supply potential Vga is supposed to be −2.5 V as an example, and is denoted by Vga (−2.5 V).

The signal generating circuit 100 sets the first transfer signal ϕ1, the second transfer signal ϕ2 and the holding signal ϕb at “H,” and sets the memory signals ϕm (ϕm1A to ϕm60A and ϕm1B to ϕm60B) and the light-up signals ϕI (ϕI1 to ϕI30) at “H.”

Then, the potentials of the ϕ1 terminal, the ϕ2 terminal, the ϕmA terminal, the ϕmB terminal, the ϕb terminal and the ϕI terminal of each light-emitting chip C become “H.” Thus, the potentials of the first transfer signal line 72, the second transfer signal line 73, the memory signal lines 74A and 74B, the holding signal line 76 and the light-up signal line 75 become “H.”

Thereby, the anode terminals and the cathode terminals of the transfer thyristors T, the memory thyristors M, the holding thyristors B and the light-emitting thyristors L have the potentials set at “H,” and thus are in the OFF state.

On the other hand, the cathode terminals (the gate terminals Gb (Gl)) of the storing thyristors N are connected to the power supply line 71 through the respective power supply line resistances Rb. Accordingly, the potentials of the cathode terminals of the storing thyristors N are set at Vga (−2.5 V).

As described in the first exemplary embodiment, the potential of the gate terminal Gt1 is set at −1.5 V by the start diode Ds, and thus the threshold voltage of the transfer thyristor T1 is −3 V.

The potentials of the gate terminals Gt having numbers 2 or more are set at Vga (−2.5 V) by the power supply line 71 connected through the respective power supply line resistances Rt. Thus, the threshold voltages of the transfer thyristors T having numbers 2 or more are −4 V.

On the other hand, since the gate terminals Gm of the memory thyristors M and the storing thyristors N are connected to the power supply line 71 through the respective power supply line resistances Rm, the potentials thereof are set at Vga (−2.5 V). Thus, the threshold voltages of the memory thyristors M and the storing thyristors N are −4 V. Accordingly, the storing thyristors N do not get turned on even if the potentials of the cathode terminals thereof are at Vga (−2.5 V).

(Operation State)

At the time point b, the first transfer signal ϕ1 changes from “H” (0 V) to “L” (−3.3 V). Then, the transfer thyristor T1, whose threshold voltage is −3 V, is changed to the ON state, similarly to the first exemplary embodiment, and the potential of the gate terminal Gt1 of the transfer thyristor T1 becomes “H” (0 V). Thereby, the potential of the gate terminal Gt2 becomes −1.5 V, and the threshold voltage of the transfer thyristor T2 becomes −3 V.

The potential of the gate terminal Gm1 that is connected through the forward-biased connecting diode Dm1 to the gate terminal Gt1 having the potential of “H” (0 V) becomes −1.5 V. Thus, the threshold voltages of the memory thyristor M1 and the storing thyristor N1 become −3 V. However, the memory thyristor M1 does not get turned on because the potential of the cathode terminal thereof is at “H” (0 V). The storing thyristor N1 does not get turned on because the potential of the cathode terminal thereof is at Vga (−2.5 V).

Additionally, even when the potential of the gate terminal Gt2 becomes −1.5 V, the potential of the gate terminal Gm2 is at Vga (−2.5 V). Thus, the threshold voltages of the memory thyristor M2 and the storing thyristor N2 remain at −4 V.

At the time point c, the memory signal ϕm1A (ϕm) changes from “H” (0 V) to “L” (−3.3 V). Then, the memory thyristor M1, whose threshold voltage is −3 V, gets turned on. The potential of the gate terminal Gm1 becomes “H” (0 V), and the threshold voltage of the storing thyristor N1 becomes −1.5 V. Then, the storing thyristor N1 gets turned on because the potential of the cathode terminal thereof is at Vga (−2.5 V). Thereby, the potential of the cathode terminal of the storing thyristor N1 becomes −1.5 V of the diffusion potential Vd.

Since the cathode terminal of the storing thyristor N1 is connected to the gate terminal Gb1 of the holding thyristor B1 and the gate terminal Gl1 of the light-emitting thyristor L1, the threshold voltages of the holding thyristor B1 and the light-emitting thyristor L1 become −3 V.

At the time point d, the memory signal ϕm1A (ϕm) changes from “L” (−3.3 V) to “H” (0 V). Then, the memory thyristor M1 gets turned off because the potentials of the cathode terminal and the anode terminal thereof become “H” (0 V).

However, the storing thyristor N1 maintains the ON state because the cathode terminal thereof is connected to the power supply line 71 having the potential of Vga (−2.5 V) through the power supply line resistance Rb1.

In the second exemplary embodiment described above, the memory signal ϕm (ϕm) changes to “S” (−3 V<“S”≤−1.5 V) at the time point d, and thereby the memory thyristor M1 is maintained in the ON state. In contrast, in the third exemplary embodiment, the memory signal ϕm1A (ϕm) changes to “H” (0 V) at the time point d, and thereby the memory thyristor M1 gets turned off. However, since the storing thyristor N1 remains in the ON state, the storing thyristor N1 remembers the information on the position (number) of the light-emitting thyristor L1 to be caused to light up. In this way, the third exemplary embodiment uses two values, namely, “H” (0 V) and “L” (−3.3 V) for the potential of the memory signal ϕm1A (ϕm), and does not use “S” (−3 V<“S”≤−1.5 V) between “H” and “L.”

Next, at the time point e, the second transfer signal ϕ2 changes from “H” (0 V) to “L” (−3.3 V), and then the transfer thyristor T2, whose threshold voltage is −3 V, gets turned on. Then, the potentials of the gate terminals Gt2 and Gt3 become “H” (0 V) and −1.5 V, respectively, and the threshold voltage of the transfer thyristor T3 becomes −3 V.

Meanwhile, due to the potential change of the gate terminals Gt2 to “H” (0 V), the potential of the gate terminal Gm2 becomes −1.5 V, and the threshold voltages of the memory thyristor M2 and the storing thyristor N2 become −3 V. However, the memory thyristor M2 does not get turned on because the memory signal ϕm1A (ϕm) is at “H” (0 V). The storing thyristor N2 does not get turned on because the potential of the cathode terminal thereof is at Vga (−2.5 V).

Thus, right after the time point e, the transfer thyristors T1 and T2 and the storing thyristor N1 are in the ON state.

At the time point f, the first transfer signal ϕ1 changes from “L” (−3.3 V) to “H” (0 V). Then, the transfer thyristor T1 gets turned off because the potentials of the cathode terminal and the anode terminal thereof are set at “H” (0 V). Thereby, the potential of the gate terminal Gt1 changes toward Vga (−2.5 V). Since the coupling diode Dc1 becomes reverse-biased, the gate terminal Gt1 is not influenced by the gate terminal Gt2 being at “H” (0 V). The storing thyristor N1 is in the ON state, and thus the gate terminal Gm1 is also set at “H” (0 V). Accordingly, since the connecting diode Dm1 becomes reverse-biased, the gate terminal Gt1 is not influenced by the gate terminal Gm1 being at “H” (0 V). Therefore, the threshold voltage of the transfer thyristor T1 becomes −4 V.

At the time point g, the memory signal ϕm1A (ϕm) changes from “H” (0 V) to “L” (−3.3 V) again, and then the memory thyristors M1 and M2, whose threshold voltages are −1.5V and −3 V, respectively, get turned on.

Then, similarly to the time point c, the potential of the gate terminal Gm2 of the memory thyristor M2 becomes “H” (0 V), and the threshold voltage of the storing thyristor N2 becomes −1.5 V. The storing thyristor N2 gets turned on because the potential of the cathode terminal thereof is at Vga (−2.5 V).

Even when the memory thyristor M1 gets turned on again, the storing thyristor N1 in the ON state is not influenced and maintains the ON state.

Thus, right after the time point g, the transfer thyristor T2, the memory thyristors M1 and M2 and the storing thyristors N1 and N2 maintain the ON state.

At the time point h, the memory signal ϕm1A (ϕm) changes from “L” (−3.3 V) to “H” (0 V), and then both the memory thyristors M1 and M2 get turned off. However, the storing thyristors N1 and N2 maintain the ON state.

Thus, right after the time point h, the transfer thyristor T2 and the storing thyristors N1 and N2 maintain the ON state.

Similarly, at the time point k, the memory signal ϕm1A (ϕm) changes from “H” (0 V) to “L” (−3.3 V), and the memory thyristors M1, M2 and M3 get turned on. Then, the storing thyristor N3 newly gets turned on. Right after the time point l, the transfer thyristor T3 and the storing thyristors N1, N2 and N3 maintain the ON state.

Furthermore, at the time point o, the memory signal ϕm1A (ϕm) changes from “H” (0 V) to “L” (−3.3 V), and the memory thyristors M1, M2, M3 and M4 get turned on. Then, the storing thyristor N4 newly gets turned on. Right after the time point p, the transfer thyristor T4 and the storing thyristors N1, N2, N3 and N4 maintain the ON state.

Specifically, right after the time point p, the storing thyristors N1, N2, N3 and N4 in the ON state remember the positions (numbers) of the light-emitting thyristors L1, L2, L3 and L4 to be caused to light up. Since the storing thyristors N1, N2, N3 and N4 are in the ON state, the potentials of the cathode terminals thereof are at −1.5 V of the diffusion potential Vd. Thereby, the threshold voltages of the holding thyristors B1, B2, B3 and B4 and the light-emitting thyristors L1, L2, L3 and L4 are −3 V.

At the time point q, the holding signal ϕb changes from “H” (0 V) to “L” (−3.3 V), and then the holding thyristors B1, B2, B3 and B4, whose threshold voltages are −3 V, get turned on. Thereby, the potentials of the gate terminals Gb1 (Gl1), Gb2 (Gl2), Gb3 (Gl3) and Gb4 (Gl4) of the holding thyristors B1, B2, B3 and B4 become “H” (0 V), and the threshold voltages of the light-emitting thyristors L1, L2, L3 and L4 become −1.5 V.

Since the potentials of the cathode terminals of the storing thyristors N1, N2, N3 and N4 become “H” (0 V) at this time, the storing thyristors N1, N2, N3 and N4 get turned off.

At the time point r, the light-up signal ϕI1 (ϕI) changes from “H” (0 V) to “Le” (−3 V<“Le”≤−1.5 V), and then the light-emitting thyristors L1, L2, L3 and L4, whose threshold voltages are −1.5 V, get turned on, and light up (emit light).

Then, the potentials of the gate terminals Gl1, Gl2, Gl3 and Gl4 of the light-emitting thyristors L1, L2, L3 and L4 become “H” (0 V).

In the above description, the holding thyristors B1, B2, B3 and B4 get turned on at the time point q, and the potentials of the gate terminals Gb1, Gb2, Gb3 and Gb4 become “H” (0 V). However, the potentials of the gate terminals Gb1, Gb2, Gb3 and Gb4 are influenced by the power supply line resistances Rb1, Rb2, Rb3 and Rb4. Thus, the gate terminals Gb1, Gb2, Gb3 and Gb4 only need to have potentials such that the light-emitting thyristors L1, L2, L3 and L4 are capable of lighting up (emitting light) by the change of the light-up signal ϕI1 (ϕI) from “H” (0 V) to “Le” (−3 V<“Le”≤−1.5 V) at the time point r.

Similarly, what causes the storing thyristors N1, N2, N3 and N4 to turn off needs not be the potentials of the gate terminals Gb1, Gb2, Gb3 and Gb4 at the time point q. The light-emitting thyristors L1, L2, L3 and L4 getting turned on to light up (emit light) at the time point r raise the potentials of the gate terminals Gb1, Gb2, Gb3 and Gb4, which may cause the storing thyristors N1, N2, N3 and N4 to turn off.

When the transfer thyristor T5 gets turned on to have the potential of the gate terminal Gt5 at “H” (0 V) at the time point r, the threshold voltages of the memory thyristor M5 and the storing thyristor N5 become −3 V. Then, when the memory signal ϕm1A changes from “H” (0 V) to “L” (−3.3 V) at the time point u, the memory thyristor M5 and the storing thyristor N5 get turned on. Then, the potential of the cathode terminal of the storing thyristor N5 (the gate terminals Gb5 and Gl5) becomes −1.5 V. Thereby, the threshold voltages of the holding thyristor B5 and the light-emitting thyristor L5 become −3 V. Thus, at the time point u, the light-up signal ϕI1 (ϕI) is set at “Le” (−3 V<“Le”≤−1.5 V) in order for the light-emitting thyristor L5 not to get turned on.

The period T(II) from the time point u to the time point x is a period during which the light-up control is performed on the light-emitting thyristors L5 to L8. Thus, the same signal waveforms as those in the period T(I) may be repeated except for the memory signal ϕm1A (ϕm) depending on image data.

When the light-up signal ϕI1 changes from “Le” to “H” (0 V) at the time point v, the light-emitting thyristors L1, L2, L3 and L4, which have been in the ON state and lighting up (emitting light), get turned off to be put out.

The period between the time points r and v is the light-up period of the light-emitting thyristors L1, L2, L3 and L4.

Note that when the light-emitting thyristors L are not caused to light up, the memory signal ϕm1A (ϕm) may be maintained at “H” (0 V). For example, in FIG. 18, if the light-emitting thyristor L2 is not caused to light up, the memory signal ϕm1A (ϕm) may be maintained at “H” (0 V) in a period from the time point g to the time point h. At the time point g, the threshold voltages of the memory thyristors M1 and M2 are −1.5 V and −3 V, respectively. However, since the memory signal ϕm1A (ϕm) is maintained at “H” (0 V), neither the memory thyristor M1 nor M2 gets turned on. Therefore, the storing thyristor N2 does not get turned on. The threshold voltages of the memory thyristor M2 and the storing thyristor N2 are thus maintained at −4 V. At this time, the storing thyristor N1 remains in the ON state.

At the time point k, the memory signal ϕm1A (ϕm) changes from "H" (0 V) to "L" (−3.3 V), and then the memory thyristors M1 and M3, whose threshold voltages are −1.5V and −3 V, respectively, get turned on. However, the memory thyristor M2 does not get turned on because the threshold voltage thereof is −4 V.

As described above, the positions (numbers) of the light-emitting thyristors L not to be caused to light up may be memorized by maintaining the OFF state of the storing thyristors N corresponding to the light-emitting thyristors L not to be caused to light up.

In the third exemplary embodiment, the positions (numbers) of the light-emitting thyristors L to be caused to light up (emit light) are memorized by changing the storing thyristors N to the ON state. A current to maintain the storing thyristors N in the ON state is supplied from the power supply line 71 having the potential of Vga (−2.5 V) through the power supply line resistances Rb. If a current to maintain the storing thyristors N in the ON state is 0.1 mA, the resistance values of the power supply line resistances Rb may be set at 10 kΩ or less because the potentials of the cathode terminals of the storing thyristors N are at −1.5 V.

As described above, also in the third exemplary embodiment, the lighting-up (light emission) of the light-emitting thyristors L and the operation to turn on the memory thyristors M (the storing thyristors N are also included) in order to memorize the positions (numbers) of the light-emitting thyristors L to be caused to light up next are performed in parallel, similarly to the second exemplary embodiment. Thereby, the lighting-up (light emission) of the light-emitting thyristors L may be successively performed with a shorter halt period, as compared with the case in the first exemplary embodiment. Thus, the writing time to the photoconductive drum 12 by the print head 14 may become shorter.

Moreover, the light-emitting chips C in the third exemplary embodiment are driven with the memory signals ϕm having two-valued potentials, and thus are driven more easily.

Note that the power supply potential Vga is set at a potential such that the storing thyristors N get turned on when the memory thyristors M get turned on and that the storing thyristors N do not get turned on when the potentials of the gate terminals Gm are changed to −1.5 V by the gate terminals Gt having the potentials of "H" (0 V).

Specifically, when the memory thyristors M get turned on, the potentials of the gate terminals Gm become "H" (0 V), and thus the threshold voltages of the storing thyristors N become −1.5 V. Meanwhile, when the potentials of the gate terminals Gt become "H" (0 V), the potentials of the gate terminals Gm connected through the forward-biased connecting diodes Dm become −1.5 V, and then the threshold voltages of the storing thyristors N become −3 V. Accordingly, the power supply potential Vga satisfies −3 V<Vga≤−1.5 V.

Fourth Exemplary Embodiment

In the third exemplary embodiment, the storing thyristors N are provided in the light-emitting chips C of the second exemplary embodiment. In the fourth exemplary embodiment, the storing thyristors N are provided in the light-emitting chips C of the first exemplary embodiment shown in FIG. 6.

Figure 19:
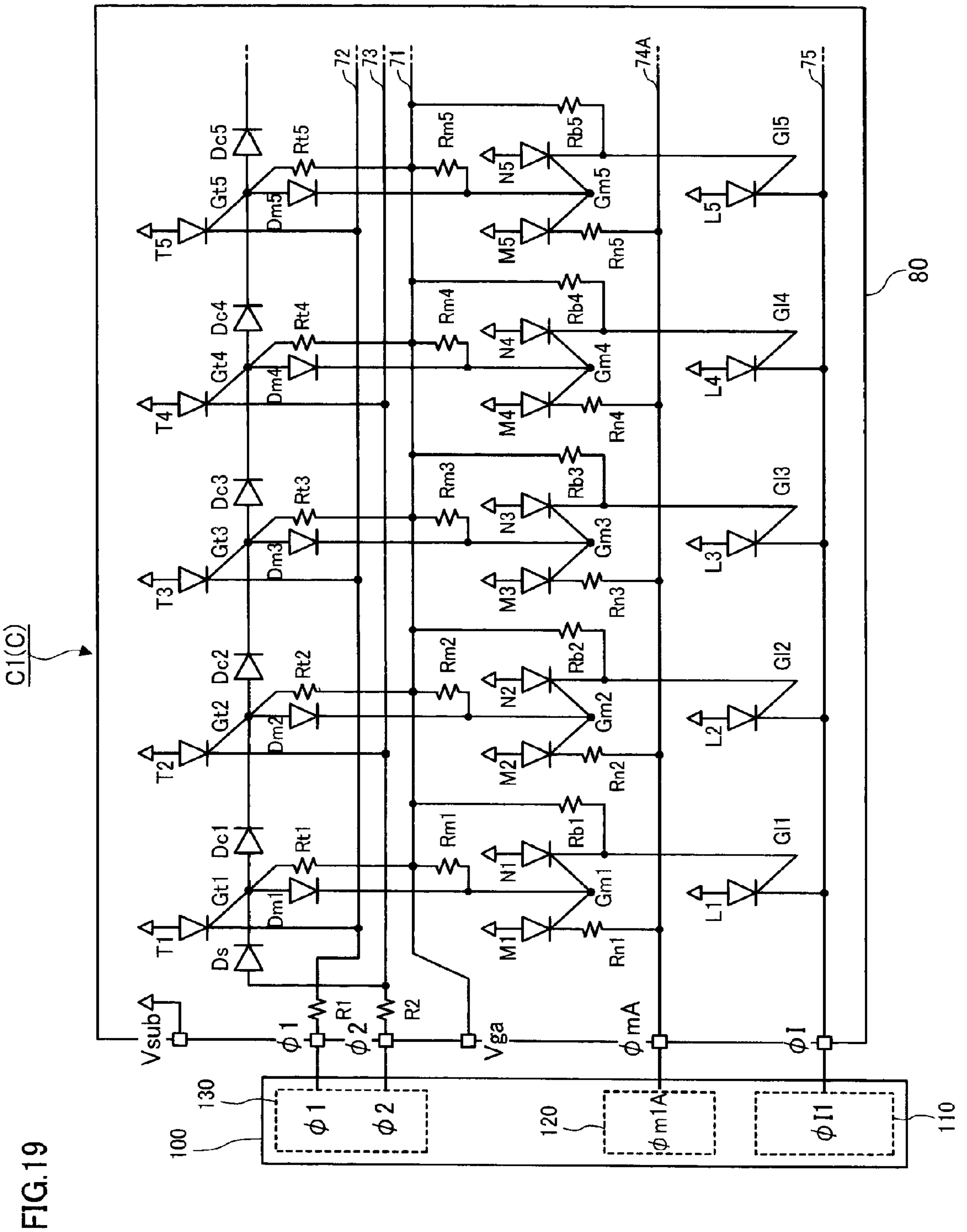
FIG. 19 is a diagram for explaining a circuit configuration of the light-emitting chip in the fourth exemplary embodiment.

FIG. 19 is a diagram for explaining a circuit configuration of the light-emitting chip C in the fourth exemplary embodiment. Also here, the part of the SLED_A of the light-emitting chip C1 is described as an example, and thus the light-emitting chips C are denoted by the light-emitting chip C1 (C).

The operation of the light-emitting chip C1 (C) shown in FIG. 19 may be easily understood from the operation of the light-emitting chip C1 (C) in the first exemplary embodiment and the operation of the storing thyristors N described in the third exemplary embodiment. Thus, the detailed description thereof is omitted.

The light-emitting chip C1 (C) in the fourth exemplary embodiment are driven with the memory signal ϕm having two-valued potentials, and thus is driven more easily.

Fifth Exemplary Embodiment

The configuration of the light-emitting chips C in the fifth exemplary embodiment is different from that in the third exemplary embodiment.

In the third exemplary embodiment, the power supply potential Vga is a potential within a range of −3 V<Vga≤−1.5 V, and is different from "L" (−3.3 V) of the first transfer signal ϕ1, the second transfer signal ϕ2, the memory signal ϕm and the holding signal ϕb.

In the fifth exemplary embodiment, the power supply potential Vga is set at the same potential as "L" of the first transfer signal ϕ1, the second transfer signal ϕ2, the memory signal ϕm and the holding signal ϕb. Therefore, the light-emitting chips C in the fifth exemplary embodiment may be driven much more easily.

The configuration of the signal generating circuit 100 mounted on the circuit board 62 (see FIG. 2) and the wiring configuration of the circuit board 62 in the fifth exemplary embodiment are the same as those in the second exemplary embodiment shown in FIG. 10. Thus, the description of the configuration of the signal generating circuit 100 mounted on the circuit board 62 and the wiring configuration of the circuit board 62 is omitted.

Furthermore, an outline of the light-emitting chip C is also the same as that in the second exemplary embodiment shown in FIGS. 11A and 11B, where the light-emitting chip C is denoted by the light-emitting chip C1 (C). Thus, the description of the outline of the light-emitting chip C is omitted.

Figure 20:
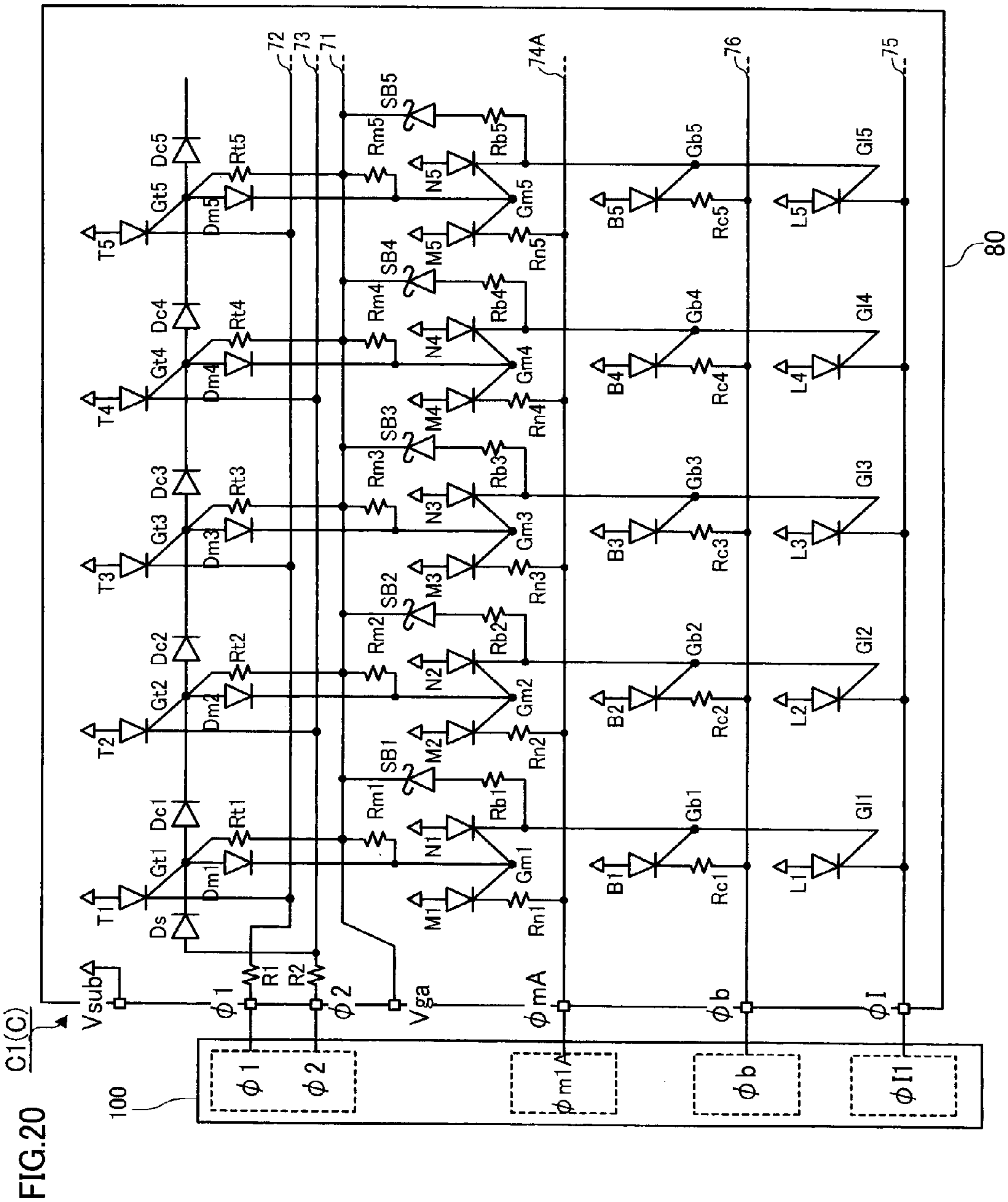
FIG. 20 is a diagram for explaining a circuit configuration of the light-emitting chip in the fifth exemplary embodiment.

FIG. 20 is a diagram for explaining a circuit configuration of the light-emitting chip C in the fifth exemplary embodiment. Also here, the part of the SLED_A of the light-emitting chip C1 is described as an example, and thus the light-emitting chips C are denoted by the light-emitting chip C1 (C). The same reference numerals are given to the same components as those in the third exemplary embodiment shown in FIG. 16, and the detailed description thereof is omitted. Note that a part related to the light-emitting thyristors L1 to L5 is shown in FIG. 20.

The part of the SLED_A of the light-emitting chip C1 (C) in the fifth exemplary embodiment includes Schottky barrier diodes SB1, SB2, SB3 . . . between the respective power supply line resistances Rb1, Rb2, Rb3 . . . and the power supply line 71 in the part of the SLED_A of the light-emitting chip C1 (C) in the third exemplary embodiment shown in FIG. 16. When the Schottky barrier diodes SB1, SB2, SB3 . . . are not distinguished, they are called Schottky barrier diodes SB.

Cathode terminals of the Schottky barrier diodes SB are connected to the power supply line 71, and anode terminals thereof are connected to the respective power supply line resistances Rb.

Note that a forward voltage Vs of the Schottky barrier diodes SB provided on p-type semiconductor layers and n-type semiconductor layers such as GaAs or GaAlAs is 0.5 V.

The other components are similar to those in the light-emitting chip C of the third exemplary embodiment, and thus the detailed description thereof is omitted.

In addition, the light-emitting chip C1 (C) in the fifth exemplary embodiment may be obtained by providing Schottky barrier electrodes to respective one terminal portions of the power supply line resistances Rb formed of the p-type third semiconductor layer 83 in the planar layout of the light-emitting chip C1 (C) in the third exemplary embodiment shown in FIG. 17A and by connecting each of the Schottky barrier electrodes to the power supply line 71. Thus, the detailed description thereof is omitted.

Furthermore, a timing chart illustrating the operation of the light-emitting chip C1 (C) in the fifth exemplary embodiment is the same as that in the third exemplary embodiment shown in FIG. 18.

In the third exemplary embodiment, the power supply potential Vga is set at a potential (−3 V<Vga≤−1.5 V) such that the storing thyristors N do not get turned on when the potentials of the gate terminals Gm are changed to −1.5 V by the gate terminals Gt having the potentials of "H" (0 V).

However, in the fifth exemplary embodiment, the Schottky barrier diodes SB are provided between the respective power supply line resistances Rb and the power supply line 71 through which the power supply potential Vga is supplied. Thus, the power supply potential Vga in the fifth exemplary embodiment may be lowered by the forward voltage (0.5 V) of the Schottky barrier diodes SB as compared with the power supply potential Vga (−3 V<Vga≤−1.5 V) in the third exemplary embodiment. Specifically, the power supply potential Vga may be set so as to satisfy −3.5 V<Vga≤−2 V. Accordingly, the power supply potential Vga in the fifth exemplary embodiment may be set at the same potential as "L" (−3.3 V).

Note that if the power supply potential Vga is set at "L" (−3.3 V), the threshold voltages of the transfer thyristors T are the same as those in the second exemplary embodiment.

Also in the fifth exemplary embodiment, the lighting-up (light emission) of the light-emitting thyristors L and the operation to turn on the memory thyristors M (the storing thyristors N are also included) in order to memorize the positions (numbers) of the light-emitting thyristors L to be caused to light up next are performed in parallel, similarly to the second exemplary embodiment. Thereby, the lighting-up (light emission) of the light-emitting thyristors L may be successively performed with a shorter halt period, as compared with the case in the first exemplary embodiment. Thus, the writing time to the photoconductive drum 12 by the print head 14 may become shorter.

Moreover, the light-emitting chips C in the fifth exemplary embodiment may be driven with the memory signals ϕm having two-valued potentials, and thus are driven more easily. Furthermore, the power supply potential Vga may be set at the same potential as "L" of the first transfer signal ϕ1, the second transfer signal ϕ2, the memory signal ϕm and the holding signal ϕb. Therefore, the light-emitting chips C in the fifth exemplary embodiment may be driven much more easily than those in the fourth exemplary embodiment.

Sixth Exemplary Embodiment

The configuration of the light-emitting chips C in the sixth exemplary embodiment is different from that in the second exemplary embodiment. The light-emitting chips C in the sixth exemplary embodiment may be driven with the memory signals ϕm having two-valued potentials, similarly to the third exemplary embodiment.

In the third exemplary embodiment, the holding thyristors B or the light-emitting thyristors L get turned on, and thus the potentials of the gate terminals Gm or Gl become "H" (0 V), which causes the storing thyristors N in the ON state to turn off. However, the potentials of the gate terminals Gb of the holding thyristors B or the gate terminals Gl of the light-emitting thyristors L depend on: the relationship between the power supply line resistances Rb and the resistances between the gate terminals Gb and the anode terminals of the holding thyristors B in the ON state; or the relationship between the power supply line resistances Rb and the resistances between the gate terminals Gl and the anode terminals of the light-emitting thyristors L in the ON state.

In the sixth exemplary embodiment, the storing thyristors N in the ON state are caused to turn off more surely.

Figure 21:
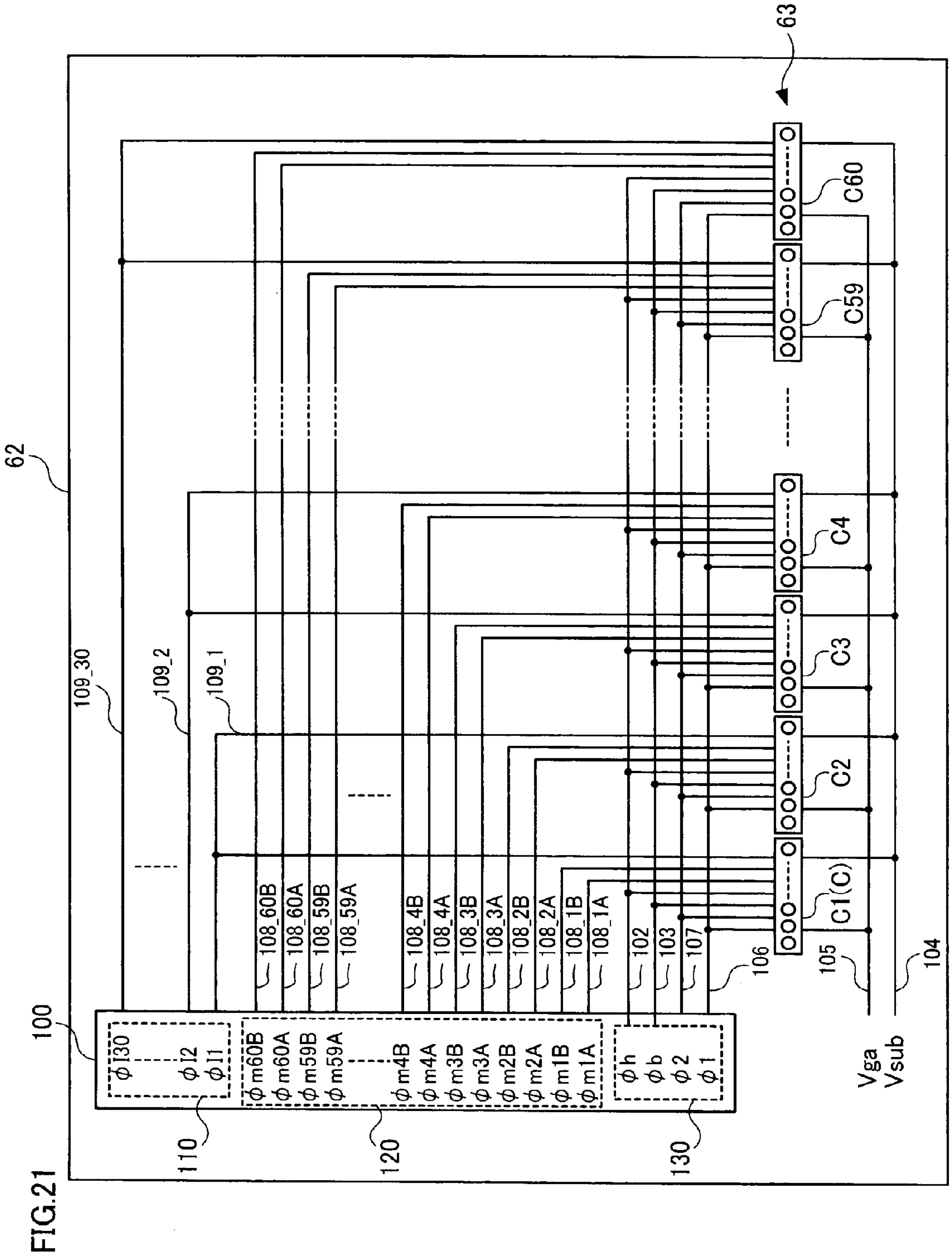
FIG. 21 is a diagram showing a configuration of the signal generating circuit mounted on the circuit board and a wiring configuration of the circuit board in the sixth exemplary embodiment.

FIG. 21 is a diagram showing a configuration of the signal generating circuit 100 mounted on the circuit board 62 (see FIG. 2) and a wiring configuration of the circuit board 62 in the sixth exemplary embodiment.

The light-up signal generating unit 110 included in the signal generating circuit 100 outputs each of the light-up signals ϕI (ϕI1 to ϕI30) to the corresponding pair of the light-emitting chips C (C1 to C60), similarly to the second exemplary embodiment. Here, each pair is formed of two of the light-emitting chips C.

The memory signal generating unit 120 included in the signal generating circuit 100 outputs the memory signals ϕm (ϕm1A to ϕm60A and ϕm1B to ϕm60B) for memorizing the positions (numbers) of the light-emitting thyristors L intended to light up based on image data.

The transfer signal generating unit 130 included in the signal generating circuit 100 transmits the first transfer signal ϕ1, the second transfer signal ϕ2 and the holding signal ϕb to the light-emitting chips C (C1 to C60), and outputs an elimination signal ϕh for turning off the storing thyristors N in the ON state.

Specifically, the signal generating circuit 100, as an example of the signal generating unit, generates the light-up signals ϕI (ϕI1 to ϕI30), the memory signals ϕm (ϕm1A to ϕm60A and ϕm1B to ϕm60B), the first transfer signal ϕ1, the second transfer signal ϕ2, the holding signal ϕb and the elimination signal ϕh, as an example of the driving signals.

Thus, in addition to the configuration of the second exemplary embodiment, the circuit board 62 is provided with an elimination signal line 102 through which the elimination signal ϕh is transmitted. The elimination signal line 102 is connected to ϕh terminals (see FIGS. 22 and 23 to be described later), each of which is an example of an elimination signal terminal, of the light-emitting chips C (C1 to C60) in parallel.

Figure 22:
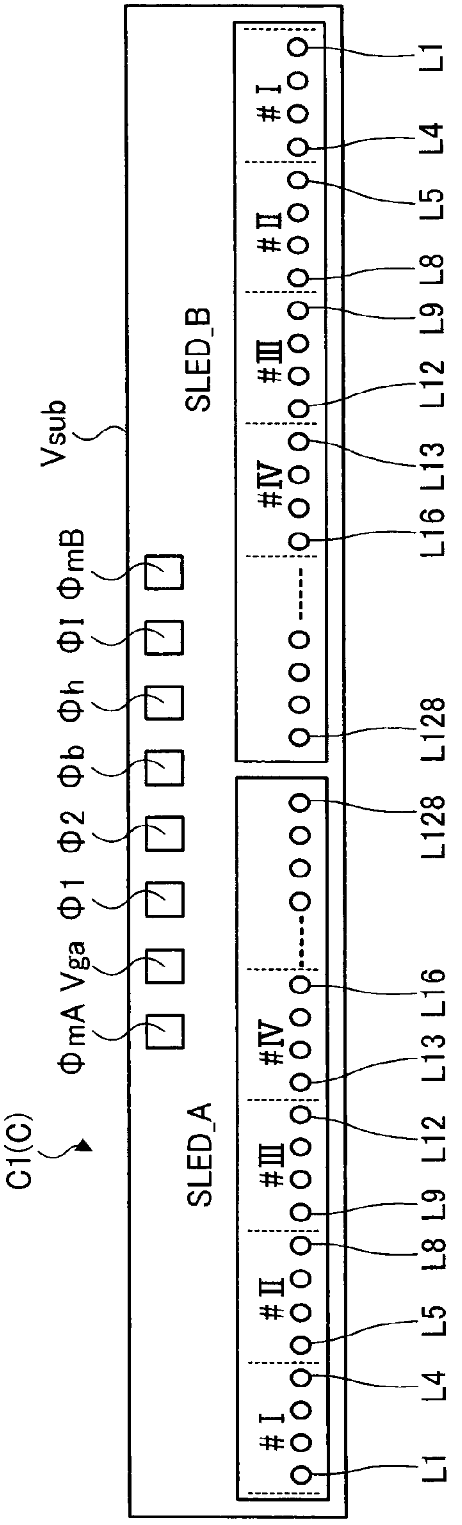
FIG. 22 is a diagram for explaining an outline of the light-emitting chip in the sixth exemplary embodiment.

FIG. 22 is a diagram for explaining an outline of the light-emitting chip C in the sixth exemplary embodiment. The light-emitting chip C1 is described as an example, and thus the light-emitting chips C are denoted by the light-emitting chip C1 (C). The same is true for the other light-emitting chips C2 to C60.

In the light-emitting chip C1 (C), the plural light-emitting elements (specifically, light-emitting thyristors) are divided into groups that each include a predetermined number of light-emitting elements, and lighting up and putting out are controlled (light-up control is performed) for each of the groups. FIG. 22 shows a combination of the light-emitting elements in a case where every four light-emitting elements in the light-emitting chip C1 (C) forms a group to operate. The difference from the light-emitting chip C1 (C) shown in FIGS. 11A and 11B is that the light-emitting chip C1 (C) shown in FIG. 22 has a ϕh terminal. The elimination signal ϕh is supplied in common to the SLED_A and the SLED_B. As to the rest, the light-emitting chip C1 (C) shown in FIG. 22 is similar to that shown in FIGS. 11A and 11B, and thus the detailed description thereof is omitted.

Figure 23:
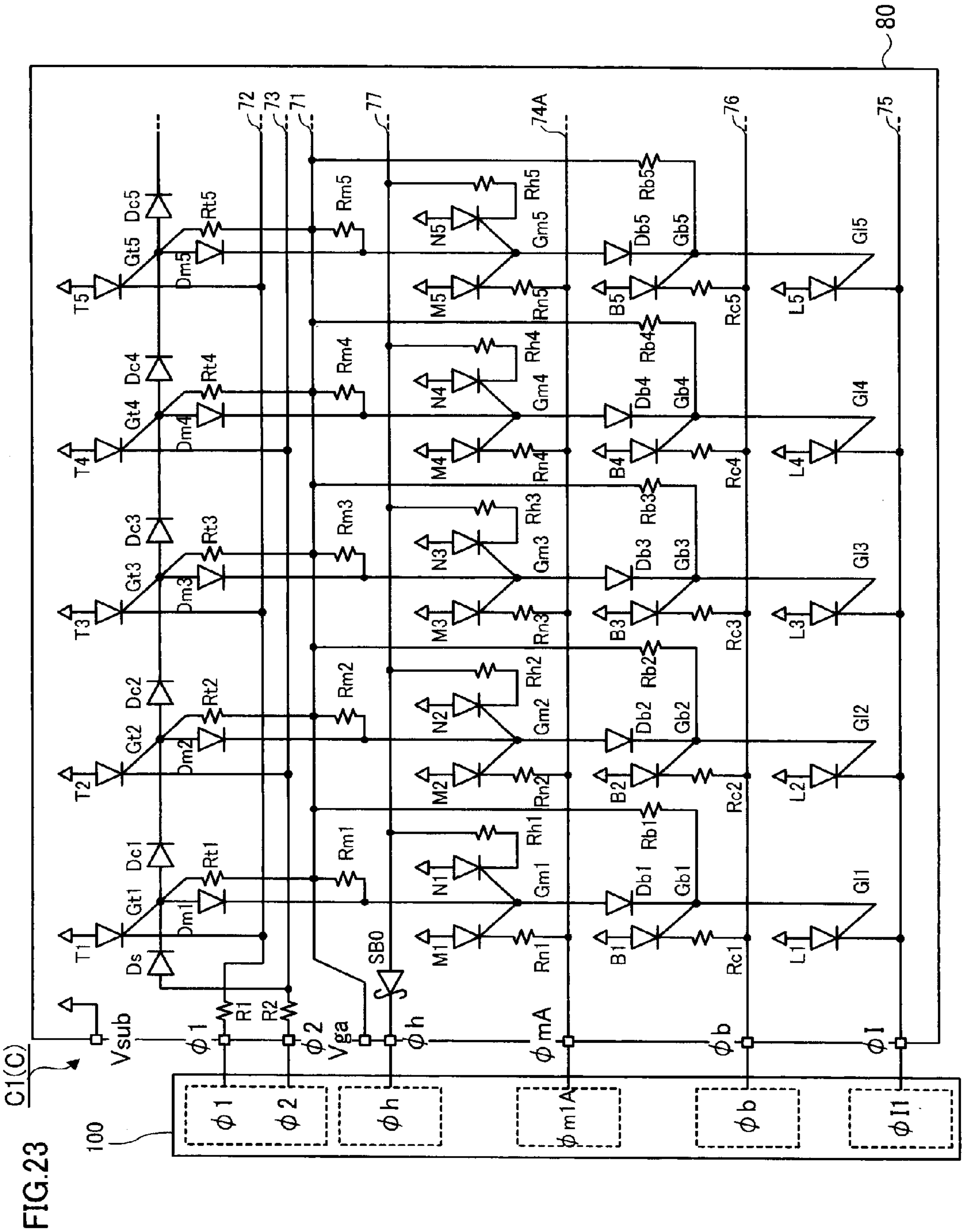
FIG. 23 is a diagram for explaining a circuit configuration of the light-emitting chip in the sixth exemplary embodiment.

FIG. 23 is a diagram for explaining a circuit configuration of the light-emitting chip C in the sixth exemplary embodiment. Also here, the part of the SLED_A of the light-emitting chip C1 is described as an example, and thus the light-emitting chips C are denoted by the light-emitting chip C1 (C).

Similarly to the third exemplary embodiment, the part of the SLED_A of the light-emitting chip C1 (C) in the sixth exemplary embodiment includes the storing thyristor array (the storing element array) formed of the storing thyristors N1, N2, N3 . . . , as an example of the storing elements arrayed in line, which are placed on the substrate 80 and which store (memorize) information that the respective memory thyristors M have got turned on, in addition to the part of the SLED_A of the light-emitting chip C1 (C) in the second exemplary embodiment (see FIG. 12).

The part of the SLED_A of the light-emitting chip C1 (C) in the sixth exemplary embodiment includes elimination resistances Rh1, Rh2, Rh3 . . . that connect the respective cathode terminals of the storing thyristors N1, N2, N3 . . . and an elimination signal line 77. The part of the SLED_A of the light-emitting chip C1 (C) in the sixth exemplary embodiment further includes a Schottky barrier diode SB0 between the ϕh terminal and the elimination signal line 77.

When the storing thyristors N1, N2, N3 . . . and the elimination resistances Rh1, Rh2, Rh3 . . . are not distinguished, they are called storing thyristors N and elimination resistances Rh, respectively.

The numbers of the storing thyristors N and the elimination resistances Rh are 128, respectively, similarly to the first exemplary embodiment.

The storing thyristors N1, N2, N3 . . . and the elimination resistances Rh1, Rh2, Rh3 . . . are arrayed in numerical order from the left side of FIG. 23, similarly to the transfer thyristors T1, T2, T3 . . . and the like in the second exemplary embodiment. Note that the storing thyristors N are also semiconductor devices each having three terminals that are an anode terminal, a cathode terminal and a gate terminal.

The other components are the same as those in the second exemplary embodiment shown in FIG. 12. Thus, the same reference numerals are given to the same components as those in the second exemplary embodiment, and the detailed description thereof is omitted.

Next, a description will be given of electric connections between the elements in the part of the SLED_A of the light-emitting chip C1 (C). Here, the electric connections are described mainly of the storing thyristors N.

The anode terminals of the storing thyristors N1, N2, N3 . . . are connected to the substrate 80, similarly to the anode terminals of the transfer thyristors T1, T2, T3 . . . and the like. These anode terminals are connected to the power supply line 104 (see FIG. 21) through the Vsub terminal provided on the substrate 80. To this power supply line 104, the reference potential Vsub is supplied.

The gate terminals of the storing thyristors N1, N2, N3 . . . are connected to the gate terminals Gm1, Gm2, Gm3 . . . of the memory thyristors M1, M2, M3 . . . , respectively. Therefore, the memory thyristors M and the storing thyristors N have the common gate terminals Gm.

Additionally, the cathode terminals of the storing thyristors N are connected to the elimination signal line 77 through the elimination resistances Rh, each of which is an example of a second electrical element.

The elimination signal line 77 is connected to the ϕh terminal through the Schottky barrier diode SB0. The Schottky barrier diode SB0 has an anode terminal connected to the elimination signal line 77 and a cathode terminal connected to the ϕh terminal. The Schottky barrier diode SB0 is connected in a direction such that a current flows from the elimination signal line 77 to the ϕh terminal. To the ϕh terminal, the elimination signal line 102 of the circuit board 62 is connected, and the elimination signal ϕh is transmitted.

Figure 24:
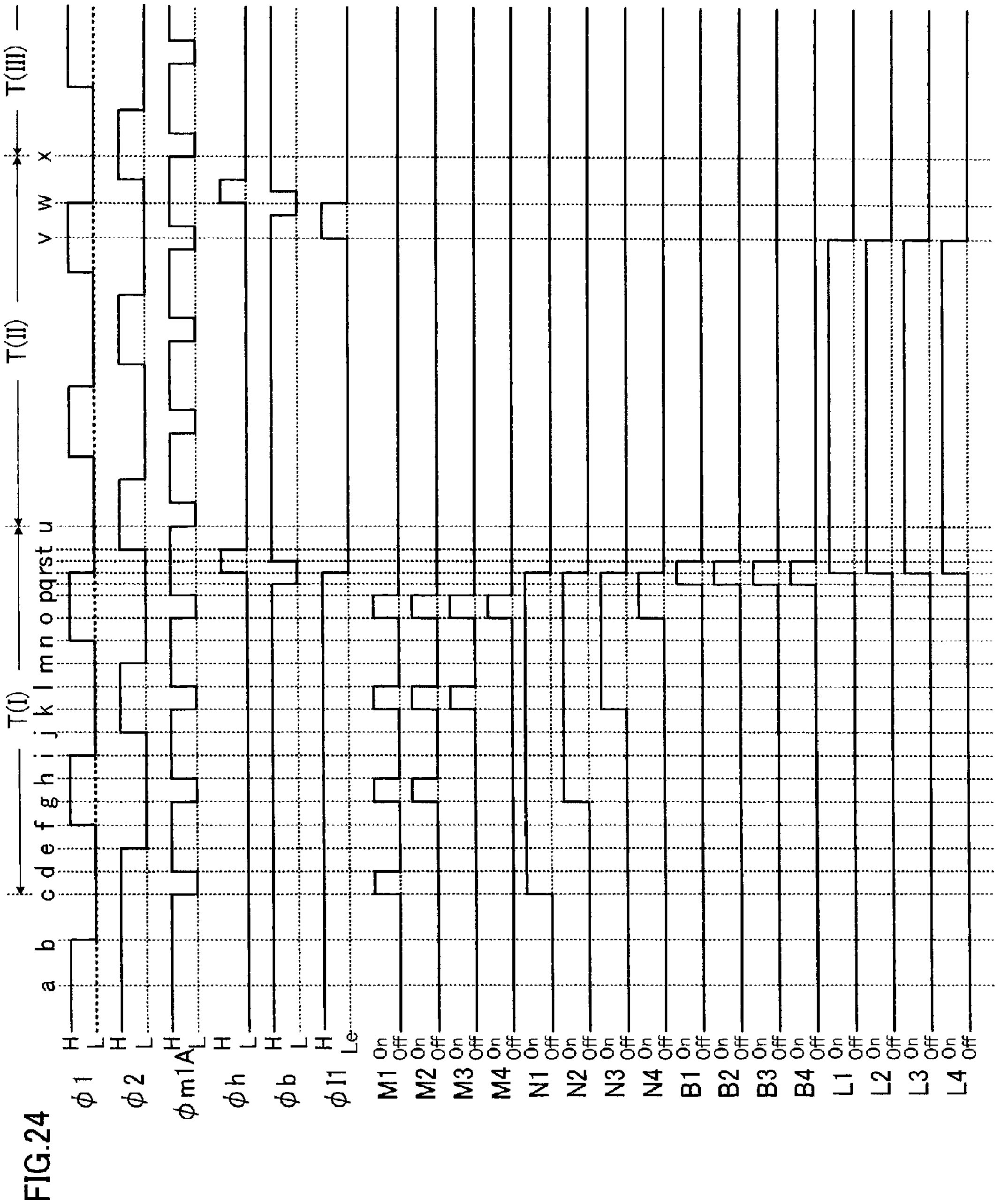
FIG. 24 is a timing chart for explaining the operation of the light-emitting chip in the sixth exemplary embodiment.

FIG. 24 is a timing chart for explaining the operation of the light-emitting chip C in the sixth exemplary embodiment. The part of the SLED_A of the light-emitting chip C1 is described as an example.

FIG. 24 shows a case where light-up control is performed on the four light-emitting thyristors L for each group shown in FIG. 22. In FIG. 24, a description is given of the groups #I and #II. Here, the respective four light-emitting thyristors L in the groups #I and #II are all caused to light up simultaneously.

In FIG. 24, passing of time is illustrated in alphabetical order from a time point a to a time point x. In a period T(I) from a time point c to a time point u, in order to cause the four light-emitting thyristors L1 to L4 in the group #I shown in FIG. 22 to light up simultaneously, the memory thyristors M1 to M4 are sequentially caused to turn on. Along with turning-on of the memory thyristors M1 to M4, the storing thyristors N1 to N4 are caused to turn on, thereby to memorize the positions (numbers) of the light-emitting thyristors L1 to L4. Then, in a period from a time point r to a time point v, the light-emitting thyristors L1 to L4 are caused to light up (emit light).

Next, in a period T(II) from the time point u to the time point x, although not shown in FIG. 24, in order to cause the four light-emitting thyristors L5 to L8 in the group #II shown in FIG. 22 to light up simultaneously, the memory thyristors M5 to M8 are sequentially caused to turn on. Along with turning-on of the memory thyristors M5 to M8, the storing thyristors N5 to N8 are caused to turn on, thereby to memorize the positions (numbers) of the light-emitting thyristors L5 to L8. Then, in a period from a time point w, the light-emitting thyristors L5 to L8 are caused to light up (emit light), similarly to the light-emitting thyristors L1 to L4.

Then, similarly to the above, the light-up control is performed up to the light-emitting thyristor L128 if the number of the light-emitting thyristors L is 128.

In the sixth exemplary embodiment, the operations of the memory thyristors M, the storing thyristors N, the holding thyristors B and the light-emitting thyristors L are associated with each other. Thus, in FIG. 24, the ON state (On) and the OFF state (Off) of the memory thyristors M1 to M4, the storing thyristors N1 to N4, the holding thyristors B1 to B4 and the light-emitting thyristors L1 to L4 are shown as well as the waveforms of the first transfer signal ϕ1, the second transfer signal ϕ2, the memory signal ϕm1A, the elimination signal ϕh, the holding signal ϕb and the light-up signal ϕI1, similarly to the timing chart of the third exemplary embodiment shown in FIG. 18.

Since the waveforms of the first transfer signal ϕ1, the second transfer signal ϕ2, the memory signal ϕm1A (ϕm) and the holding signal ϕb are the same as those in the third exemplary embodiment shown in FIG. 18, the description thereof is omitted.

The elimination signal ϕh newly provided in the sixth exemplary embodiment is now described.

In the period T(I), the elimination signal ϕh is "L" (−3.3 V) at the starting time point c, changes from "L" (−3.3 V) to "H" (0 V) at the time point r, and then changes from "H" (0 V) to "L" (−3.3 V) at a time point t. Thereafter, at the finishing time point u of the period T(I), the elimination signal ϕh remains at "L" (−3.3 V). In the period T(II) and the subsequent period, the elimination signal ϕh repeats the waveform in the period T(I).

Next, with reference to FIG. 23, an operation of the light-emitting portion 63 and the part of the SLED_A of the light-emitting chip C1 (C) will be described according to the timing chart shown in FIG. 24. The operation of the SLED_A of the light-emitting chip C1 (C) is partially similar to that of the SLED_A of the light-emitting chip C1 (C) in the third exemplary embodiment. Thus, in the description of the operation of the SLED_A of the light-emitting chip C1 (C) in the sixth exemplary embodiment, the description of the operation similar to that in the third exemplary embodiment will be omitted.

(Initial State)

At the time point a in the timing chart shown in FIG. 24, the Vsub terminal, which is provided on each of the light-emitting chips C (C1 to C60) of the light-emitting portion 63, is set at the reference potential Vsub ("H" (0 V)). Meanwhile, each Vga terminal is set at the power supply potential Vga ("L" (−3.3 V)) (see FIG. 21).

The signal generating circuit 100 sets the first transfer signal ϕ1, the second transfer signal ϕ2, the holding signal ϕb, the memory signals ϕm (ϕm1A to ϕm60A and ϕm1B to ϕm60B) and the light-up signals ϕI (ϕI1 to ϕI30) at "H."

Then, the potentials of the ϕ1 terminal, the ϕ2 terminal, the ϕmA terminal, the ϕmB terminal, the ϕb terminal and the ϕI terminal of each light-emitting chip C become "H." Thus, the potentials of the first transfer signal line 72, the second transfer signal line 73, the memory signal lines 74A and 74B, the holding signal line 76 and the light-up signal line 75 become "H."

Thereby, the anode terminals and the cathode terminals of the transfer thyristors T, the memory thyristors M, the holding thyristors B and the light-emitting thyristors L have the potentials set at "H," and thus are in the OFF state.

Meanwhile, the signal generating circuit 100 sets the elimination signal ϕh at "L" (−3.3 V). Then, the potential of the ϕh terminal of each light-emitting chip C becomes "L" (−3.3 V). At this time, the Schottky barrier diode SB0 is forward-biased, and the potentials of the elimination signal line 77 and the cathode terminals of the storing thyristors N become −2.8 V.

As described in the first exemplary embodiment, the potential of the gate terminal Gt1 is set at −1.5 V by the start diode Ds, and thus the threshold voltage of the transfer thyristor T1 is −3 V. Additionally, the potential of the gate terminal Gt2 becomes −3 V, and thus the threshold voltage of the transfer thyristor T2 is −4.5 V. The potentials of the gate terminals Gt having numbers 3 or more are set at "L" (−3.3 V) by the power supply line 71 connected through the respective power supply line resistances Rt. Thus, the threshold voltages of the transfer thyristors T having numbers 3 or more are −4.8 V.

On the other hand, the potential of the gate terminal Gm1 is −3 V due to the connecting diode Dm1. Thus, the threshold voltages of the memory thyristor M1 and the storing thyristor N1 are −4.5 V. However, the gate terminals Gb1 and Gl1 are not influenced by the gate terminal Gt1 being at −1.5 V, and the potentials thereof are "L" (−3.3 V) due to the power supply line 71 connected through the power supply line resistance Rb1. Accordingly, the threshold voltages of the holding thyristor B1 and the light-emitting thyristor L1 are −4.8 V.

Additionally, the gate terminals Gm, Gb and Gl having numbers 2 or more are not influenced by the gate terminal Gt1 being at −1.5 V. The gate terminals Gm, Gb and Gl having numbers 2 or more are connected to the power supply line 71 through the respective power supply line resistances Rm and Rb, and thus the potentials thereof are "L" (−3.3 V). Accordingly, the threshold voltages of the memory thyristors M, the holding thyristors B and the light-emitting thyristors L having numbers 2 or more are −4.8 V.

As described above, the threshold voltage of the storing thyristor N1 is −4.5 V, and the threshold voltages of the storing thyristors N having numbers 2 or more are −4.8 V. Since the potentials of the cathode terminals of the storing thyristors N are −2.8 V, as described above, the storing thyristors N are in the OFF state.

(Operation State)

At a time point b, the first transfer signal ϕ1 changes from "H" (0 V) to "L" (−3.3 V). Then, the transfer thyristor T1, whose threshold voltage is −3 V, is changed to the ON state, similarly to the first exemplary embodiment, and the potential of the gate terminal Gt1 of the transfer thyristor T1 becomes "H" (0 V). Thereby, the potential of the gate terminal Gt2 becomes −1.5 V, and the threshold voltage of the transfer thyristor T2 becomes −3 V.

When the potential of the gate terminal Gt1 becomes "H" (0 V), the potential of the gate terminal Gm1 becomes −1.5 V. Then, the threshold voltages of the memory thyristor M1 and the storing thyristor N1 become −3 V. However, the memory thyristor M1 does not get turned on because the potential of the cathode terminal thereof is at "H" (0 V). The storing thyristor N1 does not get turned on because the potential of the cathode terminal thereof is at −2.8 V.

Additionally, even when the potential of the gate terminal Gt2 becomes −1.5 V, the potential of the gate terminal Gm2 is at −3 V. Thus, the threshold voltages of the memory thyristor M2 and the storing thyristor N2 remain at −4.5 V. Therefore, the storing thyristor N2 does not get turned on since the potential of the cathode terminal thereof is −2.8 V.

At the time point c, the memory signal ϕm1A (ϕm) changes from "H" (0 V) to "L" (−3.3 V). Then, the memory thyristor M1, whose threshold voltage is −3 V, gets turned on. The potential of the gate terminal Gm1 becomes "H" (0 V), and the threshold voltage of the storing thyristor N1 becomes −1.5 V. Then, the storing thyristor N1 gets turned on because the potential of the cathode terminal thereof is at −2.8 V. Thereby, the potential of the cathode terminal of the storing thyristor N1 becomes −1.5 V of the diffusion potential Vd. However, since the cathode terminal of the storing thyristor N1 and the elimination signal line 77 are connected through the elimination resistance Rh1, the elimination signal line 77 maintains the potential of −2.8 V.

When the memory thyristor M1 and the storing thyristor N1 get turned on and the potential of the gate terminal Gm1 becomes "H" (0 V), the potentials of the gate terminal Gb1 of the holding thyristor B1 and the gate terminal Gl1 of the light-emitting thyristor L1 that are connected to the gate terminal Gm1 through the forward-biased connecting diode Db1 become −1.5 V. Thereby, the threshold voltages of the holding thyristor B1 and the light-emitting thyristor L1 become −3 V.

At a time point d, the memory signal ϕm1A (ϕm) changes from "L" (−3.3 V) to "H" (0 V). Then, the memory thyristor M1 gets turned off because the potentials of the cathode terminal and the anode terminal thereof become "H" (0 V).

However, the storing thyristor N1 maintains the ON state because the cathode terminal thereof is connected to the elimination signal line 77 having the potential of −2.8 V through the elimination resistance Rh1.

Specifically, also in the sixth exemplary embodiment, although the memory thyristor M1 is changed to the OFF state, the storing thyristor N1 remains in the ON state and remembers the position (number) of the light-emitting thyristor L1 to be caused to light up, similarly to the third exemplary embodiment. In this way, the sixth exemplary embodiment uses two values, namely, "H" (0 V) and "L" (−3.3 V) for the potential of the memory signal ϕm1A (ϕm), and does not use "S" (−3.0 V<"S"≤−1.5 V) between "H" and "L."

Thereafter, similarly to the third exemplary embodiment, the storing thyristors N2, N3 and N4 are sequentially caused to turn on along with sequential turning-on of the memory thyristors M2, M3 and M4. Then, at the time point r, the light-up signal ϕI1 changes from "H" (0 V) to "Le" (−3 V<"Le"≤−1.5 V), and thereby the light-emitting thyristors L1, L2, L3 and L4, whose gate terminals Gl1, Gl2, Gl3 and Gl4 are respectively connected to the gate terminals Gb1, Gb2, Gb3 and Gb4 of the holding thyristors B1, B2, B3 and B4 in the ON state, get turned on, and light up (emit light).

Additionally, at the time point r, the elimination signal ϕh changes from "L" (−3.3 V) to "H" (0 V). Then, the Schottky barrier diode SB0 becomes reverse-biased, which prevents a current from flowing to the elimination signal line 77. Specifically, the storing thyristors N1, N2, N3 and N4 in the ON state are not capable of maintaining the ON state and get turned off, because the current stops flowing thereto.

Since the subsequent operation is similar to that of the third exemplary embodiment, the description thereof is omitted.

As described above, in the sixth exemplary embodiment, the Schottky barrier diode SB0 is made to be reverse-biased by changing the elimination signal ϕh from "L" (−3.3 V) to "H" (0 V) (for example, at the time point r). Then, the storing thyristors N are caused to turn off by making a current stop flowing to the storing thyristors N in the ON state. Accordingly, in the sixth exemplary embodiment, the storing thyristors N in the ON state are caused to turn off more surely.

Seventh Exemplary Embodiment

The configuration of the light-emitting chips C in the seventh exemplary embodiment is different from that in the first exemplary embodiment.

The light-emitting chip C in the first exemplary embodiment includes the SLED_A and the SLED_B that each have 128 light-emitting thyristors L.

In contrast, the light-emitting chip C in the seventh exemplary embodiment includes one SLED that has 256 light-emitting thyristors L.

The configuration of the signal generating circuit 100 mounted on the circuit board 62 and the wiring configuration of the circuit board 62 in the seventh exemplary embodiment are the same as those in the first exemplary embodiment shown in FIG. 4. Additionally, an outline of the light-emitting chip C is similar to that of the first exemplary embodiment shown in FIGS. 5A and 5B. Thus, the detailed description thereof is omitted.

Figure 25:
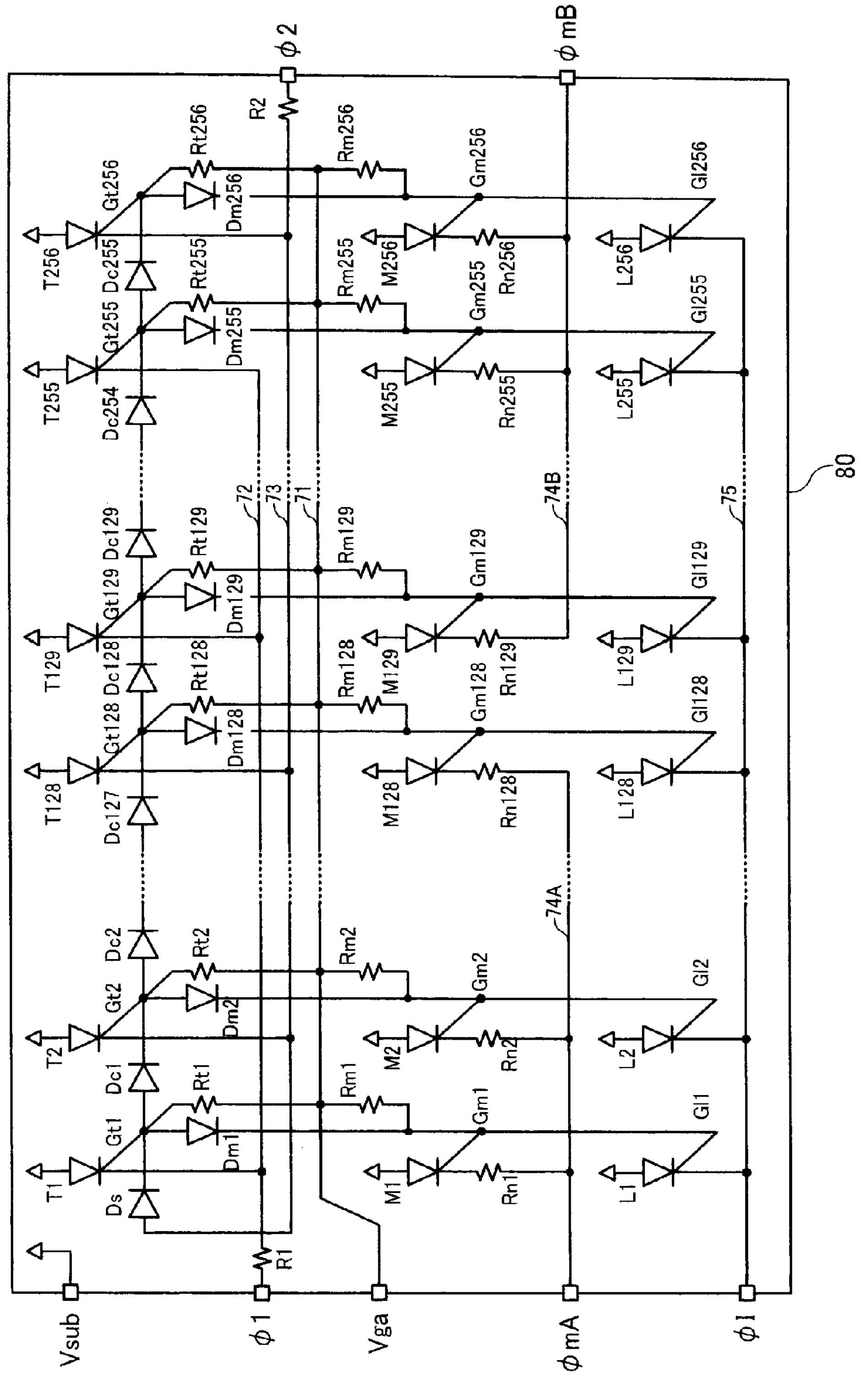
FIG. 25 is a diagram for explaining a circuit configuration of the light-emitting chip in the seventh exemplary embodiment.

FIG. 25 is a diagram for explaining a circuit configuration of the light-emitting chip C in the seventh exemplary embodiment. Here, the light-emitting chip C1 is described as an example, and thus the light-emitting chips C are denoted by the light-emitting chip C1 (C). In the seventh exemplary embodiment, the number of the light-emitting thyristors L is set to be 256 in the light-emitting chip C1 (C) of the first exemplary embodiment shown in FIG. 6. Along with this, the numbers of the transfer thyristors T, the memory thyristors M, the connecting diodes Dm, the power supply line resistances Rt and Rm, and the resistances Rn are also set to be 256, respectively. Note that the number of the coupling diodes Dc is 255. The same reference numerals are given to the same components as those shown in FIG. 6, and the detailed description thereof is omitted. Hereinafter, components different from those shown in FIG. 6 will be described.

The first transfer signal line 72 is connected to the ϕ1 terminal through the current limitation resistance R1 from a side of the transfer thyristor T1 (the leftmost side in the drawing of FIG. 25) that is located on the left edge of the transfer thyristor array. On the other hand, the second transfer signal line 73 is connected to the ϕ2 terminal through the current limitation resistance R2 from a side of the transfer thyristor T256 (the rightmost side in the drawing of FIG. 25) that is located on the right edge of the transfer thyristor array. Note that the ϕ1 terminal and the ϕ2 terminal may be provided on the same side (for example, the side of the transfer thyristor T1) of the transfer thyristor array, similarly to the first exemplary embodiment.

The cathode terminals of the memory thyristors M1 to M128 are connected to the memory signal line 74A through the respective resistances Rn1 to Rn128. The memory signal line 74A is connected to the ϕmA terminal from a side of the memory thyristor M1 (the leftmost side in the drawing of FIG. 25) that is located on the left edge of the memory thyristor array.

The cathode terminals of the memory thyristors M129 to M256 are connected to the memory signal line 74B through the respective resistances Rn129 to Rn256. The memory signal line 74B is connected to the ϕmB terminal from a side of the memory thyristor M256 (the rightmost side in the drawing of FIG. 25) that is located on the right edge of the memory thyristor array. The memory signal ϕm is supplied in common to the ϕmA terminal and the ϕmB terminal. In FIG. 4, for example, the ϕmA terminal of the light-emitting chip C1 is connected to the memory signal line 108_1A. The ϕmB terminal is connected to the memory signal line 108_1B. The memory signal generating unit 120 of the signal generating circuit 100 transmits the memory signal ϕm1 in common to the memory signal lines 108_1A and 108_1B. That is, in the seventh exemplary embodiment, the light-up control is performed sequentially on the 256 light-emitting thyristors L, and thus the memory signal ϕm1 need not be divided into the memory signals ϕm1A and ϕm1B.

The planar layout and the cross-sectional structure of the light-emitting chips C in the seventh exemplary embodiment are similar to those in the first exemplary embodiment shown in FIGS. 7A and 7B. Additionally, the operation of the light-emitting chip C1 (C) in the seventh exemplary embodiment is similar to that in the first exemplary embodiment. Thus, the detailed description thereof is omitted.

In the SLED of the light-emitting chip C in the seventh exemplary embodiment, the memory signal ϕm is supplied from the both sides of the SLED by using the memory signal lines 74A and 74B.

As has been described above, in the first to fifth exemplary embodiments, the plural memory thyristors M are sequentially changed to the ON state in order to turn on the plural light-emitting thyristors L simultaneously. Thus, a potential drop occurs to the memory signal line 74A or 74B due to a current flowing to the memory thyristors M having already been in the ON state.

For this reason, it is required that a potential lower than the threshold voltage is supplied to the memory thyristors M connected to the portion, having the largest potential drop, of the memory signal line 74A or 74B, in order to turn on the memory thyristors M.

It is the memory thyristors M128 and M129 located at the center of the memory thyristor array that are connected to the portion of the memory signal line 74A or 74B having the largest potential drop.

As an example, in a case where eight light-emitting thyristors L connected to the memory signal line 74A through the resistances Rn are caused to light up simultaneously, if a resistance value of the memory signal line 74A or 74B between two adjacent memory thyristors M (for example, a resistance value of the memory signal line 74A between the memory thyristors M1 and M2) is set to be 0.1Ω, the potential supplied to the ϕmA terminal in order to cause the memory thyristor M1 to turn on is −3 V, while the potential supplied to the ϕmA terminal in order to cause the memory thyristor M128 to turn on is −3.25 V.

Accordingly, the light-emitting chips C in the seventh exemplary embodiment may be driven with the potential "L" (−3.3 V) of the memory signal ϕm.

On the other hand, consider a case where the memory signal ϕm is supplied to the 256 memory thyristors M from one end (for example, the ϕmA terminal on the side of the memory thyristor M1) of a memory signal line (a line to which the memory signal lines 74A and 74B are connected). Then, the potential supplied to the ϕmA terminal in order to cause the memory thyristor M1 to turn on is −3 V, while the potential supplied to the ϕmA terminal in order to cause the memory thyristor M256 to turn on is −3.5 V.

In this case, the light-emitting chips C may not be driven with the potential "L" (−3.3 V) of the memory signal ϕm.

As described above, by dividing the memory signal line into two (the memory signal lines 74A and 74B), the influence of the potential drop due to the resistance of the memory signal lines 74 is reduced, thereby to lower the absolute value of the potential of the memory signal ϕm.

Eighth Exemplary Embodiment

The configuration of the light-emitting chips C in the eighth exemplary embodiment is different from that in the seventh exemplary embodiment.

Figure 26:
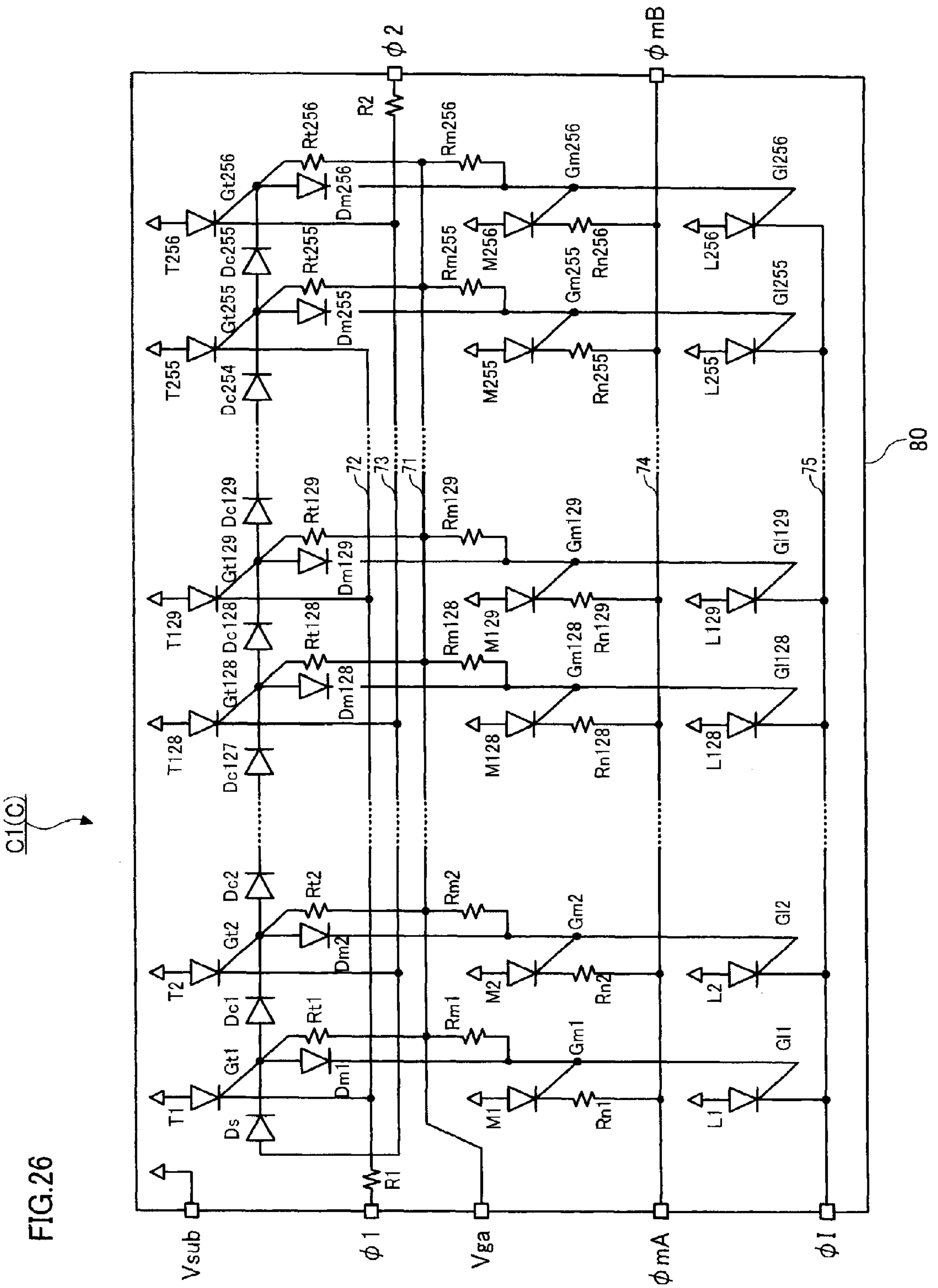
FIG. 26 is a diagram for explaining a circuit configuration of the light-emitting chip in the eighth exemplary embodiment.

FIG. 26 is a diagram for explaining a circuit configuration of the light-emitting chip C in the eighth exemplary embodiment. The light-emitting chip C1 is described as an example, and thus the light-emitting chips C are denoted by the light-emitting chip C1 (C).

In the light-emitting chips C in the eighth exemplary embodiment, the memory signal lines 74A and 74B in the seventh exemplary embodiment shown in FIG. 25 are connected together at the portions of the memory thyristors M128 and M129, thereby to obtain the memory signal line 74. Additionally, both of the ends of the memory signal line 74 are connected to the ϕmA terminal and the ϕmB terminal, respectively. The memory signal ϕm is supplied in common to the ϕmA terminal and the ϕmB terminal, similarly to the seventh exemplary embodiment.

Thereby, the influence of the potential drop due to the resistance of the memory signal line 74 is reduced, thereby to lower the absolute value of the potential of the memory signal ϕm, similarly to the seventh exemplary embodiment.

In the first to sixth exemplary embodiments, the descriptions have been given with the assumption that the number of the light-emitting points included in each self-scanning light-emitting element array (SLED) of the light-emitting chip C is set to be 128. However, this number is arbitrarily settable. In addition, although two SLEDs are assumed to be mounted on each light-emitting chip C, the number of the SLEDs may be one, three or more.

Furthermore, in the seventh and eighth exemplary embodiments, the descriptions have been given with the assumption that the number of the light-emitting points included in each self-scanning light-emitting element array (SLED) of the light-emitting chip C is set to be 256. However, this number is arbitrarily settable. In addition, although one SLED is assumed to be mounted on each light-emitting chip C, the number of the SLEDs may be two or more.

In the first to eighth exemplary embodiments, each coupling diode Dc as an example of the first electrical element only need to be one that is capable of transmitting change in the potentials of the gate terminals, and may be a resistance or the like. The same is true for the connecting diodes Dm and Db. Additionally, each elimination resistance Rh as an example of the second electrical element only need to be one that generates a potential difference, and may be a diode or the like.

In the first to eighth exemplary embodiments, the anode common thyristor (each of the transfer thyristors T, the memory thyristors M, the light-emitting thyristors L, the holding thyristors B (in the second, third, fifth and sixth exemplary embodiments) and the storing thyristors N (in the third, fourth, fifth and sixth exemplary embodiments)) whose anode terminal is set as the substrate has been described. However, the cathode common thyristor (each of the transfer thyristors T, the memory thyristors M, the light-emitting thyristors L, the holding thyristors B (in the second, third, fifth and sixth exemplary embodiments) and the storing thyristors N (in the third, fourth, fifth and sixth exemplary embodiments)) whose cathode terminal is set as the substrate may be used instead by changing the polarity of the circuit.

Note that, the usage of the light-emitting device in the present invention is not limited to an exposure device used in an electrophotographic image forming unit. The light-emitting device in the present invention may be also used in optical writing other than the electrophotographic recording, displaying, illumination, optical communication and the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A tight-emitting device comprising:

a substrate;

a light-emitting thyristor array formed of a plurality of light-emitting thyristors that are arrayed on the substrate in line, that each has a first anode, a first gate and a first cathode, and that each has one of the first anode and the first cathode being connected to a light-up signal line to supply a current for lighting up;

a memory thyristor array formed of a plurality of memory thyristors that are provided on the substrate, that are provided so as to correspond to the respective light-emitting thyristors forming the light-emitting thyristor array, that each has a second anode, a second gate and a second cathode, that each has one of the second anode and the second cathode being connected through respective resistances to a memory signal line to supply a signal to designate a light-emitting thyristor to be caused to light up, that each has an ON state and an OFF state, and that each memorizes that a corresponding one of the light-emitting thyristors is to be caused to light up when changed into the ON state; and a transfer thyristor array formed of a plurality of transfer thyristors that are provided on the substrate, that are provided so as to correspond to the respective memory thyristors forming the memory thyristor array, that each has a third anode, a third gate and a third cathode, that each has the third gate being connected through a first electrical element to the second gate of a corresponding one of the memory thyristors, that each has an ON state and an OFF state, that each has one of the third anode and the third cathode being connected to a transfer signal line to supply signals to set so as to allow a sequential shift of the ON state from one end side to the other end side, and that change respective threshold voltages of the memory thyristors to a value to cause the respective memory thyristors to be able to be set in the ON state by changing into the ON state.

2. The light-emitting device according to claim 1, further comprising a holding thyristor array formed of a plurality of holding thyristors that are provided on the substrate, that are provided so as to correspond to the respective light-emitting thyristors forming the light-emitting thyristor array and the respective memory thyristors forming the memory thyristor array, that each has a fourth anode, a fourth gate and a fourth cathode, that each has the fourth gate being connected to the first gate of a corresponding one of the light-emitting thyristors, that each has an ON state and an OFF state, that each has one of the fourth anode and the fourth cathode being connected through respective resistances to a holding signal line to supply a signal to change into the ON state in conjunction with a corresponding one of the memory thyristors in the ON state, and that change respective threshold voltages of the light-emitting thyristors to a value to cause the respective light-emitting thyristors to be able to be set in the ON state by changing into the ON state, the respective memory thyristors being provided so as to correspond to the respective light-emitting thyristors.

3. The light-emitting device according to claim 1, further comprising a storing thyristor array formed of a plurality of storing thyristors that are provided on the substrate, that are provided so as to correspond to the respective memory thyristors forming the memory thyristor array, that each has a fifth anode, a fifth gate and a fifth cathode, that each has the fifth gate being connected to the second gate of a corresponding one of the memory thyristors, and that each change into an ON state, when the corresponding one of the memory thyristors is in the ON state, to store that the corresponding one of the memory thyristors is in the ON state.

4. The light-emitting device according to claim 3, wherein one of the fifth anode and the fifth cathode of each of the storing thyristors forming the storing thyristor array is connected through a Schottky barrier diode to a power supply line to supply electric power.

5. The light-emitting device according to claim 3, wherein the fifth gate of each of the storing thyristors forming the storing thyristor array is connected through a second electrical element to an elimination signal line through which an elimination signal to change a storing thyristor in the ON state into the OFF state is transmitted, and the elimination signal line is connected through a Schottky barrier diode to an elimination signal terminal to which the elimination signal is transmitted.

6. A print head comprising:

an exposure unit that includes a plurality of light-emitting devices and that exposes an image carrier to form an electrostatic latent image, each of the light-emitting devices including:

a light-emitting element array formed of a plurality of light-emitting elements that are arrayed in line and that are connected to a light-up signal line to supply a current for lighting up;

a memory element array formed of a plurality of memory elements that are provided so as to correspond to the respective light-emitting elements forming the light-emitting element array, that are connected through respective resistances to a memory signal line to supply a signal to designate a light-emitting element to be caused to light up, that each has an ON state and an OFF state, and that each memorizes that a corresponding one of the light-emitting elements is to be caused to light up when changed into the ON state; and a switch element array formed of a plurality of switch elements that are provided so as to correspond to the respective memory elements forming the memory element array, that are electrically connected to the respective memory elements, that each has an ON state and an OFF state; that are connected to a transfer signal line to supply signals to set so as to allow a sequential shift of the ON state from one end side to the other end side, and that cause the respective memory elements to be able to be set in the ON state by changing into the ON state;

an optical unit that focuses light emitted by the exposure unit on the image carrier; and a signal generating unit that generates driving signals to control light emission of the light-emitting elements for each of a plurality of groups obtained by dividing the plurality of light-emitting elements of the light-emitting element array in each of the light-emitting devices.

7. The print head according to claim 6, wherein each of the light-emitting devices further comprises a holding element array formed of a plurality of holding elements that are provided so as to correspond to the respective light-emitting elements forming the light-emitting element array and the respective memory elements forming the memory element array, that each has an ON state and an OFF state, that are connected through respective resistances to a holding signal line to supply a signal to change into the ON state, and that cause a corresponding one of the light-emitting elements to be able to be set in the ON state by changing into the ON state in conjunction with a corresponding one of the memory elements in the ON state, the respective memory elements being provided so as to correspond to the respective light-emitting elements.

8. The print head according to claim 6, wherein each of the light-emitting devices further comprises a storing element array formed of a plurality of storing elements that are provided so as to correspond to the respective memory elements forming the memory element array, and that each change into an ON state, when a corresponding one of the memory elements is in the ON state, to store that the corresponding one of the memory elements is in the ON state.

9. The print head according to claim 8, wherein each of the light-emitting devices further comprises an elimination signal line to change a storing element in the ON state into the OFF state, the storing element forming the storing element array.

10. The print head according to claim 6, wherein the driving signals generated by the signal generating unit are supplied to the plurality of light-emitting elements of the light-emitting element array in each of the light-emitting devices, and include a light-up signal to cause the light-emitting elements forming the light-emitting element array to light up, and the light-up signal is provided to at least two of the light-emitting devices in common.

11. The print head according to claim 10, wherein the light-up signal included in the driving signals generated by the signal generating unit supplies a current to the plurality of light-emitting elements of the light-emitting element array in each of the light-emitting devices, in accordance with the number of the light-emitting elements intended to light up.

12. An image forming apparatus comprising:

a charging unit that charges an image carrier;

an exposure unit that includes a plurality of light-emitting devices and that exposes the image carrier to form an electrostatic latent image, each of the light-emitting devices including;

a light-emitting element array formed of a plurality of light-emitting elements that are arrayed in line and that are connected to a light-up signal line to supply a current for lighting up;

a memory element array formed of a plurality of memory elements that are provided so as to correspond to the respective light-emitting elements forming the light-emitting element array, that are connected through respective resistances to a memory signal line to supply a signal to designate a light-emitting element to be caused to light up, that each has an ON state and an OFF state, and that each memorizes that a corresponding one of the light-emitting elements is to be caused to light up when changed into the ON state; and a switch element array formed of a plurality of switch elements that are provided so as to correspond to the respective memory elements forming the memory element array, that are electrically connected to the respective memory elements, that each has an ON state and an OFF state, that are connected to a transfer signal line to supply signals to set so as to allow a sequential shift of the ON state from one end side to the other end side, and that cause the respective memory elements to be able to be set in the ON state by changing into the ON state;

an optical unit that focuses light emitted by the exposure unit on the image carrier;

a signal generating unit that generates driving signals to control light emission of the light-emitting elements for each of a plurality of groups obtained by dividing the plurality of light-emitting elements of the light-emitting element array in each of the light-emitting devices;

a developing unit that develops the electrostatic latent image formed on the image carrier; and a transfer unit that transfers an image developed on the image carrier to a transferred body.

13. The image forming apparatus according to claim 12, wherein each of the light-emitting devices further comprises a holding element array formed of a plurality of holding elements that are provided so as to correspond to the respective light-emitting elements forming the light-emitting element array and the respective memory elements forming the memory element array, that each has an ON state and an OFF state, that are connected through respective resistances to a holding signal line to supply a signal to change into the ON state, and that cause a corresponding one of the light-emitting elements to be able to be set in the ON state by changing into the ON state in conjunction with a corresponding one of the memory elements in the ON state, the respective memory elements being provided so as to correspond to the respective light-emitting elements.

14. The image forming apparatus according to claim 12, wherein each of the light-emitting devices further comprises a storing element array formed of a plurality of storing elements that are provided so as to correspond to the respective memory elements forming the memory element array, and that each change into an ON state, when a corresponding one of the memory elements is in the ON state, to store that the corresponding one of the memory elements is in the ON state.

* * * * *